(12) United States Patent
Remiszewski et al.

(10) Patent No.: US 10,043,054 B2
(45) Date of Patent: Aug. 7, 2018

(54) METHODS AND SYSTEMS FOR CLASSIFYING BIOLOGICAL SAMPLES, INCLUDING OPTIMIZATION OF ANALYSES AND USE OF CORRELATION

(71) Applicant: CIRECA THERANOSTICS, LLC, Parsippany, NJ (US)

(72) Inventors: Stanley H. Remiszewski, Spencer, MA (US); Max Diem, Boston, MA (US); Clay M. Thompson, Camano Island, WA (US); Aysegul Ergin, Arlington, MA (US); Xinying Mu, Malden, MA (US); Mark Kon, Cambridge, MA (US)

(73) Assignee: CIRECA THERANOSTICS, LLC, Parsippany, NJ (US)

( * ) Notice: Subject to any disclaimer, the term of this patent is extended or adjusted under 35 U.S.C. 154(b) by 14 days.

(21) Appl. No.: 14/887,176

(22) Filed: Oct. 19, 2015

(65) Prior Publication Data

US 2016/0110584 A1  Apr. 21, 2016

Related U.S. Application Data

(60) Provisional application No. 62/101,855, filed on Jan. 9, 2015, provisional application No. 62/065,421, filed on Oct. 17, 2014.

(51) Int. Cl.
*G06K 9/00* (2006.01)
*G06T 7/00* (2017.01)

(52) U.S. Cl.
CPC ....... *G06K 9/00127* (2013.01); *G06K 9/0014* (2013.01); *G06T 7/0012* (2013.01); *G06T 7/0014* (2013.01); *G06T 2207/10056* (2013.01); *G06T 2207/20076* (2013.01); *G06T 2207/20081* (2013.01); *G06T 2207/30024* (2013.01)

(58) Field of Classification Search
CPC ......... G06T 7/0012; G06T 2207/20081; G06T 2207/30024; G06T 7/0014; G06T 2207/10056; G06T 2207/20076; G06K 9/00127; G06K 9/0014
USPC ....................................................... 382/133
See application file for complete search history.

(56) References Cited

U.S. PATENT DOCUMENTS

| | | |
|---|---|---|
| 6,738,502 B1 | 5/2004 | Coleman et al. |
| 2004/0235180 A1 | 11/2004 | Schmidt et al. |
| 2006/0039603 A1 | 2/2006 | Koutsky |
| 2006/0245631 A1 | 11/2006 | Levenson et al. |

(Continued)

OTHER PUBLICATIONS

International Search Report of PCT/US2015/056258 dated Feb. 8, 2016.

*Primary Examiner* — Gregory F Cunningham
(74) *Attorney, Agent, or Firm* — Arent Fox LLP

(57) ABSTRACT

Methods, systems, and devices for classifying a biological sample that include receiving an image of a biological sample and applying one or more algorithms from a data repository to the image, generating a classification of the biological sample based on the outcome of the one or more algorithms applied to the image, and transmitting the classification for presentation on a display or via another medium. The methods, systems, and devices may also include features for developing a data master reference and/or other correlation/translation features to enable comparison of data sets from one platform to another or from one machine to another or from the same machine at different points in time.

10 Claims, 30 Drawing Sheets

(56) References Cited

U.S. PATENT DOCUMENTS

| | | | |
|---|---|---|---|
| 2007/0017809 A1* | 1/2007 | Goldknopf | B01D 57/02 204/461 |
| 2010/0061605 A1* | 3/2010 | Fain | G06T 7/0012 382/128 |
| 2010/0172555 A1 | 7/2010 | Hasezawa et al. | |
| 2010/0177188 A1 | 7/2010 | Kishima | |
| 2011/0307424 A1* | 12/2011 | Jin | G06N 99/005 706/12 |

* cited by examiner

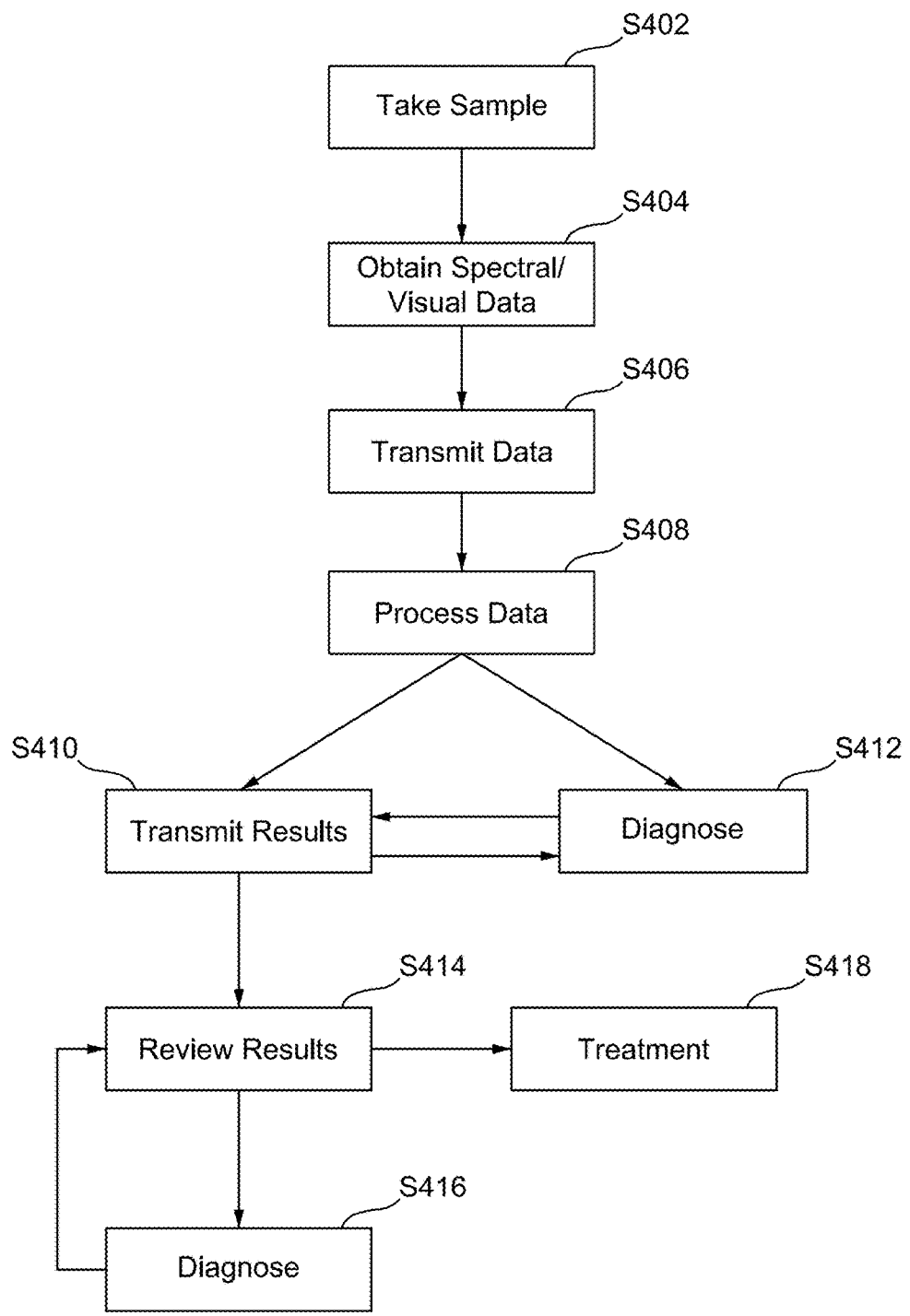

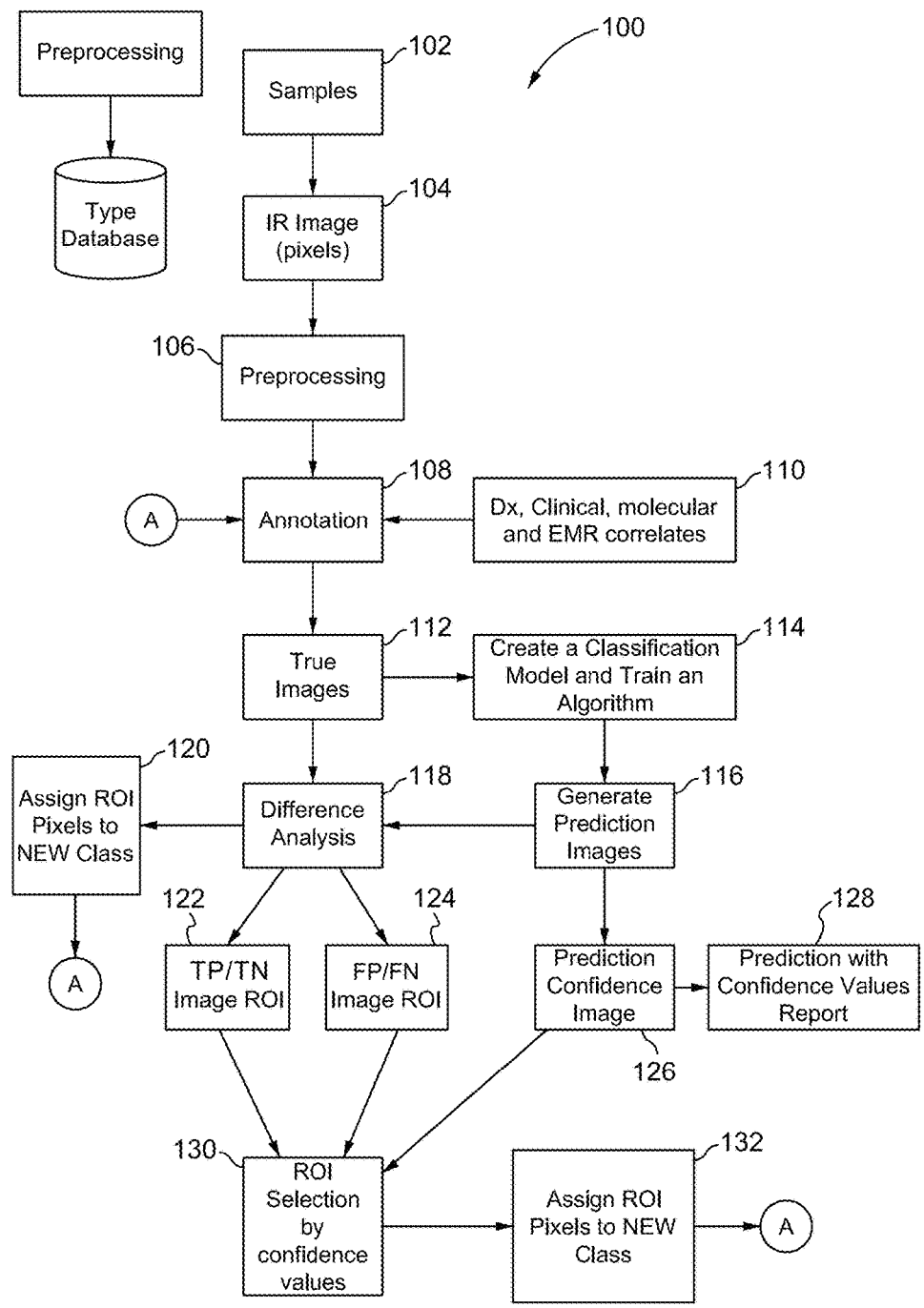

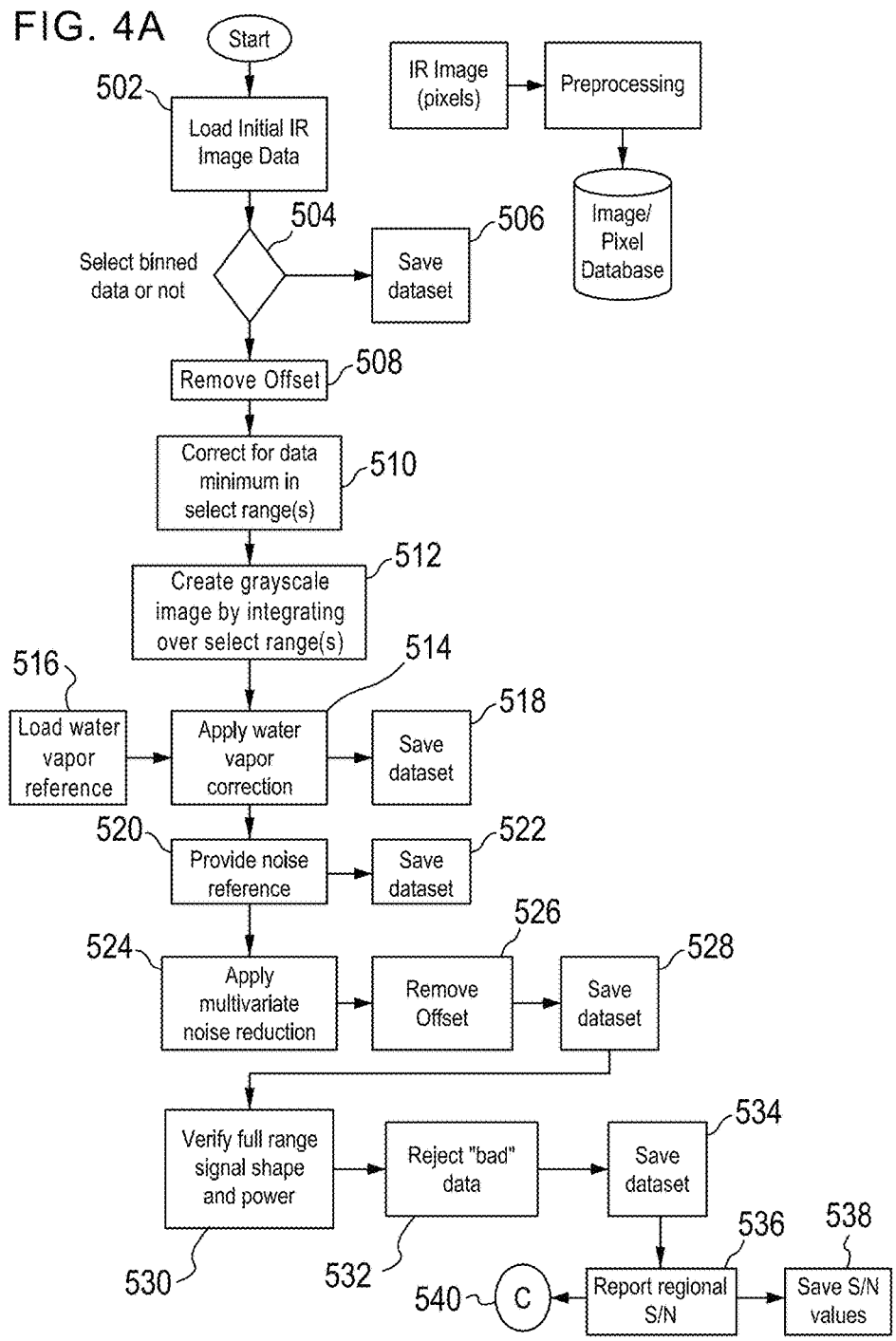

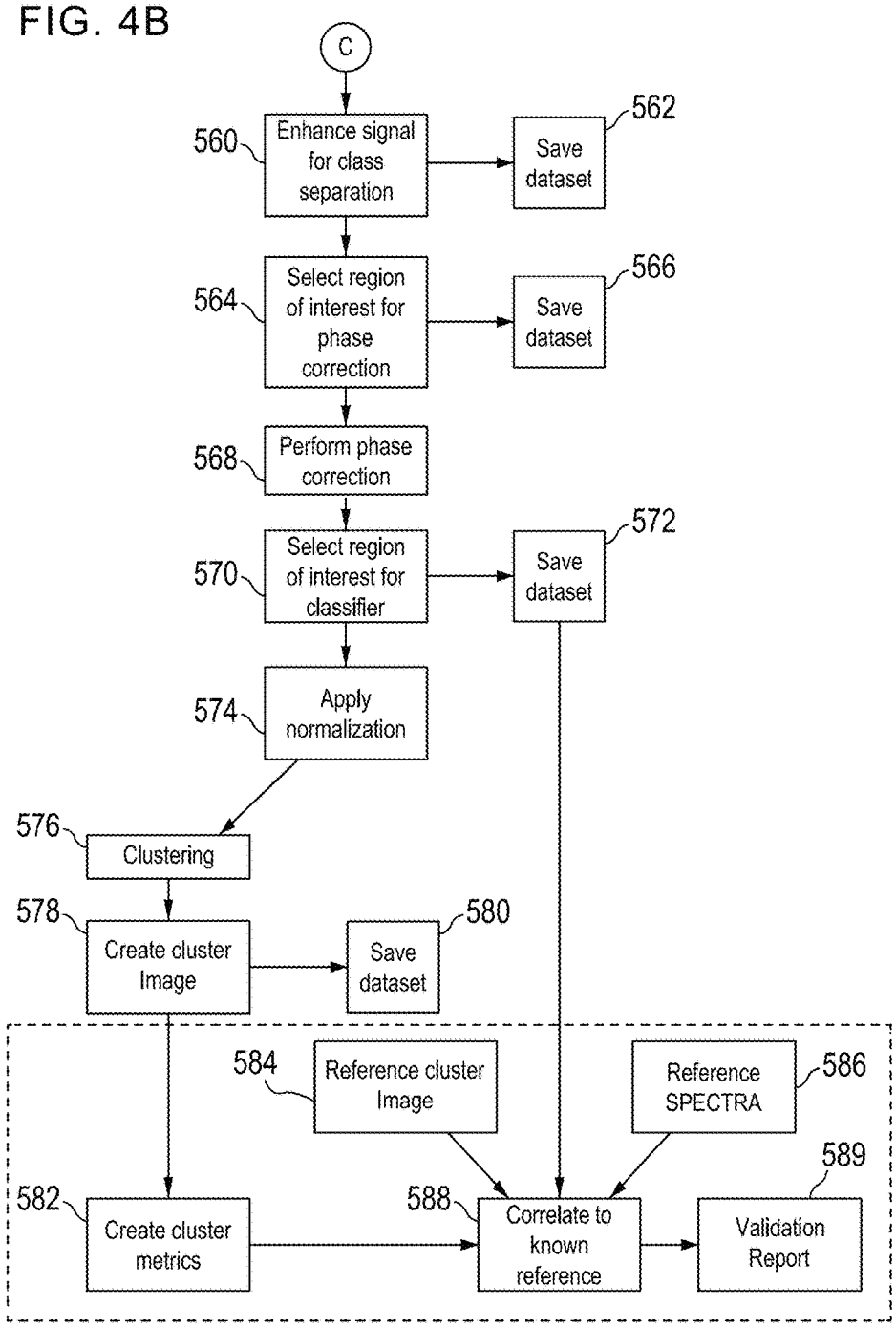

Whole sample
New classes after TP/TN.
FP/FN difference analysis (I-16)

Whole sample
prediction, SqCC+

(I-15)

Whole sample
true, SqCC (I-14)

(I-9t) Annotation Region True

FIG. 22
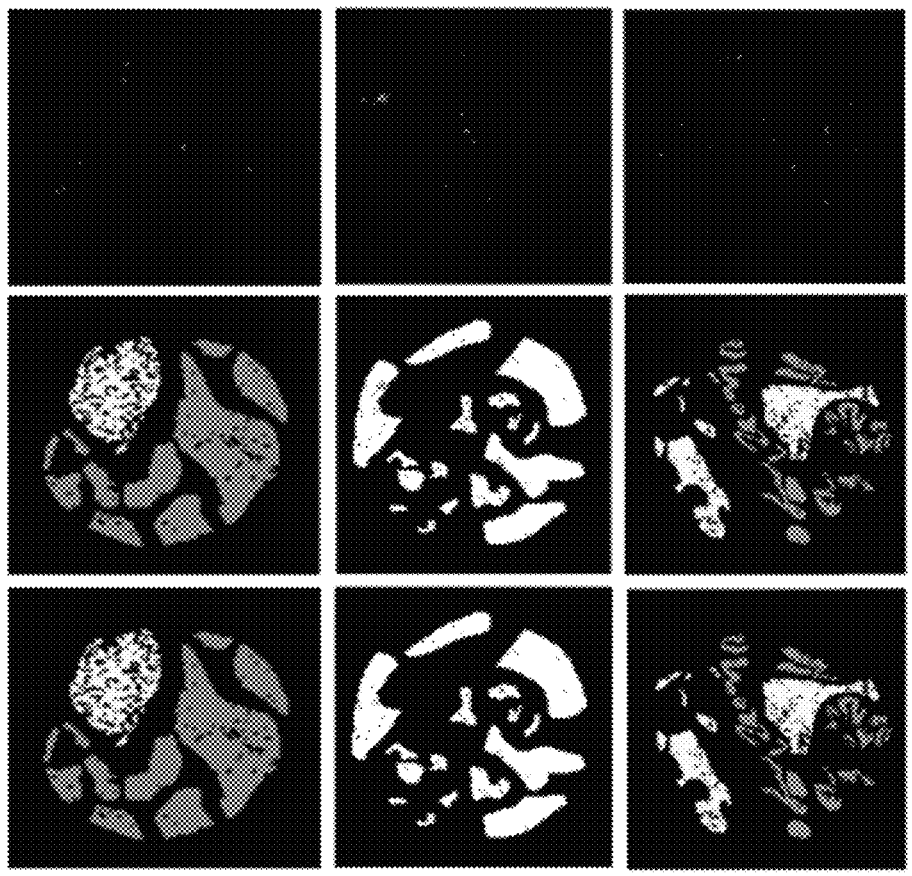
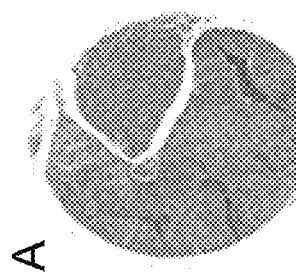
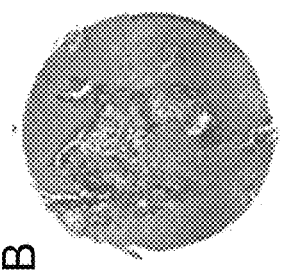
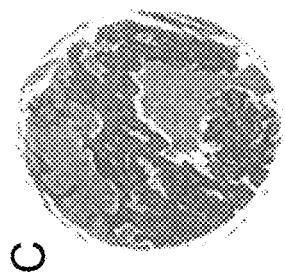
A  B  C

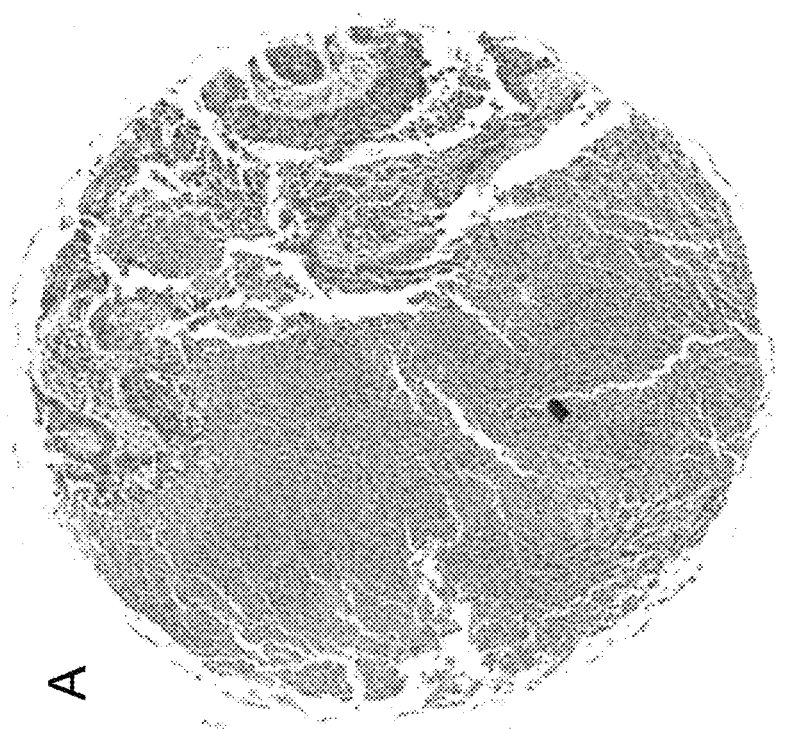
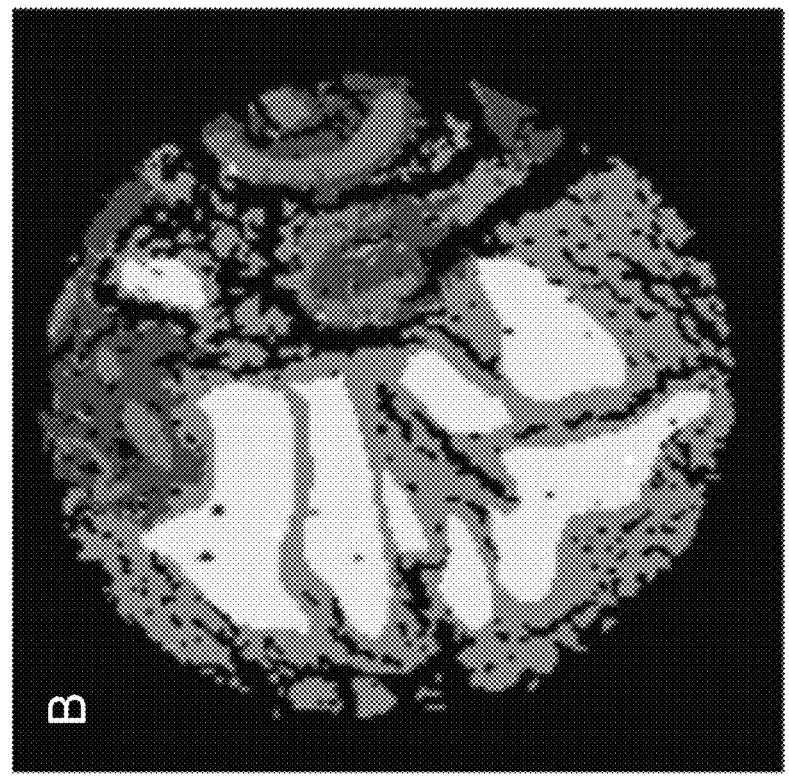
FIG. 23

METHODS AND SYSTEMS FOR CLASSIFYING BIOLOGICAL SAMPLES, INCLUDING OPTIMIZATION OF ANALYSES AND USE OF CORRELATION

RELATED APPLICATIONS

This application claims priority to co-pending U.S. Provisional Patent Appl. No. 62/101,855 titled "METHODS AND SYSTEMS FOR THE COMPARISON OF MULTI-PLATFORM SPECTRAL HISTOPATHOLOGY (SHP) DATA SETS" filed Jan. 9, 2015 and U.S. Provisional Patent Appl. No. 62/065,421 titled "CLASSIFICATION OF MALIGNANT AND BENIGN TUMORS OF THE LUNG BY INFRARED SPECTRAL HISTOPATHOLOGY (SHP)" filed Oct. 17, 2014. This application contains subject matter related to U.S. Pat. No. 9,025,850 titled "METHOD FOR ANALYZING SPECIMENS BY SPECTRAL IMAGING" issued May 5, 2015, claiming priority to U.S. Patent Appl. No. 61/358,606 titled "DIGITAL STAINING OF HISTO-PATHOLOGICAL SPECIMENS VIA SPECTRAL HISTO-PATHOLOGY" filed Jun. 25, 2010; U.S. patent application Ser. No. 13/645,970 titled "METHOD AND SYSTEM FOR ANALYZING BIOLOGICAL SPECIMENS BY SPECTRAL IMAGING" filed Oct. 5, 2012, claiming priority to U.S. Patent Appl. No. 61/543,604 titled "METHOD AND SYSTEM FOR ANALYZING BIOLOGICAL SPECIMENS BY SPECTRAL IMAGING" filed Oct. 5, 2011, and U.S. Patent Appl. No. 61/543,604 titled "METHOD AND SYSTEM FOR ANALYZING SPECTROSCOPIC DATA TO IDENTIFY MEDICAL CONDITIONS" filed Oct. 17, 2011; U.S. Pat. No. 9,129,371 titled "METHOD FOR ANALYZING BIOLOGICAL SPECIMENS BY SPECTRAL IMAGING" issued Sep. 8, 2015, which is a continuation-in-part of U.S. Pat. Nos. 9,025,850; 8,428,320 titled "METHOD OF RECONSTITUTING CELLULAR SPECTRA USEFUL FOR DETECTING CELLULAR DISORDERS" issued Apr. 23, 2013, based on Patent Cooperation Treaty (PCT) Patent Appl. No. PCT/US2009/045681 titled "METHOD OF RECONSTITUTING CELLULAR SPECTRA USEFUL FOR DETECTING CELLULAR DISORDERS" having international filing date May 29, 2009, and claiming priority to U.S. Provisional Patent Appl. No. 61/056,955 titled "METHOD OF RECONSTITUTING CELLULAR SPECTRA FROM SPECTRAL MAPPING DATA" filed May 29, 2008; U.S. Pat. No. 8,816,279 titled "TUNABLE LASER-BASED INFRARED IMAGING SYSTEM AND METHOD OF USE THEREOF" issued Aug. 26, 2014, based on U.S. Provisional Patent Application No. 61/322,642 titled "A TUNABLE LASER-BASED INFRARED IMAGING SYSTEM" filed Apr. 9, 2010; and U.S. patent application Ser. No. 14/219,984 titled "METHOD AND SYSTEM FOR ANALYZING BIOLOGICAL SPECIMENS BY SPECTRAL IMAGING," filed Mar. 19, 2014, based on U.S. Provisional Patent Appl. No. 61/803,376 titled "INFRARED AND RAMAN MICRO-SPECTRAL IMAGING OF HUMAN CELLS AND TISSUE FOR MEDICAL DIAGNOSIS" filed Mar. 19, 2013; and U.S. Provisional Patent Appl. No. 62/204,340 titled "METHODS AND SYSTEMS FOR IDENTIFYING CELLULAR SUBTYPES IN AN IMAGE OF A BIOLOGICAL SPECIMEN" filed Aug. 12, 2015. The entirety of each of the foregoing applications is hereby incorporated in its entirety herein by reference.

FIELD OF THE INVENTION

Aspects of the present invention relate to systems and methods of classifying a biological sample. More specifically, the systems and methods may include receiving an image of a biological sample and applying one or more algorithms from a data repository to the image, and/or generating a classification of the biological sample based on the outcome of the one or more algorithms applied to the image, and/or transmitting the classification for presentation on a display or via another medium. Further, the systems and methods may include features for developing a data master reference and/or other correlation/translation features to enable comparison of data sets from one platform to another or from one machine to another or from the same machine at different points in time.

BACKGROUND

One problem that exists in the art today is that there remains a lack of methods and systems that both improve detection of abnormalities in biological samples and deliver analytical results to a practitioner.

In the related art, a number of diseases may be diagnosed using classical cytopathology and histopathology methods involving examination of nuclear and cellular morphology and staining patterns. Typically, such diagnosis occurs via examining up to 10,000 cells in a biological sample and finding about 10 to 50 cells or a small section of tissue that may be abnormal. This finding is based on subjective interpretation of visual microscopic inspection of the cells in the sample.

An example of classical cytology dates back to the middle of the last century, when Papanicolaou introduced a method to monitor the onset of cervical disease by a test, commonly known as the "Pap" test. For this test, cells are exfoliated using a spatula or brush, and deposited on a microscope slide for examination. In the original implementation of the test, the exfoliation brush was smeared onto a microscope slide, hence the name "Pap smear." Subsequently, the cells were stained with hematoxylin/eosin (H&E) or a "Pap stain" (which consists of H&E and several other counterstains), and were inspected visually by a cytologist or cyto-technician, using a low power microscope.

The microscopic view of such samples often shows clumping of cells and contamination by cellular debris and blood-based cells (erythrocytes and leukocytes/lymphocytes). Accordingly, the original "Pap-test" had very high rates of false-positive and false-negative diagnoses. Modern, liquid-based methods (such as cyto-centrifugation, the Thin-Prep® or the Surepath® methods) have provided improved cellular samples by eliminating cell clumping and removing confounding cell types.

However, although methods for the preparation of samples of exfoliated cells on microscope slides have improved substantially, the diagnostic step of the related art still typically relies on visual inspection and comparison of the results with a data base in the cytologist's memory. Thus, the diagnosis is still inherently subjective and associated with low inter- and intra-observer reproducibility. To alleviate this aspect, other related art automated visual light image analysis systems have been introduced to aid cytologists in the visual inspection of cells. However, since the distinction between atypia and low grades of dysplasia is extremely difficult, such related art automatic, image-based methods have not substantially reduced the actual burden of responsibility on the cytologist.

In classical histopathology, tissue sections, rather than exfoliated individual cells, are inspected by a pathologist using a microscope after suitable staining of the tissue. To detect abnormalities, the pathologist focuses on gross tissue architecture, cell morphology, nuclear morphology, nucleus-to-cytoplasm ratio, chromatin distribution, presence of mitotic figures, and others. Since these criteria are morphology-based, their interpretation always will be somewhat subjective. Immuno-histochemical and other more recent methods are often used to augment the pathologist's subjective assessment of a tissue diagnosis.

Spectral methods have also been applied in the related art to the histopathological diagnosis of tissue sections available from biopsy. The data acquisition for this approach, referred to as "Spectral Histopathology (SHP)," can be carried out using the same spectral methodology used for spectral cytopathology ("SCP").

In some methods of the related art, a broadband infrared (IR) or other light output is transmitted to a sample (e.g., a tissue sample), using instrumentation, such as an interferometer, to create an interference pattern. Reflected and/or transmitted light transmitted light is then detected, typically as an interference pattern. A Fast Fourier Transform (FFT) may then be performed on the detected pattern to obtain spectral information relating to each sample pixel. The resulting information is referred to as a pixel spectrum.

One limitation of the FFT based related art process is that the amount of radiative energy available per unit time in each band pass may be very low, due to use of a broadband infrared spectrum emission. As a result, the data available for processing with this approach is generally inherently noise limited. Further, in order to discriminate the received data from background noise, for example, with such low energy levels available, high sensitivity instruments must be used, such as high sensitivity liquid nitrogen cooled detectors (the cooling alleviates the effects of background IR interference). Among other drawbacks, such related art systems may incur great costs, footprint, and energy usage.

There remains an unmet need in the art for improved devices, methods, and systems for transmitting and detecting IR and/or other similar transmissions for use, for example, for imaging tissue samples and other samples for such purposes as the classification of diseases for diagnosis, prognosis, therapies and/or prediction of diseases and/or conditions.

SUMMARY

Aspects of the present invention relate to systems and methods of classifying a biological sample. The systems and methods may include receiving an image of a biological sample and applying one or more algorithms from a data repository to the image. The systems and methods may include generating a classification of the biological sample based on the outcome of the one or more algorithms applied to the image. The systems and methods may include transmitting the classification for presentation on a display or via another medium. Further, the systems and methods may include features for developing a data master reference and/or other correlation/translation features to enable comparison of data sets from one platform to another or from one machine to another or from the same machine at different points in time.

More specifically, for example, aspects of the present invention provide various features relating to training sets, which may include applying a threshold to contiguous and/or scattered pixels. In this context, as explained further below, a "minimum rule" may be applied to training datasets to adequately represent disease and tissue type classes by selecting the optimal minimum quantity of patients and pixels. Further, an oversampling rule may be applied to balance a class in multiclass classification algorithms after the "minimum rule" is applied. In addition, a "minimum detection" rule may be applied to set the threshold quantity of predicted pixels present when making a prediction call.

In another aspect of the present invention, a probability threshold may be applied to adjust accuracy either improving or lessening accuracy or lowering sensitivity while increasing specificity and vise versa.

Yet another aspect of the present invention relates to reporting heterogeneity by applying thresholds, probabilities, and/or oversampling of underrepresented data. In accordance with aspects of the present invention, complex tissue analysis may be accomplished.

Aspects of the present invention further relate to addressing the fact that training set composition has a large effect on accuracy of algorithms. To provide consistency, efficiency of calculations (e.g., use of time), and improvement of algorithm performance, among other advantages, a minimum training sets size may be selected to achieve a representative composition for a class. One approach, in accordance with aspects of the present invention, is to set the optimal training set size so as to control the feature number and to report with this showing the robustness of the selected training set as a function of feature number with the minimum number of features required being preferred over including additional features without corresponding performance gains. Another way is to show robustness by the number of pixels and another is by indicating the number of patients represented. All three ways could be combined as well.

Yet another aspect of the present invention involves displaying training set metrics when comparing one algorithm to another for clinical use. For example, in accordance with aspects of the present invention, accuracy of training sets may be reported with validity and verification metrics. For example, accuracy may be reported versus patient/sample count, versus pixel count and versus feature count. Further, a graphical report comprised of statistical metrics and data set attributes may be generated. The source of the data may be represented in such report, including the source of annotations and images, which may be provided to detail the substance and pixel level location, as well as contribution and claims with respect to the reported values output by algorithms, models and other analysis.

In accordance with aspects of the present invention, models, algorithms, annotations, training and/or test sets may be labeled and/or branded with the validation source to provide additional weight to validity of outcomes and claims and to direct the use of the output, for example the output confidence level in the accuracy of a classification or a collection of images. Further, annotated data may be provided as a reference to allow a user to place outcomes in context with clinical data used to train algorithms and/or build models used to classify unknown samples or the characterize the composition of a cohort of samples. The annotation data may enhance value and confidence, as representing key opinion leaders by name or by institution association. In this way, the combination of visual/spatial representation of reference data and name association of the label source or sample source used for annotation is able to provide quantitative and objective verification of the source of predictions and class associations made.

In accordance with aspects of the present invention, sample collections may serve as cohorts curated for specific associations and/or properties. For example, the cohort may represent a clinical trial collection of patients, samples, and/or outcomes. Methods and systems in accordance with aspects of the present invention may identify heterogeneity and characterize complex tissue spatially, objectively, and quantitatively in samples and within collections of samples gathered as cohorts for analysis.

Other aspects of the present invention relate specifically to detecting necrosis, which may be isolated in a sample. In accordance with aspects of the present invention, necrosis may be identified by a specified method and used as a landmark of later stage disease conditions, including the presence of cancer cells or connective tissue that may have responded to therapy causing cell death.

Yet another aspect of the present invention involves methods and systems for detecting immune cell activity and/or response, inflammatory conditions and secretions. Aspects of these methods and system are usable to to differentiate among benign, cancerous and inflammatory conditions. Because such conditions may have a variety of causes, such as secretions from adjacent cells indicating a disease condition, immune cell activity changes, or an immune response to a disease condition and/or a therapy applied.

Yet another aspect of the present invention relates to tumor microenvironment characterization and/or detection. Microenvironments are often important for targeting patient therapies, and when used for detection of chemical changes, may aid drug design, clinical trial evaluations, and assessing responses to therapies. Similarly, for example, a microenvironment in a tumor within a sample could indicate a prognostic condition. Aspects of the present invention present methods and systems that are sensitive to such features of microenvironments.

Yet another aspect of the present invention relates to improvements in annotation of pixels that may be exported from a database or other repository of disease conditions, tissue types, and spectral signatures. The database or other repository thereby serves as an information hub for subsequent classifiers, training, and test datasets, which may be used, for example, for creating predictions, correlations, and reports.

Yet another aspect of the present invention relates to methods and systems for testing when applying IR spectral data. Such methods and systems for testing and analysis may be applied at several levels. These levels may include pixel (lowest), disease type or subtype (medium), and whole-sample and whole image (highest). Unknown samples may be compared one or all levels. Comparison methods and systems may be performed, for example, using algorithms, models (collections of algorithms), and/or by correlative analysis (e.g., cluster analysis).

Yet another aspect of the present invention relates to methods and systems for providing increased or decreased spectral resolution (e.g., by binning or unbinning), as function of classification performance. In some aspects, spectral resolution serves as a variable factor that may increase performance. For example, decreasing spectral resolution, while enhancing signal to noise, may provide a method for improving a classification dataset either for training prediction machine algorithms or for use in correlative analysis. In this example, the method applies second derivative analysis to optimize feature representation and to provide the working dataset used to establish a minimum number of features. Raw data (as opposed to second derivative analysis) is also usable in a similar way.

Yet another aspect of the present invention relates to methods and systems for establishing minimum pixel count to optimize performance and minimize computation time. Another approach to achieving more optimal datasets (e.g., the datasets that achieve preferred cost, time and outcomes) may involve minimizing the number of pixels required (e.g. some quantity less than the entire amount). For example, in one example analyses, the use of 2000 pixels, rather than 20,000 pixels, may be sufficient to produce an analysis performance plateau. Further, performance improvements may be made if optimization decisions and data quality are represented visually and included as part of a report to further enhance confidence in the predictions and classification results received by a user.

Yet another aspect of the present invention involves use of IR spectral signatures to act as a "key field" in a relational structure across multiple and otherwise independent "gold standards." IR datasets, which correspond to chemical and biochemical images, may be applied for prognosis and data mining in spatial and feature domains using landmarks and "gold standard" images as correlates. Gold standards may include, for example, H&E, Immunohistochemistry (IHC), In-situ-hybridization (ISH), MALDI, and/or region laser micro-dissection (LMD). Such gold standard IR datasets may serve as input to genomic and proteomic analysis, molecular analyses, and spatially resolved MALDI. Reverse mapping may be implemented to produce results of non-spatial analysis (next generation sequencing, PCR and other molecular tests), which may result in a spatial report by associating the results to IR pixels originally harvested by mapping regions in a sample.

In yet another aspect of the present invention, Tissue Micro Arrays (TMAs) may be used as a primary research format for pharmaceutical research, drug development, clinical trial management, and outcomes analysis. Advantages of the use of TMAs may include applicability to many disease conditions, patients and/or samples on a single slide. Such methods may be applied so as to rapidly analyze large cohorts for similarity and difference analysis through data sets extracted from a database used to create virtual TMAs (visual arrays of images and outcomes), and the cohorts may be used in intra- and inter-sample analysis (e.g., using methods and systems discussed in U.S. Patent Appl. No. 62/204,340). In addition, weights may be applied to variables, for example, in a multiclass analysis where heterogeneity and tissue complexity are factors, and sensitivity and specificity factors may be discounted or emphasized by applying importance weighting. This approach may include, for example, applying positive or negative values so as to indicate include or exclude certain outcomes in an accuracy calculation and/or a reported outcome.

Yet further aspects of the present invention include features for developing a data master reference and/or a correlation/translation algorithm or other function that enables equating of data sets from one platform to another or from one machine to another or from the same machine at different points in time so as to enable standardizing of IR signatures for use to define and describe clinical representation of disease states, types and tissue features within and among samples. For example an IR biomarker acquired from a sample to affect clinical decision-making may be used as the basis for standardizing and making independent variable platforms and machines. In this regard, the methods and systems may include various features for making instrument data independent of the platform (individual instrument supplier make and model) and the machine used to acquire the data. The methods and systems may further be used to maintain data quality on a single instrument, such as when the instrument changes due to normal use and aging, by providing feedback used to set performance parameters and to adjust for variation that may not be easily dealt with through parameter changes.

In one example implementation, it is noted that currently a reference standard is the use of Paralyne-C deposited on a gold coating, which is deposited on a glass substrate. The substrate may comprise any materials suitable for applicable laboratory conditions. For example, the substrate may comprise a metal. Alternatively, a biological or other synthetic material may be used, so long a reproducibility of a spectral signature is achieved as a natural property of the reference.

Among other advantages, differences in detector technology affecting outputs may be addressed through such methods and systems. In one example implementation, a method for such standardization may include the following: 1) data acquisition; 2) machine specific spatial data treatment; 3) raw data preparation and/or pre-processed data preparation; 4) data added to database or other data repository; 5) data compatibility function applied so as to normalize or otherwise adjust data from a first source to be similar to the form of that data being obtained from a second source having known parameters; 6) data similarity metrics are calculated (e.g., binary correlation, cluster membership verification) 7) a report/automatic acceptance/rejection is generated; 8) the adjusted data may be used, such as in an analysis of a sample.

As a further example of a feature of this aspect of the present invention, a data compatibility function may be derived from for data set A and B using a standard reference data set for platform/machine A and platform machine being used B. Data is merged or combined for analysis after applying the data compatibility function so as to adjust the data from machine A to be similar to data which would be produced by machine B and/or vice versa. In this regard, a binary comparison may be applied to verify data translation performance. Further, non-linear as well as linear effects of platform and machine may be treated by an appropriate compatibility function. In accordance with aspects of the present invention, broad adoption, use and reproducibility of results across platforms, machines and laboratories may be achieved by use of a data compatibility function in accordance with various features of these methods and systems. Such adoption may be enabled, for example, by the use of the reference spectral standard used to characterize localized variance attributable to machines and platforms independent of the biological sample being analyzed. Further, other optical factors, such as resolution differences, may be similarly addressed by such methods and systems, including, for example, by image registration and interpolation between mismatched instrumentation platforms and machines.

Additional advantages and novel features relating to variations of the present invention will be set forth in part in the description that follows, and in part will become more apparent to those skilled in the art upon examination of the following or upon learning by practice of aspects thereof.

BRIEF DESCRIPTION OF THE FIGURES

FIG. 2 shows a flowchart illustrating steps in a method of providing diagnosis information to a practitioner according to aspects of the present invention.

FIG. 3 illustrates an example of the method flow for analyzing a spectral dataset from a biological specimen to provide a diagnosis, prognosis, and/or predictive classification of a disease or condition in accordance with an aspect of the present invention.

FIGS. 4A and 4B illustrate an example method flow for preprocessing IR image data in accordance with an aspect of the present invention.

FIG. 22 contains Photstats showing the results of three different label-images from a test set for different necrosis and cancer classes, in accordance with aspects of the present invention.

FIG. 23 contains Photostats of (a) a visual photomicrograph of an H&E stained tissue spot diagnosed as SqCC with necrosis; and (b) an SHP label image (pale blue and green) and annotation regions (bright green and blue), in accordance with aspects of the present invention.

DETAILED DESCRIPTION

Aspects of the present invention include methods, systems, and devices for providing analytical data and/or medical diagnosis from a tissue sample. In this context, aspects of the present invention relate particularly to systems and methods of classifying a biological sample, receiving an image of a biological sample, applying one or more algorithms from a data repository to the image, generating a classification of the biological sample based on the outcome of the one or more algorithms applied to the image, and transmitting the classification for presentation on a display or via another medium. The systems and methods may also include features for developing a data master reference and/or other correlation/translation features to enable comparison of data sets from one platform to another or from one machine to another or from the same machine at different points in time.

Overview of Technology to which Technology Relates

Aspects of the invention relate generally to a method for analyzing biological specimens by spectral imaging to provide a medical diagnosis and/or other purposes. The biological specimens may be medical specimens obtained by surgical methods, biopsies, and cultured samples. The method may include obtaining spectral and visual images of biological specimens and registering the images to detect cell abnormalities, pre-cancerous cells, and cancerous cells, for example. The biological specimens may include tissue or cellular samples, but tissue samples are preferred for some applications. This method may identify abnormal or cancerous or other disorders including, but not limited to, breast, uterine, renal, testicular, ovarian, or prostate cancer, small cell lung carcinoma, non-small cell lung carcinoma, and melanoma, as well as non-cancerous effects including, but not limited to, inflammation, necrosis, and apoptosis.

Figure 1:
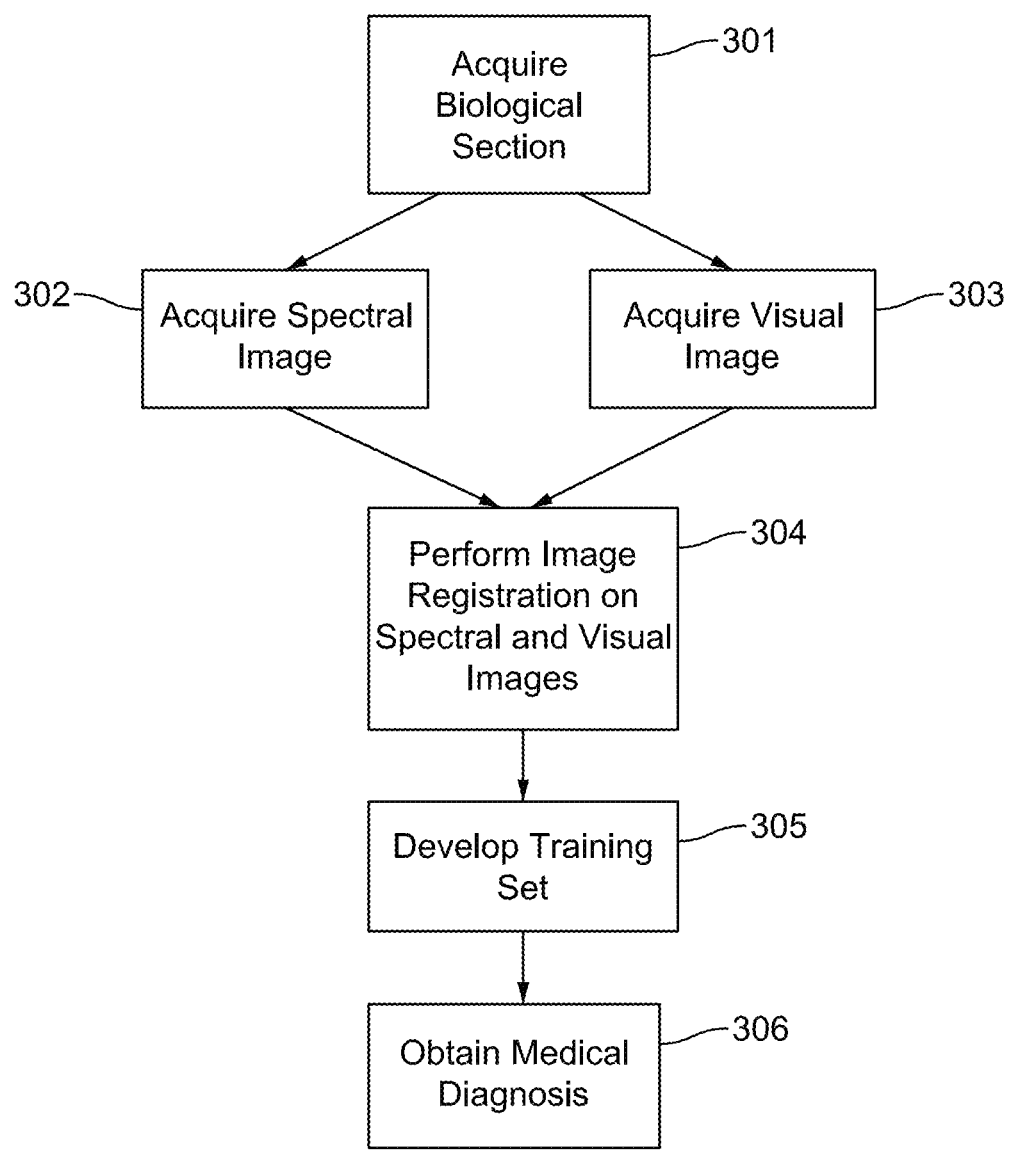
FIG. 1 is a flowchart illustrating a method of analyzing a biological sample by spectral imaging according to aspects of the invention.

A method for use in accordance with aspects of the invention is illustrated in the flowchart of FIG. 1. As shown in FIG. 1, a method usable with aspects of the invention generally includes acquiring a biological section 301, acquiring a spectral image of the biological section 302, acquiring a visual image of the same biological section 303, and performing image registration 304. The registered image may optionally be subjected to training 305, and a medical diagnosis may be obtained 306.

FIG. 2 illustrates an example high level flowchart of a method for providing analytical data and/or a medical diagnosis, for use in accordance with aspects of the present invention. In FIG. 2, according to various features usable in accordance with aspects of the present invention, the method may include taking a biological sample S402. The sample may be taken by a practitioner. The sample may, for example, include a microtome section of tissue from biopsies, a deposit of cells from a sample of exfoliated cells, or Fine Needle Aspiration (FNA).

A variety of cells or tissues may be examined. Such cells may comprise exfoliated cells, including epithelial cells. After a sample has been obtained, the method may include obtaining spectral data from the sample S404. For use in accordance with an aspect of the present invention, the spectral data may be obtained by the practitioner through a tunable laser-based infrared imaging system method, which is described in related U.S. Pat. No. 8,816,279. The data may be obtained by using an IR spectrum tunable laser, for example, as a coherent transmission source. The wavelength of IR transmissions from the tunable laser may be varied in discrete steps across a spectrum of interest, and the transmitted and/or reflected transmissions across the spectrum may be detected and used in image analysis. The data may also be obtained from a commercial Fourier transform infrared spectroscopy (FTIR) system using a non-laser based light source such as a globar, or other broad band light source.

One example laser in accordance with aspects of the present invention is a QCL, which may allow variation in IR wavelength output between about six and 10 μm, for example. A detector may be used to detect transmitted and/or reflected IR wavelength image information. In operation, with minimal magnification, a beam output from the QCL may suitably illuminate each region of a sample in the range of 10×10 μm for detection by a 30×30 μm detector.

In one example implementation for use in accordance with aspects of the present invention, the beam of the QCL is optically conditioned to provide illumination of a macroscopic spot (ca. 5-8 mm in diameter) on an infrared reflecting or transmitting slide, on which the infrared beam interacts with the sample. The reflected or transmitted infrared beam is projected, via suitable image optics, to an infrared detector, which samples the complete illuminated area at a pixel size smaller than the diffraction limit.

The infrared spectra of voxels of tissue or cells represent a snapshot of the entire chemical or biochemical composition of the sample voxel. This infrared spectra is the spectral data obtained in S404. While the above description serves as a summary of how and what spectral data is obtained in S404, a more detailed example of a disclosure of the steps involved in obtaining the data is provided in U.S. Pat. No. 8,816,279.

In addition to the spectral data, S404 may include collecting a visual image of the same biological sample. A visual image of the sample may be obtained using a standard visual microscope, such as one commonly used in pathology laboratories. The microscope may be coupled to a high resolution digital camera that captures the field of view of the microscope digitally. This digital real-time image may be based on the standard microscopic view of a sample, and may be indicative of tissue architecture, cell morphology, and staining patterns. The image may be stained, e.g., with hematoxylin and eosin (H&E) and/or other constituents, immunohistochemicals, etc., or unstained.

Furthermore, in addition to the above data, S404 may also include obtaining clinical data. Clinical data may include any information that may be relevant to a diagnosis including what type of cells are likely present in the sample, what part of the body the sample was taken, and what type of disease or condition is likely present among other diagnoses.

After the total data has been acquired by the practitioner, e.g., the spectral data, the visual image, and clinical data, among other data, the method may include transmitting the data to an analyzer. For example, the analyzer may have a receiving module operable to receive the transmitted data. The data may be automatically or manually entered into an electronic device capable of transmitting data, such as a computer, mobile phone, PDA and the like. For use with certain aspects of the present invention, the analyzer may include a computer located at a remote site having appropriate algorithms to analyze the data. The analyzer may include a computer located within the same local area network as the electronic device that the data has been entered into or may be on the same electronic device that the data has been entered into (i.e., the practitioner may enter the data directly into the device that analyzes the data). If the analyzer is located remotely from the electronic device, the data may be transferred to the analyzer via any known electronic transferring methods such as to a local computer through a local area network or over the Internet. The network layout and system for communicating the data to the analyzer is described in more detail below with respect to FIGS. 26 and 27.

Instead of the practitioner obtaining the data on the practitioner end and sending the data to the analyzer at a remote site, the sample itself may be sent to the analyzer. For example, the analyzer may have a receiving module operable to receive the sample. When the physical sample is sent to the analyzer, a practitioner operating the analyzer may instead obtain the spectral data. In this case, the biological sample may be physically delivered to the analyzer at the remote site instead of just spectral data being delivered. However, the practitioner may still provide the clinical data, when applicable.

After all of the desired data is acquired by the analyzer, the method may include performing processing via the analyzer to reconstruct the data into an image or other format, that indicates the presence and/or amounts of particular chemical constituents S408. The detailed disclosure involved in the processing to reconstruct the data is provided in more detail in U.S. Pat. No. 9,025,850.

As explained the '850 patent, when following the processing steps, an image may be produced, which may be a grayscale or pseudo-grayscale image. The '850 patent explains how the processing method provides an image of a biological sample this is based solely or primarily on the chemical information contained in the spectral data collected in S404. The '850 patent further explains how the visual image of the sample may be registered with a digitally stained grayscale or pseudo-color spectral image. Image registration is the process of transforming or matching different sets of data into one coordinate system. Image registration spatially involves spatially matching or transforming a first image to align with a second image. When the registration method is followed as explained in the '850 patent, the resulting data allows a point of interest in the spectral data to correspond to a point in the visual sample. The data allows a practitioner, via, e.g., a computer program, to select a portion of the spectral image, and to view the corresponding area of the visual image. The data allows a practitioner to rely on a spectral image that reflects the highly sensitive biochemical content of a biological sample, when analyzing the biological sample.

Alternatively, the data may be reconstructed into a format that is suitable for analysis via computer algorithms to provide a diagnosis, without producing an image.

After completing the processing in S408, the method may include returning the analytical data, image, and/or registered image to the practitioner, optionally via a system accessible to the practitioner S410. For example, the system may be the same device that the practitioner used to originally transmit the data. The data, image, and/or registered image (i.e., sample information) may be transmitted, e.g., electronically via the computer network described below. This operation may include for example, transmitting the sample information in an email or providing access to the sample information once the practitioner has logged into an account where the sample information has been uploaded. Once the practitioner has obtained the sample information at the system, the practitioner may examine the information to diagnose a disease or condition using computer software, for example.

In another aspect of the invention, instead of or in addition to returning an image and/or registered image to the practitioner, the data is further processed to diagnose a disease or condition (S412). For example, as explained in the '850 patent, the registered image may be analyzed via computer algorithms to provide a diagnosis. This process may include using a training set that has been utilized to develop an algorithm before the sample information was analyzed. The training set includes spectral data that is associated with specific diseases or conditions. The training set may be archived and a computer algorithm may be developed based on the training sets available.

For use with an aspect of the present invention, the practitioner has the option of using one or more algorithms via the computer system to obtain the diagnosis. For example, when the practitioner accesses the computer system containing the registered image, the practitioner may select algorithms based on training data provided by specialized clinics or laboratories. The computer system may have a selecting module that may select the algorithms to use for obtaining a diagnosis for the biological sample. The selecting module may receive, for example, user assistance or input parameters to aid in the selection of the algorithms. For example, if the practitioner has submitted a biological sample that is suspected to contain lung cancer cells, and a particular clinic already developed a training set and/or algorithm based on a variety of lung cancer samples, the practitioner may elect to run the biological sample using the clinic's lung cancer training set and/or algorithm. Optionally, the practitioner may elect to run multiple algorithms developed from different training sets, including different algorithms for the same type of disease or condition or different algorithms for different diseases. For example, the computer system may have a generating module operable to generate a diagnosis for the biological sample based upon the outcome of the algorithms applied to the biological sample. In yet another variation, the entirety of all available algorithms may be run, such as when there is no prior indication as to what type disease may be present in the sample. In one embodiment the practitioner may access and select algorithms at the practitioner's system, while the processing may occur at the remote site.

The processing of S408 may also include additional comparative data analysis. For example, after a sample has been analyzed, the system may store any desired sample information, to which future samples can be compared. The results of any particular sample may be compared against all other sample results that have been stored in this system. In some variations, any desired sample information may be compared only to other samples previously analyzed from a particular practitioner, or to samples from a particular patient, for example. Optionally, the practitioner may be alerted if the sample results are inconsistent with past results, and if so, a notification may be sent along with the results. The comparative analysis may also be performed against samples from other practitioners, and/or other clinics or laboratories, among other samples. Optionally, the comparative analysis processing may occur at the remote site.

The diagnosis and/or other relevant sample information may be provided to the practitioner. For example, the system may include a transmitting module operable to transmit the diagnosis and/or other relevant sample information for the biological sample to the practitioner. The practitioner may access the diagnosis via the practitioner's system. In an aspect of the present invention only the diagnosis is sent, preferably including an indication (e.g. a percentage value) of sample disease and/or what part of the sample is diseased, and what type of disease is present. In another aspect of the present invention, an image and/or registered image is provided along with the diagnosis information. Additional sample information can include statistical analysis and other data, depending on the various algorithms that were run. As discussed above, the delivery of diagnosis information may be carried out via, e.g., the computer system discussed below. Transmitting the results to the practitioner may also include alerting the practitioner that the results are available.

After the practitioner has received the data, and/or alert to access the data, the practitioner may review the results at S414. After the results have been reviewed, it may be determined that additional algorithms should be run against the sample. For example, if the practitioner is unable to determine the diagnosis with certainty, or if the practitioner is not satisfied with the algorithms that were already run, the determination may be made that additional algorithms should be run to provide a more accurate diagnosis. If the determination is made that additional algorithms should be run, the method may include performing additional diagnostic activity S416. In S416, using the computer system, different algorithms may be selected by the practitioner such as algorithms created by other specialized clinics or laboratories for the same disease or condition and/or algorithms for additional diseases or conditions. The updated diagnosis may then be delivered to the practitioner for review. S414 and S416 may be repeated until the practitioner is satisfied with the diagnosis. Once the practitioner is satisfied with the diagnosis, the method may optionally proceed to S418, and the practitioner may proceed to treat the patient based on the information obtained in the method.

Referring now to FIG. 3, illustrated therein is another example of various features of a more detailed method flow 100 for analyzing a biological specimen to provide a diagnosis, prognosis, and/or predictive classification of a disease or condition, for use in accordance with an aspect of the present invention. Method 100 may also be used for identifying sub-classifications of cancer, in accordance with an aspect of the present invention. In addition, method 100 may also be used for differentiation of normal tissue with respect to a cancerous lesion (e.g., a differentiation of normal tissue proximal to a cancerous lesion and normal tissue at a distal location from the cancerous lesion), for example.

The method may include receiving biological samples 102. Such biological samples may include tissue or cellular material from an individual, such as a human or animal. In an aspect, the system may have a receiving module operable to receive the biological sample. In another aspect, the system may receive data corresponding to the biological sample. For example, an individual may provide data corresponding to the biological sample to the system. The method may also include generating a spectral image of the biological sample 104. As shown in FIG. 3, the method may also include preprocessing and use in development of a type database or other repository of type data for use by the system.

Referring now to FIGS. 4A and 4B, illustrated therein is an example method flow 500 for preprocessing in accordance with an aspect of the present invention. The method may include loading initial IR image data 502. For example, the system may load IR image data received by the system and/or previously stored in the system. In an aspect, the system may convert the IR image data received into absorbance units and calculate spectral parameters.

The method may also include selecting binned data 504 and saving the dataset 506. In an aspect, the system may bin the image data to reduce the number of pixels. Reducing the number of pixels may, for example, enhance signal to noise or other characteristics in the data. For example, the system may load the image file using 2×2 binning options. In addition, the system may store the dataset into a data store.

The method may include removing any offset 508 and correcting for data minimum in select range(s) 510. For example, the system may remove any baseline offset from the spectral data by processing the data from frequencies in the range.

The method may include creating a grayscale image by integrating over select range(s) 512. In an aspect, the system may create the grayscale image dataset by integrating spectral intensities between certain limits). For example, a grayscale image may allow pixels with any significant infrared intensity to be viewed before any filters are applied to the image.

The method may also include loading water vapor correction 516. For example, the system may load water vapor correction information to apply to spectra to correct for water vapor effects in the spectral image data.

The method may include applying water vapor correction 514 and saving the dataset 518. In an aspect, the system may use Multiplicative Signal Correction (MSC) to correct for residual water vib-rotational contributions.

The method may include providing noise reference 520 and saving the dataset 522. In an aspect, the system may separate the image dataset into noise and signal regions. For example, the system may assign the black areas of the grayscale image to the noise regions, and assign the shades of grey to the signal region. In an aspect, the separation of the noise and signal regions may be based on an integration of any spectral feature between two limiting wavelengths. When the integration value in this range exceeds a minimum value in the signal, the noise spectra may be defined if the integrated intensity is between the two specified limits.

The method may include applying multivariate noise reduction 524. For example, the system may perform principal component analysis (PCA) on the noise spectra that may be used to order the eigenvectors of the spectra in an order of decreasing noise contributions and reconstruct signal spectra of the dataset as the sum of the eigenvectors.

The method may include verifying full range signal shape and power 530. The method may also include rejecting "bad" data (e.g., data falling outside the range between the minimum and maximum values) 532 and saving the dataset 534. In an aspect, the system may perform one or more quality tests to verify the signal shape and power. Quality tests may include, but are not limited to, peak frequency location, band shape, total signal intensity, and band area ratios. In an aspect, the system may perform a quality test based on peak frequency. In yet another aspect, the system may perform a quality test based on total spectral integrated intensity by integrating between certain limits. The integrated intensity may be required to fall between a certain minimum value and a certain maximum value. In another aspect, the system may perform quality tests based on spectral integrated intensity within certain limits. Integrated intensities may be required to fall between a certain minimum value and a certain maximum value. In an aspect, the system may perform quality tests based on a peak area ratio between amide I and amide II bands by integrating between certain limits. In an example implementation, intensity ratios may be required to be between a certain minimum value and a certain maximum value.

The method may also include reporting regional signal to noise 536 and saving the signal to noise values 538. The system may receive inputs to calculate the signal to noise of the data. The inputs may include, for example, the left and right margins of a baseline region of interest, the left and right margins of the signal region of interest, and the left and right margins of the noise region of interest.

The method may further include enhancing signal for class separation 560 and saving the dataset 562. In an aspect, the system may apply a smoothing derivative to smooth, for example, window width, order, and derivative. The system may also apply a normalization to enhance the signal for class separation.

The method may include selecting region of interest for phase correction and saving the dataset 566. For example, the system may expand a spectral region of interest between certain values and select the spectral region of interest for phase correction.

The method may include performing phase correction on the selected region of interest 568. Phase correction may include, for example, transforming the 512 data point $2^{nd}$ derivative spectral vector by a finite Hilbert transform (truncated FFT) and split into real and imaginary parts. In an aspect, the system may perform a coordinate transformation and a new spectral vector may be created. The system may select a phase corrected trial spectra with the highest frequency reference peak between a range of values as the corrected spectra. Phase correction is described in more detail in U.S. Pat. No. 9,025,850.

The method may also include selecting a region of interest for a classifier 574. For example, the system may expand the region of interest between a range of values.

The method may also include applying normalization 574. Normalization may include, but is not limited to, vector normalization, standard normal variate, and multiple regions. The system may apply a normalization to the region of interest.

The method may include clustering 576. For example, the system may also perform a clustering.

The method may create cluster images 578 and saving the dataset 580. The system may create and store cluster images.

The method may include different metrics 582 to create cluster images. These include correlating and distance calculations. The method may include generating a validation report 589. For example, the system may create clustering metrics and correlate the cluster image to known references. Clustering metrics may include, but are not limited to, k-means clustering and hierarchical cluster analysis (HCA). In addition, the system may generate a validation report.

Referring again to FIG. 3, the method for analyzing a biological specimen may further include receiving clinical information during the annotation process 110. In an aspect, the system may receive clinical information from a medical practitioner, an electronic medical record of a patient, or other data source, such as a data repository that may include clinical data. Clinical information may include, for example, any information that may be relevant to a diagnosis and/or prognoses, including the type of cells likely present in the sample, the part of the body from which the sample was taken, and the type of disease or condition likely present, among other diagnoses. In addition, clinical information may include a clinical "gold standard" for accepted practices for the current state-of-the-art. For example, clinical "gold standards" may include using stains on biological samples such as, but not limited to, immuno-histochemical (IHC) stains and panels, hematoxylin stains, eosin stains, and Papanicolaou stains. In addition, clinical "gold standards" may also include using a microscope to measure and identify features in a biological sample including staining patterns.

The method may also include receiving annotation information for the IR image 108. Annotation information may include, but is not limited to, any suitable clinical data regarding the selected annotation region, such as data that may be relevant to a diagnosis, including, for example, biochemical signatures as correlated to a feature of a type of cells and/or tissues that are likely present in the sample; staining grades of the sample; intensities; molecular marker status (e.g., molecular marker status of IHC stains); the part of the body from which the sample was taken; and/or the type of disease or condition likely present. In addition, the annotation information may relate to any measurable aspects on the visual image of the sample. The annotation information may also include, for example, a time stamp (e.g., a date and/or time when the annotation was created), parent file annotation identifier information (e.g., whether the annotation is part of an annotation set), user information (e.g., name of user who created the annotation), cluster information, cluster spectra pixel information, cluster level information, and number of pixels in the selected region, among other information relating to the annotation. It should be noted that the system may receive the annotation information from a user, such as a practitioner.

In an aspect, the user may select an annotation region of the registered spectral image and may provide the annotation information for the selected region. The user may use the system to select a region of the registered image that corresponds to a biochemical signature of a disease and/or condition. For example, the user may place a boundary around an area in the spectral image where the spectra of pixels of the spectral image appear to be generally uniform (e.g., the color in the area of the spectral image is mostly the same color). The boundary may identify a plurality of pixels in the spectral image that correspond to a biochemical signature of a disease or condition. In another aspect, the user may select an annotation region based upon one or more attributes or features of the visual image. Thus, the annotation region may correspond to a variety of visual attributes of the biological sample, as well as biochemical states of the biological sample. Annotation regions are discussed in more detail in U.S. Pat. No. 9,129,371. It should also be noted that the user may select an annotation region of the registered spectral image that does not correspond to a biochemical signature of a disease or condition.

In another aspect, the system may automatically or otherwise (e.g., with some user assistance or input parameters) provide the annotation information for the selected annotation region, as discussed in more detail in U.S. patent application Ser. No. 13/645,970. For example, the system may provide the date and time the annotation was created, along with the cluster information for the selected region. In addition, the system may automatically or otherwise select the annotation region of the registered spectral image and provide the clinical data (e.g., data that may be relevant to a diagnosis and/or prognosis, and classifications of a disease or condition) for the selected annotation region.

In an aspect, the system may review some or all of the cluster levels of the spectral image and may identify a cluster level where the spectral clusters of pixels are relatively uniform (e.g., a homogeneous spectral cluster of pixels with similar spectra, per a predetermined parameter). In an aspect, the system may present each homogeneous spectral cluster as a single color (e.g., blue for one cluster and red for a different cluster). The system may compare the identified cluster level with the cluster level for the selected annotation region of the spectral image, and, if the system determines that a match occurs, the system may determine that another level or cluster level should not be selected for the annotation region.

The method may include generating a true image 112. A true image may be, for example, a visual image of the biological sample that may include an annotation region. The visual image of the sample may be obtained using a standard visual microscope, such as of a type commonly used in pathology laboratories. The microscope may be coupled to a high resolution digital camera that captures the field of view of the microscope digitally. This digital real-time image may be based on the standard microscopic view of a sample, and may be indicative of tissue architecture, cell morphology, and staining patterns. The image may be stained, e.g., with hematoxylin and eosin (H&E) and/or other constituents, immuno-histochemicals, Insitu-hybridization (ISH), etc., or unstained.

Figures 5A, 5B, 5C:
FIG. 5A is a color Photostat of an example true image (the actual annotation) in accordance with an aspect of the present invention.
FIG. 5B is a color Photostat of an example of a SHP prediction image in accordance with an aspect of the present invention.
FIG. 5C is a color Photostat of an example of a confidence prediction image in accordance with an aspect of the present invention.
Figure 6C:
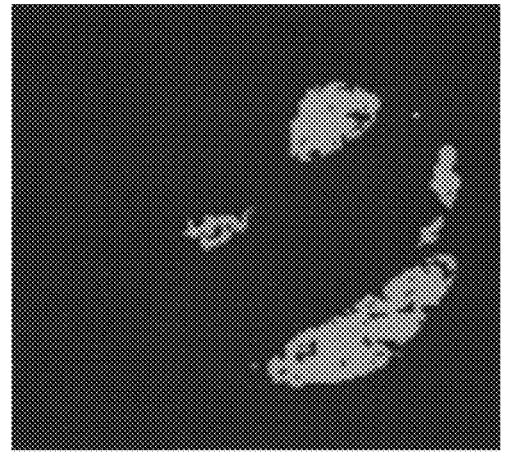
FIG. 6C is a color Photostat of an example image after a true positive/true negative and false positive/false positive analysis has been applied to a prediction image, in accordance with an aspect of the present invention.
Figure 6B:
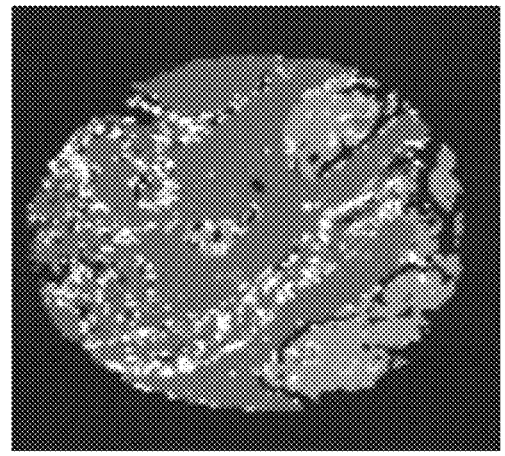
FIG. 6B is a color Photostat of an example of a prediction image in accordance with an aspect of the present invention.
Figure 6A:
FIG. 6A is a color Photostat of an example of a true image, based on pathology-based annotation, in accordance with an aspect of the present invention.
Figure 7:
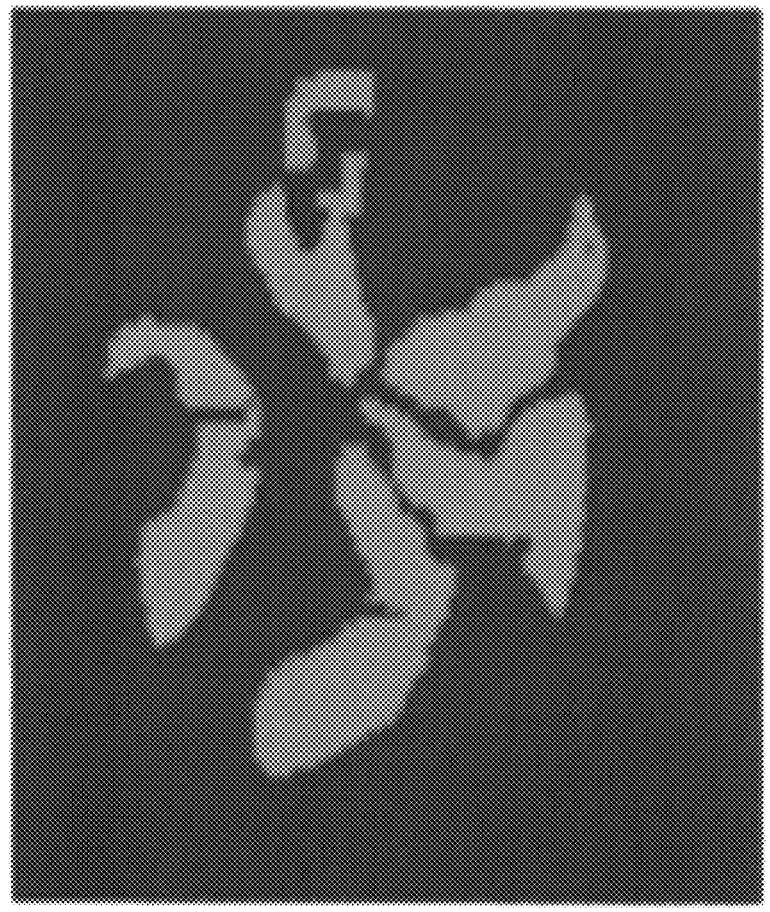
FIG. 7 is a color Photostat of an example true image in accordance with an aspect of the present invention.

Examples of true images are illustrated in FIGS. 5A, 6A, and 7. FIGS. 5A and 7 illustrate an image with Adenocarcinoma (ADC) cancer regions annotated in a biological sample. For example, the dark blue region of the image illustrates annotation regions in the biological sample, where a medical practitioner or other user has identified ADC in the biological sample. In addition, FIG. 6A illustrates a true image of an entire biological sample with regions of ADC identified in the biological sample (e.g., the blue regions of the image).

Returning to FIG. 3, the method may also include creating a classification model and training a classifier algorithm 114. The system may be used to train algorithms to provide a diagnosis, prognosis and/or predictive classification of a disease or condition, such as is described in a more detailed example in U.S. patent application Ser. No. 13/645,970. In addition, the system may be used to form one or more classification models for diagnosing diseases, as described in more detail in U.S. patent application Ser. No. 13/645,970. In an example aspect, a data repository may include a set of listed tissue or cellular classes. Classes may be derived from and may be listed, for example, to reflect expert opinions, group decisions, and/or individual and institutional standards. Thus, the algorithms used to provide a diagnosis and/or a prognosis or predictive analysis for a biological sample may be trained to implement expert practices and standards, which may vary from institution to institution and among individuals.

For example, the system may receive a query with one or more parameters for training, and testing features that may be correlated to a biological signature representative of the particular disease, condition, feature state, and/or class. The parameters may include, but are not limited to, a disease or condition type (e.g., lung cancer or kidney cancer), cell or tissue class, tissue type, disease state, classification level, spectral class, and tissue location, among other parameters. In an aspect, the system may receive the query and the parameters from a user of the system. In another aspect, the system may automatically or otherwise determine the parameters that should be used for the focused on a particular disease or condition. Thus, the training and testing features may be customized based upon the parameters received.

The system may extract pixels from the visual and spectral images stored in a data repository that correspond to the parameters for the training testing features. For example, the system may access the annotated images stored in the data repository, along with any suitable annotation information and/or meta-data corresponding to the annotated images. The system may compare the parameters of the query with the annotation information and/or meta-data of the annotated images. Upon a match occurring between the parameters and the annotation information and/or the meta-data, for example, the system may extract the pixels of the visual and spectral images associated with the parameters and form a training set of data. The pixels extracted for the training data may include pixels from different cells or tissues classes and/or tissue types. It should be noted that the pixels extracted from different tissue types may be stored as part of different testing features. Thus, for example, pixels from the same tissue type may be assigned to a single testing feature, while pixels from a different tissue type may be assigned to a different testing feature. In addition, the training data may include spectral data that is associated with specific diseases and/or conditions, and/or, for example, cell or tissue types (collectively, a "class"). Thus, the system may extract pixels of the visual and spectral images that may provide a meaningful representation of the disease or condition based upon the parameters provided for the training features, in order to provide a diagnosis, a prognosis, and/or predictive analysis of the disease or condition.

Verification tests may include, but are not limited to, quality tests and feature selection tests on the training set of data. In an aspect, the system may utilize the methodology (e.g., algorithm) created by the training set of data in conjunction with a testing set of data to verify the accuracy of the methodology or algorithm. The testing set of data may include biological samples that contain the particular disease or condition, along with biological samples that do not contain the particular disease or condition.

The system may verify the accuracy of the algorithm, for example, by determining whether the algorithm correctly identifies biological samples that contain the particular disease or condition and biological samples that do not contain the particular disease or condition. When the algorithm is able to correctly identify which biological samples contain the disease or condition and which biological samples do not contain the disease or condition, the system may determine that the accuracy of the algorithm is high. However, when the algorithm is not able to correctly identify which biological samples from the testing data contain the disease or condition or incorrectly identifies biological samples as containing the disease or condition, the system may determine that the accuracy of the algorithm is low. In an aspect, the results of the algorithm may be compared against an index value that may indicate the probability of whether the algorithm correctly identifies the biological samples. Index values above a threshold level may indicate a high probability that the algorithm correctly identified the biological samples, while index values below a threshold level may indicate a low probability that the algorithm correctly identifies the biological samples.

For example, upon the system determining that the accuracy of the algorithm is low, the system may refine the training set of data. The system may increase and/or decrease the number of pixels, for example, in order to increase the likelihood of statistically relevant performance of the algorithm. It should be noted that the number of pixels that are required for the training set of data may vary based upon the type of disease or condition the algorithm is trying to diagnose and/or the cell or tissue class selected, for example.

Upon the system determining that the algorithm has a high accuracy, the system may generate one or more trained algorithms to provide a diagnosis, a prognosis, and/or predictive analysis for the particular disease, based upon the testing features. It should be noted that a plurality of algorithms may be generated to provide such diagnosis, a prognosis, and/or predictive analysis for a disease, based upon the received parameters. For example, multiple algorithms may be trained to diagnose lung cancer, with each algorithm trained to diagnose a particular type of lung cancer, based upon different parameters that may be correlated and coupled to a biochemical signature representative of the disease or feature state, and class of the disease.

For example, the system may store the one or more trained algorithms in a data repository that also contains the annotated spectral and visual images, annotation information and/or meta-data.

The system may also be used to form one or more classification models for diagnosing diseases, such as is described in more detailed examples in U.S. patent application Ser. No. 13/645,970. For example, the system may combine various algorithms for diagnosing different forms of cancer (e.g., lung cancer, breast cancer, kidney cancer) to form one model for diagnosing cancer. It should be noted that the classification models may also include sub-models. Thus, the classification model for diagnosing cancer may have sub-models for diagnosing various forms of cancer (e.g., lung cancer, breast cancer, kidney cancer). Moreover, the sub-models may further include sub-models. As an example, the model for diagnosing lung cancer may have multiple sub-models for identifying the type of lung cancer that may be present in the biological sample.

In an aspect, the system may perform sub-typing of lung cancer by identifying main cancer types and benign, such as Benign, Small Cell Lung Cancer (SCLC), Adenocarcinoma (ADC), Squamous Carcinoma (SQCC) and Large Cell Lung Cancer (LCLC). The system may further identify sub-types of the main types of cancer identified and sub-types of the sub-types. Sub-types may include, but are not limited to, Lepidic, Acinar, Papillary, Micropapillary, Solid. In an aspect, the system may create one or more classification models for diagnosing diseases using the subtypes and types identified. For example, the system may classify the sub-types and types as classes of cancer in the classification models. The classes of cancer may be used in diagnosing a biological sample. In addition, the classes of cancer may be associated with therapy populations. Therapy populations may include, for example, appropriate therapies for a disease state. For example, the classes may be associated with a patient population that responds to a particular therapy for a disease state. As such, the system may use the classification models to provide recommendations for appropriate therapies (e.g. as a companion diagnostic modality, and in conjunction with literature data mining) to treat the disease identified in the class or sub-class.

In addition, the system may distinguish the disease types and sub-types from normal tissue (e.g., tissue presumed to have no relevant disease. The system may use the classes, for example, to distinguish heterogeneity of the biological sample.

Once the system identifies the various types and sub-types of cancer, the system may also identify variants of the types and sub-types. Variants may include modifiers that may occur along with any of the cancer types and histological subtypes, such as mucinous adenocarcinoma, colloidal, fetal (low and high grade) and enteric. In an aspect, the system may classify the variants as classes in the classification models.

Figure 8:
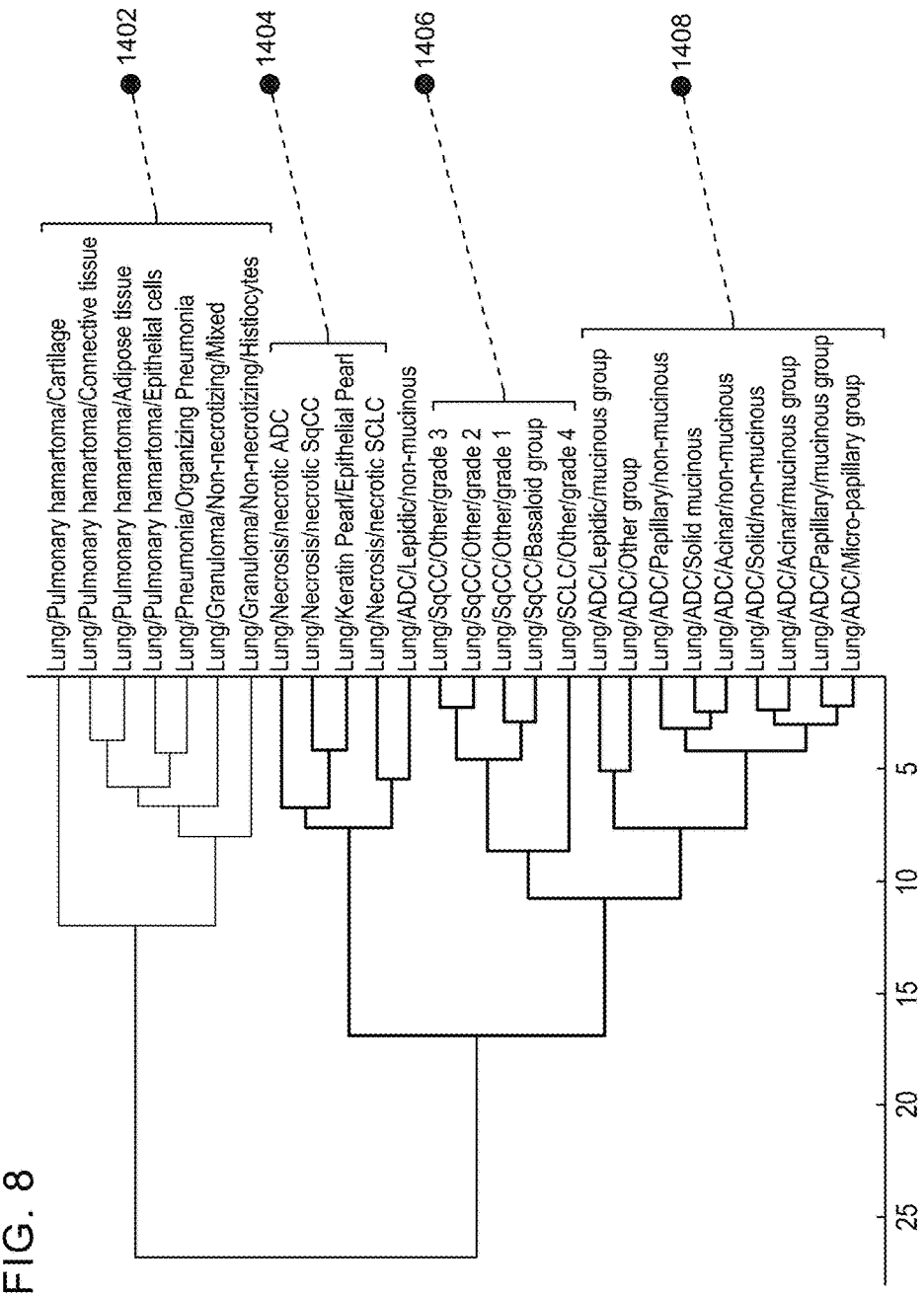
FIG. 8 illustrates an example rule set for determining a classification of lung cancer, which may indicate certain tissue conditions, classes or sub-types, in accordance with an aspect of the present invention.

FIG. 8 illustrates an example classification of benign and malignant tumors in accordance with an aspect of the present invention. FIG. 8 illustrates an example sub-classification of Lung/Pulmonary benign lesions of Hamartoma, Sarcoidosis (granuloma) and Organizing Pneumonia types (blue) cluster separation versus lung cancer tumor normal types (red). 1402 illustrates an example sub-classification of Benign separated by SHP. 1404 illustrates an example sub-classification of necrosis, keratin pearls, and lepidic. 1406 illustrates an example Squamous grades classified automatically by SHP. 1408 illustrates an example sub-classification of adenocarcinoma.

The system may establish a rule set for determining an order for applying the methodologies (e.g., algorithms) within the classification model. In addition, the system may establish a rule set for placing constraints on when algorithms may be used. It should be noted that the rule set may vary based upon the diseases and/or the number of algorithms combined together to form the models, for example. Upon the system establishing a rule set for the models, the system may generate one or more models for diagnosing the particular disease. It should be noted that, in addition to the above method, a variety of other methods may be used for creating a classification model for a particular disease or condition.

One example rule set for applying the algorithms within the classification model may include a variation reduction order, determined using hierarchical cluster analysis (HCA) or other clustering/segmentation methods. An example of HCA is described in detail in U.S. Pat. No. 9,025,850. As described in the '850 patent, HCA identifies cellular and tissue classes that group together due to various similarities. Based on the HCA, the most effective order of the iterations, or variation reduction order, may be determined. That is, the iteration hierarchy/variation reduction order may be established based on the least to greatest variation in data, which is provided by HCA. By using HCA, based on the similarity or variance in the data, it may be determined which class of tissue or cell should be labeled and not included in the subsequent data subset, in order, for example, to remove variance and improve the accuracy of the identification.

FIG. 8 illustrates an example rule set for determining a classification of lung cancer, where 1402, 1404, 1406, and 1408 may indicate certain tissue conditions, classes or sub-types, in accordance with an aspect of the present invention. In operation, when a practitioner or other user desires to know whether a sample contains one of the tissue or cellular classes listed, the method described above may be applied. That is, the iterative process may be repeated, as illustrated, until the desired result is reached. For example, the practitioner may choose to test a sample generally for cancerous cells or for a particular type of cancer. The conditions that are tested may be based on clinical data (e.g., what condition is most likely present) or by "blindly" testing against various conditions. The method disclosed herein increases the accuracy of the diagnosis, and in particular, increases the accuracy even when there is little or no information regarding which conditions are likely present. Moreover, the method disclosed herein may be used for prognosis and/or predictive classifications of a disease or condition.

Returning to FIG. 3, the method may further include generating prediction images 116. The system may apply the one or more classification models and/or one or more classifier algorithms trained using the classification models to a true image, and generate a prediction image. In addition, the system may apply the one or more classification models and/or classifier algorithms to a biological sample.

The method may include generating confidence prediction images 126. Confidence prediction images may include a confidence value illustrating a level of confidence that a particular class or sub-class of cancer may be present in the prediction image. For example, a higher confidence value may indicate that one or more diseases are present in the prediction image. A higher confidence value may also indicate that a particular disease is more developed. For example, the system may analyze the spectra from the prediction image and when the spectra signal is close to a center of a class of cancer, the confidence level may be high. In addition, a signal where the spectra from the prediction image is pure (e.g., the signal is not mixed with other spectra), the confidence level may be high.

In an aspect, a lower confidence value may indicate, for example, that one or more diseases may be present in the prediction image. For example, the system may analyze the spectra signal and may determine how close the signal may be to a center of a class of cancer. For example, signals that may be within a class of cancer, but farther away from a center of the class (e.g., may be on a boundary or fringe of the spectra for a class), may overlap with another class of cancer. As such, a confidence level that a particular class of cancer may be present in a biological sample may be low. In addition, signals that are farther away from a center of the class may indicate that the sample contains a new class of cancer, a different type of cancer, or a different sub-type of cancer. A lower confidence value may also indicate that the disease has not developed and/or may be a different type of disease.

In an aspect, the confidence value may be a number, for example, in a range from 1 to 10, where 1 is a low to no confidence and 10 is a high confidence. In another example, the confidence value may be a number between 0 and 1, where 0 is no confidence and 1 is high confidence. In an aspect, the system may use one or more prediction calculations to calculate the confidence value. Prediction calculations may include, but are not limited to, Platt Separation Plane, Random Forest, Baysian A-Priori Estimates, Artificial Neural Networks and LDA. It should be noted that a variety of prediction calculations may be used to calculate the confidence value.

In an aspect, the system may overlay a confidence value for each class or sub-class illustrated in the prediction image, and may generate a confidence prediction image illustrating the confidence value. For example, the confidence value may be represented in a binary manner, e.g., a white dot may be added to the image to represent a low confidence value, and no additional information may be added to the image with a high confidence value.

Another example may include a color scale to illustrate the confidence level. A lighter shade of a color or white may represent a low confidence value, while a solid color may represent a high confidence value.

Referring to FIG. 3, the method may also include generating a prediction report with confidence values 128. The prediction report may identify the classes and sub-classes of cancer identified in the biological sample and may provide a confidence value illustrating a level of confidence that a particular class or sub-class of cancer may be present in the prediction image. The prediction report may include, for example, true images, prediction images and confidence images, as illustrated in FIGS. 5A-5C and 7.

Referring to FIG. 3, the method may further include performing a difference analysis between the true image and the prediction image 118. In an aspect, the system may compare the true image of a biological sample with the prediction image of the same biological sample and determine any differences that may be present between the true image and the prediction image. Difference analysis may include, but is not limited to, comparing textures in the true image and prediction image, comparing the true image and the prediction image, comparing spectral variations (e.g., how much the spectra is changing, wide variation), identifying spatial locality differences (e.g., the areas of difference may be clustered together to make a larger region of a same color in an area, the areas of difference may be spread out in another color), IHC markers (for example, + or −), molecular markers (e.g., + or −), histopathology, and any other suitable meta data or clinical data (e.g., patient information). In an aspect, the system may apply one or more of the above mentioned difference analyses to the prediction image to identify regions of the prediction image that are different from the true image, without an explanation for the difference. By applying more difference analysis to the prediction image, the higher the possibility that the differences identified may be a new class of cancer.

For example, the system may compare the true image illustrated in FIG. 5A with the prediction image illustrated in FIG. 5B and determine whether any differences are illustrated. For example, the true image in FIG. 5A illustrates the biological sample as containing squamous cancer (e.g., the biological sample is the color blue). The prediction image illustrates the biological sample as containing both squamous cancer (the blue color sample) and adenocarcinoma (the magenta color sample). The system may determine that the magenta regions of the prediction image in FIG. 5B are different from the same regions in the true image.

Returning to FIG. 3, the method may include assigning region of interest pixels to a new class 120. In an aspect, the system may create an annotation region for the region of interest pixels, and assign the annotation region a new class based upon the difference analysis. For example, the system may determine that the magenta regions of the prediction image in FIG. 5B are different from the same regions in the true image in FIG. 5A, and may create annotation regions around the magenta regions of the prediction image to assign a new class. The method of FIG. 3 may proceed to annotation (108) where a medical professional may provide an annotation to the image, for example, indicating whether the biological sample contains the new class.

The method of FIG. 3 may include determining a true positive region of interest or true negative region of interest 122. For example, the system may identify pixels of the comparison image that include a true positive region of interest or a true negative region of interest. A true positive region may include, for example, a region of the comparison image where a true image indicates that a class of cancer is present in the true image (e.g., a medical professional annotated the true image with the class of cancer), and where the spectra from the prediction image indicate that a class of cancer is present in the prediction image. A true negative may include, for example, a region of the comparison image where a true image of the biological sample indicates that a class of cancer is not present in the true image (e.g., a medical professional annotated the true image to indicate a class of cancer is not present in the true image), and where the spectra from the prediction image indicates that a class of cancer is not present in the prediction image.

An example of a prediction image with true a positive region is illustrated in FIG. 6B. For example, FIG. 6A illustrates a true image of a biological sample with SqCC+ identified in the blue regions. FIG. 6B illustrates a prediction image for the same biological sample identified in FIG. 6A, with true positive regions where the prediction image also identifies SqCC+ in the same regions identified in the true image. For example, the blue regions in the prediction image may correspond to the blue regions in the true image.

Returning to FIG. 3, the method may also include determining any false positive region of interest and any false negative region of interest 124. In an aspect, the system may identify pixels of the comparison image that include a false positive region of interest or a false negative region of interest. A false positive region of interest may include, for example, a region in the comparison image where the true image indicates that a class of cancer is not present in the true image and the spectra from the prediction image indicates that the class of cancer is present in the prediction image. A false negative region of interest may include, for example, a region in the comparison image where the true image indicates that a class of cancer is present in the true image and the spectra from the prediction image indicates that the class of cancer is not present in the prediction image.

An example of a prediction image with a false negative region is illustrated in FIG. 6C. For example, FIG. 6C may illustrate a prediction image for the same biological sample illustrated in FIG. 6A. The false positive regions illustrated in FIG. 6C may include the green regions indicating that Necrosis may be present in the biological samples, where the true image, FIG. 6A, only illustrated SqCC+ in the same regions.

Returning to FIG. 3, the method may further include selecting a region of interest in the confidence prediction image based on confidence values 130. A region of interest may include regions in the sample that are well differentiated, but where there may be a low confidence level for the type of class or sub-class identified in the biological sample. In addition, a region of interest may also include regions in the sample that are poorly differentiated, but where there may be a high confidence level in the spectra signal. For example, a region of interest may include a plurality of colored pixels indicating a strong spectra signal for a different class from the true image, located in a poorly differentiated area of the image. In an aspect, the system may receive identified false negative regions of interest and false positive regions of interest and may identify the region of interest by inserting a boundary around the region of interest, such as a circle, a grid, an outline, or other forms of boundaries.

The method may also include assigning region of interest pixels to a new class 132. The system may create an annotation region for the region of interest pixels and assign the annotation region a new class or sub-class. The method may proceed to annotation (108), where a medical professional may provide an annotation to the image indicating that the biological sample may contain the new class, or other methodology (e.g., algorithm) may be applied.

As such, the confidence images may be used adjectively to aid in providing a diagnosis, prognosis, and/or predictive classification of a biological sample. In addition, the confidence images may be used to drive areas of interest for micro-dissection of a biological sample. For example, regions of interest identified in the confidence image may be used to identify changes in the gene expression of a biological sample.

It is within the scope hereof that the aspects of the present invention may be applied to any particular cell or tissue class, whether cancerous or non-cancerous. When the iterative process is applied, the most accurate results may be achieved when the first iteration analyzes the original specimen data set for the broadest cell or tissue class and, with each subsequent iteration, analyzes the resulting specimen data subset for a narrower cell or tissue class. It is also within the scope hereof that the result of any given iteration may be provided or outputted to indicate which portion of the data is associated with a particular condition. For example, if the first iteration is cancer analysis, the method may proceed to a second iteration of the cancerous data, but may also provide or output information regarding the portion of the data that was found to be non-cancerous.

Improvements and New Developments

In view of the above, aspects of the present invention relate to systems and methods of classifying a biological sample. The systems and methods may include receiving an image of a biological sample and applying one or more algorithms from a data repository to the image. The systems and methods may include generating a classification of the biological sample based on the outcome of the one or more algorithms applied to the image. The systems and methods may include transmitting the classification for presentation on a display or via another medium. Further, the systems and methods may include features for developing a data master reference and/or other correlation/translation features to enable comparison of data sets from one platform to another or from one machine to another or from the same machine at different points in time.

More specifically, for example, aspects of the present invention provide various features relating to training sets, which may include applying a threshold to contiguous and/or scattered pixels. In this context, as explained further below, a "minimum rule" may be applied to training datasets to adequately represent disease and tissue type classes by selecting the optimal minimum quantity of patients and pixels. Further, an oversampling rule may be applied to balance a class in multiclass classification algorithms after the "minimum rule" is applied. In addition, a "minimum detection" rule may be applied to set the threshold quantity of predicted pixels present when making a prediction call.

In another aspect of the present invention, a probability threshold may be applied to adjust accuracy either improving or lessening accuracy or lowering sensitivity while increasing specificity and vise versa.

Yet another aspect of the present invention relates to reporting heterogeneity by applying thresholds, probabilities, and/or oversampling of underrepresented data. In accordance with aspects of the present invention, complex tissue analysis may be accomplished.

Aspects of the present invention further relate to addressing the fact that training set composition has a large effect on accuracy of algorithms. To provide consistency, efficiency of calculations (e.g., use of time), and improvement of algorithm performance, among other advantages, a minimum training sets size may be selected to achieve a representative composition for a class. One approach, in accordance with aspects of the present invention, is to set the optimal training set size so as to control the feature number and to report with this showing the robustness of the selected training set as a function of feature number with the minimum number of features required being preferred over including additional features without corresponding performance gains. Another way is to show robustness by the number of pixels and another is by indicating the number of patients represented. All three ways could be combined as well.

Yet another aspect of the present invention involves displaying training set metrics when comparing one algorithm to another for clinical use. For example, in accordance with aspects of the present invention, accuracy of training sets may be reported with validity and verification metrics. For example, accuracy may be reported versus patient/sample count, versus pixel count and versus feature count. Further, a graphical report comprised of statistical metrics and data set attributes may be generated. The source of the data may be represented in such report, including the source of annotations and images, which may be provided to detail the substance and pixel level location, as well as contribution and claims with respect to the reported values output by algorithms, models and other analysis.

In accordance with aspects of the present invention, models, algorithms, annotations, training and/or test sets may be labeled and/or branded with the validation source to provide additional weight to validity of outcomes and claims and to direct the use of the output, for example the output confidence level in the accuracy of a classification or a collection of images. Further, annotated data may be provided as a reference to allow a user to place outcomes in context with clinical data used to train algorithms and/or build models used to classify unknown samples or the characterize the composition of a cohort of samples. The annotation data may enhance value and confidence, as representing key opinion leaders by name or by institution association. In this way, the combination of visual/spatial representation of reference data and name association of the label source or sample source used for annotation is able to provide quantitative and objective verification of the source of predictions and class associations made.

In accordance with aspects of the present invention, sample collections may serve as cohorts curated for specific associations and/or properties. For example, the cohort may represent a clinical trial collection of patients, samples, and/or outcomes. Methods and systems in accordance with aspects of the present invention may identify heterogeneity and characterize complex tissue spatially, objectively, and quantitatively in samples and within collections of samples gathered as cohorts for analysis.

Other aspects of the present invention relate specifically to detecting necrosis, which may be isolated in a sample. In accordance with aspects of the present invention, necrosis may be identified by a specified method and used as a landmark of later stage disease conditions, including the presence of cancer cells or connective tissue that may have responded to therapy causing cell death.

Yet another aspect of the present invention involves methods and systems for detecting immune cell activity and/or response, inflammatory conditions and secretions. Aspects of these methods and system are usable to to differentiate among benign, cancerous and inflammatory conditions. Because such conditions may have a variety of causes, such as secretions from adjacent cells indicating a disease condition, immune cell activity changes, or an immune response to a disease condition and/or a therapy applied.

Yet another aspect of the present invention relates to tumor microenvironment characterization and/or detection. Microenvironments are often important for targeting patient therapies, and when used for detection of chemical changes, may aid drug design, clinical trial evaluations, and assessing responses to therapies. Similarly, for example, a microenvironment in a tumor within a sample could indicate a prognostic condition. Aspects of the present invention present methods and systems that are sensitive to such features of microenvironments.

Yet another aspect of the present invention relates to improvements in annotation of pixels that may be exported from a database or other repository of disease conditions, tissue types, and spectral signatures. The database or other repository thereby serves as an information hub for subsequent classifiers, training, and test datasets, which may be used, for example, for creating predictions, correlations, and reports.

Yet another aspect of the present invention relates to methods and systems for testing when applying IR spectral data. Such methods and systems for testing and analysis may be applied at several levels. These levels may include pixel (lowest), disease type or subtype (medium), and whole-sample and whole image (highest). Unknown samples may be compared one or all levels. Comparison methods and systems may be performed, for example, using algorithms, models (collections of algorithms), and/or by correlative analysis (e.g., cluster analysis).

Yet another aspect of the present invention relates to methods and systems for providing increased or decreased spectral resolution (e.g., by binning or unbinning), as function of classification performance. In some aspects, spectral resolution serves as a variable factor that may increase performance. For example, decreasing spectral resolution, while enhancing signal to noise, may provide a method for improving a classification dataset either for training prediction machine algorithms or for use in correlative analysis. In this example, the method applies second derivative analysis to optimize feature representation and to provide the working dataset used to establish a minimum number of features. Raw data (as opposed to second derivative analysis) is also usable in a similar way.

Yet another aspect of the present invention relates to methods and systems for establishing minimum pixel count to optimize performance and minimize computation time. Another approach to achieving more optimal datasets (e.g., the datasets that achieve preferred cost, time and outcomes) may involve minimizing the number of pixels required (e.g. some quantity less than the entire amount). For example, in one example analyses, the use of 2000 pixels, rather than 20,000 pixels, may be sufficient to produce an analysis performance plateau. Further, performance improvements may be made if optimization decisions and data quality are represented visually and included as part of a report to further enhance confidence in the predictions and classification results received by a user.

Yet another aspect of the present invention involves use of IR spectral signatures to act as a "key field" in a relational structure across multiple and otherwise independent "gold standards." IR datasets, which correspond to chemical and biochemical images, may be applied for prognosis and data mining in spatial and feature domains using landmarks and "gold standard" images as correlates. Gold standards may include, for example, H&E, Immunohistochemistry (IHC), In-situ-hybridization (ISH), and/or region laser micro-dissection (LMD). Such gold standard IR datasets may serve as input to genomic and proteomic analysis, molecular analyses, and spatially resolved MALDI. Reverse mapping may be implemented to produce results of non-spatial analysis (next generation sequencing, PCR and other molecular tests), which may result in a spatial report by associating the results to IR pixels originally harvested by mapping regions in a sample.

In yet another aspect of the present invention, Tissue Micro Arrays (TMAs) may be used as a primary research format for pharmaceutical research, drug development, clinical trial management, and outcomes analysis. Advantages of the use of TMAs may include applicability to many disease conditions, patients and/or samples on a single slide. Such methods may be applied so as to rapidly analyze large cohorts for similarity and difference analysis through data sets extracted from a database used to create virtual TMAs (visual arrays of images and outcomes), and the cohorts may be used in intra- and inter-sample analysis (e.g., using methods and systems discussed in U.S. Patent Appl. No. 62/204,340). In addition, weights may be applied to variables, for example, in a multiclass analysis where heterogeneity and tissue complexity are factors, and sensitivity and specificity factors may be discounted or emphasized by applying importance weighting. This approach may include, for example, applying positive or negative values so as to indicate include or exclude certain outcomes in an accuracy calculation and/or a reported outcome.

Yet further aspects of the present invention include features for developing a data master reference and/or a correlation/translation algorithm or other function that enables equating of data sets from one platform to another or from one machine to another or from the same machine at different points in time so as to enable standardizing of IR signatures for use to define and describe clinical representation of disease states, types and tissue features within and among samples. For example an IR biomarker acquired from a sample to affect clinical decision-making may be used as the basis for standardizing and making independent variable platforms and machines. In this regard, the methods and systems may include various features for making instrument data independent of the platform (individual instrument supplier make and model) and the machine used to acquire the data. The methods and systems may further be used to maintain data quality on a single instrument, such as when the instrument changes due to normal use and aging, by providing feedback used to set performance parameters and to adjust for variation that may not be easily dealt with through parameter changes.

In one example implementation, it is noted that currently a reference standard is the use of Paralyne-C deposited on a gold coating, which is deposited on a glass substrate. The substrate may comprise any materials suitable for applicable laboratory conditions. For example, the substrate may comprise a metal. Alternatively, a biological or other synthetic material may be used, so long a reproducibility of a spectral signature is achieved as a natural property of the reference.

Among other advantages, differences in detector technology affecting outputs may be addressed through such methods and systems. In one example implementation, a method for such standardization may include the following: 1) data acquisition; 2) machine specific spatial data treatment; 3) raw data preparation and/or pre-processed data preparation; 4) data added to database or other data repository; 5) data compatibility function applied so as to normalize or otherwise adjust data from a first source to be similar to the form of that data being obtained from a second source having known parameters; 6) data similarity metrics are calculated (e.g., binary correlation, cluster membership verification) 7) a report/automatic acceptance/rejection is generated; 8) the adjusted data may be used, such as in an analysis of a sample.

As a further example of a feature of this aspect of the present invention, a data compatibility function may be derived from for data set A and B using a standard reference data set for platform/machine A and platform machine being used B. Data may be merged or combined for analysis after applying the data compatibility function so as to adjust the data from machine A to be similar to data that would be produced by machine B and/or vice versa. In this regard, a binary comparison may be applied to verify data translation performance. Further, non-linear as well as linear effects of platform and machine may be treated by an appropriate compatibility function. In accordance with aspects of the present invention, broad adoption, use and reproducibility of results across platforms, machines and laboratories may be achieved by use of a data compatibility function in accordance with various features of these methods and systems. Such adoption may be enabled, for example, by the use of the reference spectral standard used to characterize localized variance attributable to machines and platforms independent of the biological sample being analyzed. Further, other optical factors, such as resolution differences, may be similarly addressed by such methods and systems, including, for example, by image registration and interpolation between mismatched instrumentation platforms and machines.

In view of the various features described above, the following example implementation in accordance with aspects of the present invention and test results are noted with respect to features relating to analysis of necrosis. The mechanism of action of SHP may be understood from the biophysics and spectroscopic properties of the biochemical components of cells. All molecules—whether small inorganic or very large biochemical ones—respond to infrared radiation in a predictable and thoroughly understood fashion: infrared radiation is absorbed by molecular vibrations at specific infrared "colors" (wavelengths) to produce relatively complicated "infrared spectra" that are specific "fingerprints" of the molecules. Infrared spectra collected form an individual cell, or a tissue pixel, thus are a superposition of all molecules' individual fingerprints spectra.

Infrared spectral features of biomolecules are affected by the conformation (shape), hydration, oxidation state and many other physical effects. For proteins, for example, it is well known that the same protein can exhibit different infrared spectral patterns when the protein is found in different secondary or tertiary structures, that is, when it is denatured, precipitated or hydrated/dehydrated. In apoptosis and necrosis, proteins unfold from their native conformation; the partially unfolded proteins tend to form aggregates of mostly β-sheet structures and tend to precipitate, or become insoluble. The change from native protein structure to the unfolded aggregates causes an enormous change in the infrared spectral patterns; thus, this change is readily observed. Consequently, SHP is a highly sensitive tool to detect necrosis.

Figure 9:
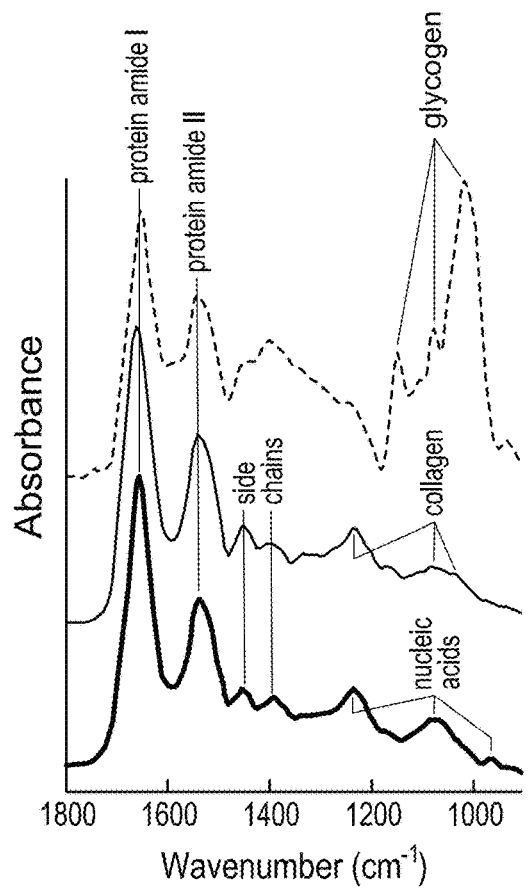
FIG. 9 provides a graphical representation of examples of mid-infrared spectra of different tissue classes, in accordance with aspects of the present invention.

Other spectral markers of disease that can be detected by SHP may have to do with changes in the metabolome, or changes in lipids or mucous, and so forth. Such changes are observed in several regions of the infrared spectra: for example, carbohydrate metabolites and glycoproteins such as mucin have vibrations well separated from those of the protein backbone. Of all these signatures, the changes in the protein spectral region may be the most significant for SHP. This importance may, in part, be due to the fact that proteins are by far the most abundant cellular components and comprise about 65% of the dry weight of cells and tissues. Furthermore, changes in protein composition tend to vary the spectral pattern observed in the protein-specific bands in the infrared spectra. See FIG. 9, which provides examples of mid-infrared spectra of different tissue classes. In FIG. 9, the top curve reflects superficial squamous tissue; the middle curve reflects fibre-connective tissue; and the lower curve shows β-lymphocytes. The three spectra curves are offset along the absorbance (Y) axis for clarity.

In particular, the "amide I" vibration of proteins, observed at about 1650 cm$^{-1}$ (6.06 μm) in the infrared spectrum, is the most sensitive indicator of protein structure. In the spectral plots shown in FIG. 9, the amount of light absorbed (the "absorbance") is plotted on the ordinate axis against the inverse of the wavelength (or "wavenumber"), measured in reciprocal units of length, such as cm$^{-1}$. The spectral region, marked in FIG. 9 as "protein amide I", exhibits similar spectral features for the three tissue types shown in FIG. 9, but quite different features for the four major protein conformations, α-helical, β-sheet, turns, disordered and other helical structures. This conformational sensitivity is due to long range dipolar coupling of individual peptide linkages (mostly the C=O bond stretching motion of the peptide linkage), which produces highly delocalized vibrational states (known as "exciton" states) that are sensitive to changes in the geometry of proteins.

FIG. 9 depicts typical infrared spectra of several different tissue types. The top trace is from the superficial layer of squamous tissue that is known to accumulate glycogen which exhibits three sharp absorption peaks between 1000 and 1200 cm$^{-1}$, due to C—O stretching and C—O—H deformation motions. These peaks are superimposed on the protein spectral signatures, consisting of the "amide I" and "amide II" regions, and a few peaks due protein side groups.

The middle trace of FIG. 9 depicts an infrared spectrum of connective tissue, which is dominated by the spectral features of collagen, a triple-helical protein of repeating Pro-Pro-Xxx sequences. Collagen exhibits a very characteristic infrared absorption pattern in the 1000-1250 cm$^{-1}$ spectral region that can further be enhanced by converting the spectra to second derivatives (see below). Finally, the bottom trace shows the infrared signature of metabolically highly active cells such as B-lymphocytes, which exhibit distinct nucleic features in addition to the protein peaks observed in the other traces. In general, the spectral differences between tissue types are much smaller than the ones shown in FIG. 9, and require mathematical procedures for detection and interpretation. With the exception of necrosis mentioned above, it is unlikely that large conformational changes occur within a cell when it transitions from normal to cancerous states. However, the abundance of proteins with different structural motifs are likely to change, as proteomic studies have revealed, and this change in overall protein composition is sampled by infrared spectroscopy. In order to enhance the sensitivity of the spectral measurements, the observed spectra may be converted to their second derivatives; this process collapses the width of the peaks and enhances the appearance of shoulders and deflections. In this manner, minute changes in protein composition may be detected. These compositional changes, in general, may not be linked to the up- and down-regulation of a single protein by infrared spectroscopic method, but they rather manifest themselves by changes in the spectral envelopes that contain a snapshot of the total cellular composition, and changes therein.

Thus, SHP provides an integrated view of the averaged compositional change in a cell or tissue spot, in separate spectral "bands" for proteomic, metabolomics and genomic changes. The spectral changes between normal tissue types, and between normal and cancerous tissues may need to be decoded in order to utilize spectral information as class indicators. In principle, this decoding may be accomplished by any of several approaches. One approach may include definition, for example, of cancer reference spectra by selecting regions with unambiguously defined cancer types, and classifying any unknown sample spectrum by comparing it successively against all cancer reference spectra. The reference spectrum with the agreement may determine the classification result. Another approach may include decomposing the observed spectra into combinations of a few "basis spectra", such as several proteins, nucleic acids, sugars, etc. This method may have the disadvantage that the omission of a reference compound spectrum in the spectral decomposition can produce unpredictable and erroneous results. In another example approach, self-learning mathematical algorithms may be trained to find recurring spectral changes and associate them with disease. This approach is describe in further detail below. This method may have the advantage that these algorithms scan the training spectra for significant spectral differences that are correlated with the desired outcome. Spectral regions of low correlation with the outcome may be ignored. By carefully training these algorithms, and applying established rules of machine learning and bio-informatics, highly reliable and reproducible algorithms may be established.

All spectroscopic studies described herein were carried out on low emissivity' (low-e) slides (see, e.g., Kevley Technologies, Chesterfield, Ohio) that are reflective toward infrared radiation, but are nearly totally transparent to visible light; thus, the same tissue section can be used both for infrared data acquisition and, after appropriate staining, for visible image acquisition for classical histopathology. The fact that the visible and infrared images were obtained from the same sample permits accurate registration of the two images. This step is necessary for accurate annotation of spectral features in this example method. Slides for spectral data acquisition may be de-paraffinized using standard procedures and maintained in a desiccator when not used.

Figure 10:
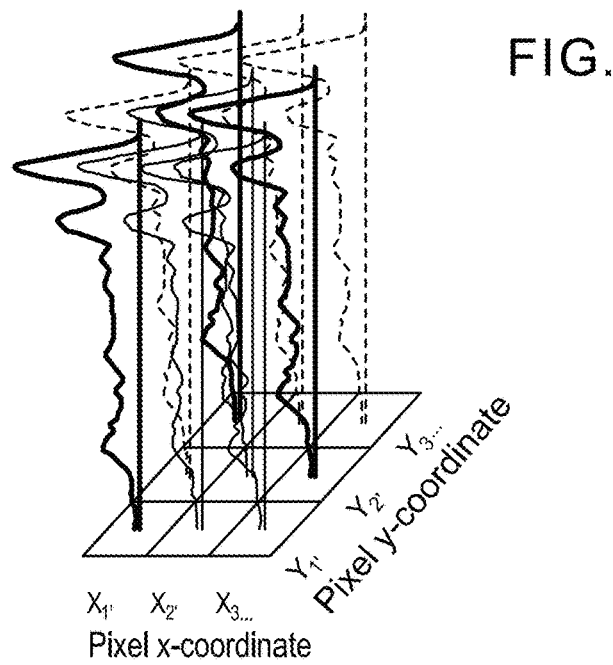
FIG. 10 shows a graphical representation of infrared spectral images acquired as "hyperspectral datasets" or "spectral hypercube," in accordance with aspects of the present invention.

Infrared spectral images were acquired as "hyperspectral datasets" or "spectral hypercube" as shown in FIG. 10. Conceptually, each tissue sample is divided into thousands of individual pixels, measuring about 6.25 µm on edge. From each pixel, an entire infrared spectrum may be collected in a wavelength range between about 2.5 µm (4000 cm$^{-1}$) and 14.28 gm (700 cm$^{-1}$). Thus, the raw spectral hypercube for an approximately 1.8 mm diameter tissue spot may include nearly 100,000 pixel spectra, each containing 1650 intensity data points at constant abscissa spacing of 2 cm$^{-1}$. Of these spectral vectors, the "fingerprint" region between 800 and 1800 cm$^{-1}$ may be used, for example, for tissue classification.

Infrared spectral hypercubes for each tissue spot were collected using a PerkinElmer (Shelton, Conn., USA) model SpectrumOne/Spotlight 400 imaging infrared micro-spectrometer. This instrument incorporates a 16 element cryogenically cooled infrared HgCdTe detector array; thus, spectra from 16 pixels were collected simultaneously. Data acquisition and storage required about 1 hour for each tissue spot. The entire instrument, including the optical path of the microscope, was purged with dry (−40° dew point) air to reduce atmospheric water vapor interferences.

Figure 11:
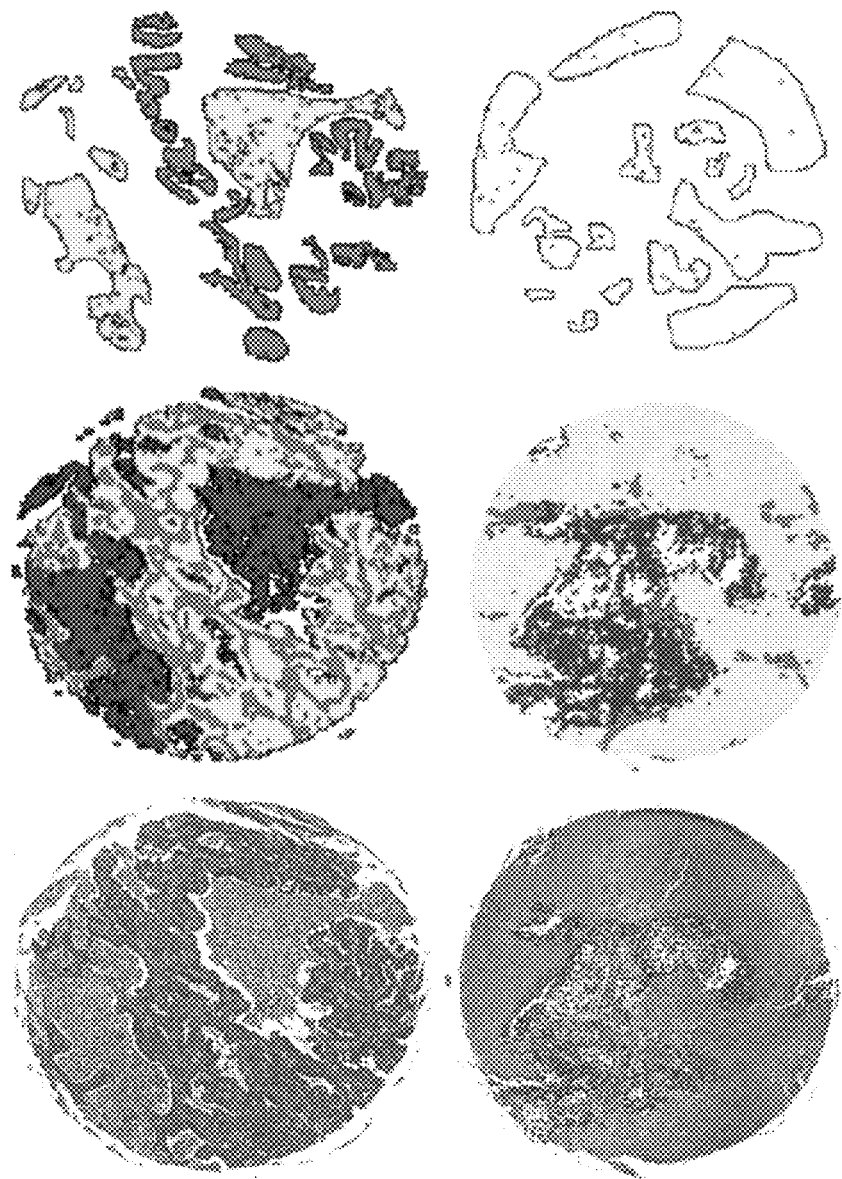
FIG. 11 show example HCA-based pseudo-color images of tissue spots, with the middle column showing the stained tissue spot, the left column showing the corresponding visual image, and the right column showing a semi-transparent overlay of the visible and infrared images, in accordance with aspects of the present invention.

After infrared data acquisition, the tissue sections were stained using hematoxylin/eosin (H&E) and following standardized and validated methods (see FIG. 11). After coverslipping, the tissue sections were imaged using an Olympus (Center Valley, Pa.) BX51 microscope equipped with a computer-controlled microscope stage with linear stepping motors (0.1 µm resolution). Images were taken via a Qimaging (Surrey, BC, Canada) model QICAM high resolution digital camera. The microscope was operated using Media Cybernetics [Rockville, Md., USA] Image Pro Plus software. The tissue spots were imaged at 20× magnification, producing large mosaic visual image data files at sufficiently high spatial resolution for pathological interpretation. Registration of the slide position for visual and infrared microscopy was aided by mounting the slides in a specially designed and manufactured slide holder that was equipped with three reticles whose positions in the particular microscope table were read and recorded at 0.1 mm accuracy.

Each tissue spot produced about $10^5$ individual pixel spectra, which were pre-processed as follows. First, the size of hyperspectral data cubes was reduced by a factor of four by co-adding four individual pixel spectra into a new spectrum with better signal-to-noise ratio, but larger pixel size, 12.5 µm on edge. The resulting set of about. 25,000 pixels per tissue spot was corrected for confounding contributions such as noise, water vapor and resonance Mie (R-Mie) scattering (via a phase correction algorithm). In order to enhance the sensitivity of spectral methods toward specific changes of protein abundance, the broad and often unstructured raw spectra were converted to second derivatives. This process is known to reduce the half width of spectral bands, thereby providing better discriminatory power which provides for the ability to classify different tumor types. These second derivative spectra are the primary information obtained in an SHP experiment, and the task at hand is the decoding and correlation of the spectral information with the pathological diagnosis.

Figure 12:
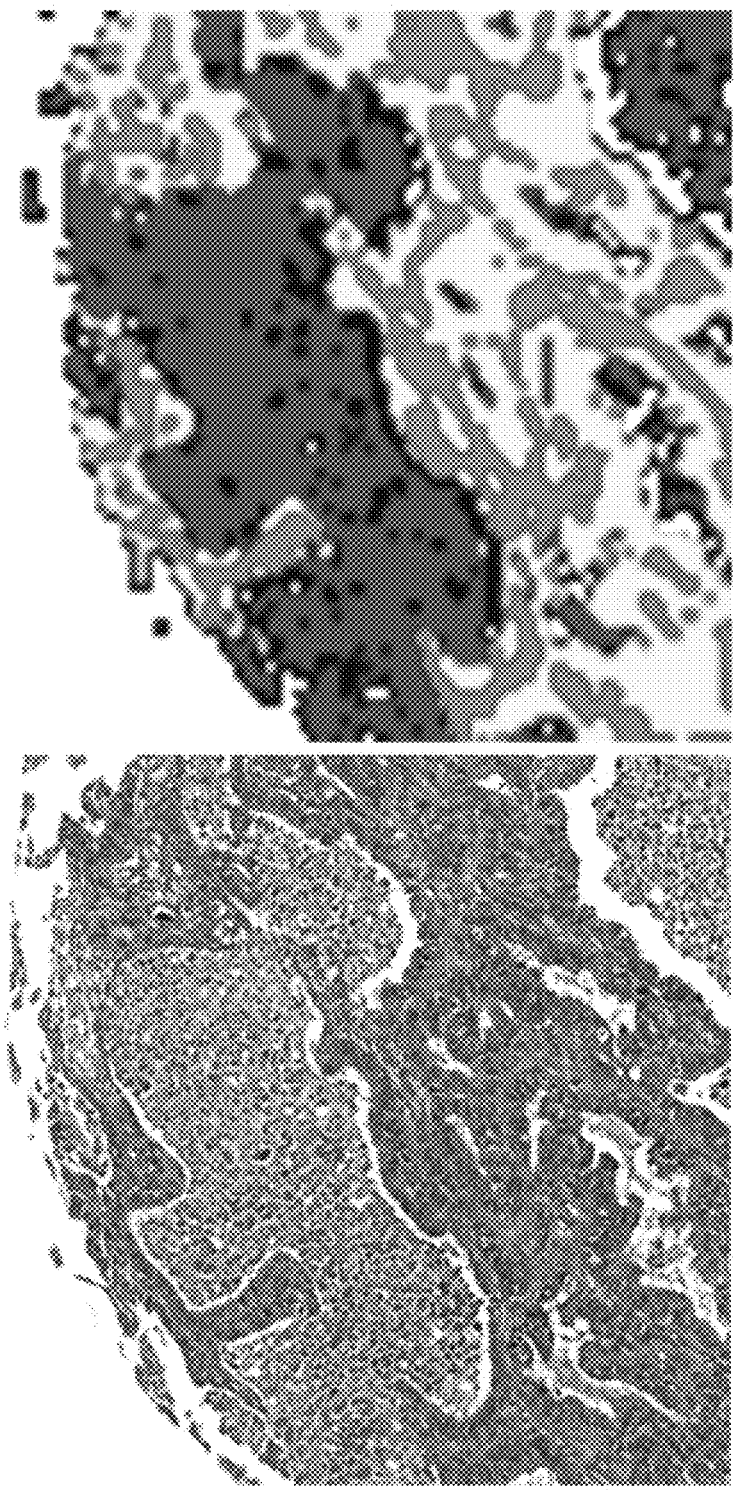
FIG. 12 shows a magnified view of a portion of the ADC sample shown in the top column of FIG. 11.

The pre-processed hyperspectral datasets for each of the tissue spots were subsequently converted to pseudo-color images by hierarchical cluster analysis (HCA). This approach provides a method to extract recurring patterns in datasets; in this particular application, HCA was used to segment the dataset into groups of high spectral similarity and homogeneity, and to present these groups as pseudo-color displays. Typical HCA-based pseudo-color images of tissue spots are shown in FIG. 11 (middle column), whereas the left column shows the corresponding visual image of the stained tissue spot. In the HCA images in the middle column, regions of the same color represent similar spectra. Visual inspection of FIG. 11 immediately reveals a spatial correspondence between the IR pseudo-color image and the H&E-stained image. This correspondence becomes even more obvious at higher magnification of the visual image: FIG. 12 shows a magnified view of a portion of the ADC sample shown in the top column of FIG. 11. In FIG. 12, the red regions in the infrared pseudo-color map represent tissue areas richer in connective tissue that appear pinkish in the H&E stained visual image. These red areas were excluded from the ADC tissue class in the annotation step, per further discussion below.

It should be noticed that this pre-segmentation step described above is completely unsupervised in the sense that it does not requires any input from a pathologist. The HCA images represent the inherent ability of infrared spectral imaging to detect differences in tissue composition by the spectral signatures. At this point in the method, no diagnostic information is available from the infrared images; in order to achieve diagnostic and/or prognostic capabilities, regions of clearly defined normal tissue types and disease states may be identified from the images shown in FIG. 11. Subsequently, spectra associated with these regions may be extracted and entered into a database from which algorithms are trained to associate spectral features with pathological diagnosis. This step is referred to as "annotation" and is described in further detail below. Subsequently, unknown datasets may be analyzed for the occurrence of the disease-specific spectral signatures.

The annotation process may correlate unambiguously assignable tissue areas from the H&E stained visual images with corresponding regions of the pseudo-color infrared image, and permit extraction of the spectra from the selected regions in the infrared images. To this end, a semi-transparent overlay of the visible and infrared images may be created (e.g., automatically), using image registration methods, such that the tissue features still can be perceived, but are displayed on a color background that corresponds to the HCA clusters. This operation may be performed equally well for the tissue microarray spots or the large biopsy tissue sections. Within this cluster, an expert, such as a pathologist, may select areas that represent the most typical histological regions of a diseased or normal tissue type. Each area may be tagged with a code that identified disease state or tissue types. This result is shown in the right column of FIG. 11. In FIG. 11, the regions that represent ADC and were selected by the pathologist are shown in purple, whereas the selected necrotic tissue regions are shown in green. In the SCLC sample, the annotated SCLC regions are shown in yellow. The annotation software ascertains that each contiguous area selected by the pathologist corresponds to one HCA cluster only, and eliminates pixels that did not conform to the majority assignment within one selected area. The number of selected areas in FIG. 11 is typical for an annotated tissue spot, and yielded, on average, about 1400 pixel spectra for each tissue spot, corresponding to about 350 cells. This later assessment was based on an estimate of a cell's size (ca. 25 µm in diameter) and the aggregated pixel size (12.5 µm on edge).

In the dataset of about 550,000 annotated pixels (see Table I below), each pixel spectrum is uniquely defined and traceable to the tissue micro-array name (e.g., LC706), the particular section, the individual tissue spot identified by row and column (e.g., C 3), and the coordinate of the pixel spectrum. In this example, this coordinate is uniquely defined by the pixel X, Y address, and the pixel size. The pixel X, Y address was referenced against reticle positions in the slide holder. Each annotated pixel spectrum, in addition, was tagged with a code that identified the pathology diagnosis. Thus, any pixel spectrum may be relocated and traced, and may be compared to the corresponding region of the visual image that was used for annotation.

TABLE I

Number of pixel spectra, processed spectra and annotated spectra in entire dataset

| | |
|---|---|
| Total spectra: | ~39 × $10^6$ (388 spots, ~100,000 spectra per spot) |
| Processed spectra: | 4 × $10^6$ pixel spectra (2 × 2 pixel averaging and elimination of blank pixels) |
| Annotated spectra: | 5.5 × $10^5$ spectra |
| Annotation regions: | 9.3 × $10^3$ annotation regions |
| Annotation regions/spot: | 24 regions/spot (average) |
| Pixels/annotation region: | 60 pixels (average) |
| Main tissue types: | 168 (54 malignant, 114 normal classes) |

The predominant diagnosis from the annotating pathologist, in general, agreed with the diagnosis obtained via methods in accordance with the present invention. The annotation yielded pixel spectra in over 160 classes that were subsequently combined into 26 major tissue types/disease classes by similarity analysis, using graph partitioning methodology. These graphs clearly demonstrate which of the classes were so closely related that they could be combined into larger groups by minimizing the connection between classes. These groups were referred to herein as Groups A (10 normal tissue types); Group B: (necrotic ADC, necrotic SqCC, and keratin pearl); Group C: (SCLC and necrotic SCLC); Group D: SqCC (3 grades) and Group E: ADC (8 sub-types).

All computations were carried out on a Dell workstation equipped with a 12-core Intel processor and 56 GByte memory, running 64 bit Windows operating system. This workstation was connected to a server with 20 TByte hard drive space and cloud backup. All computations were carried out in MATLAB version R2013.b (The Mathworks, Natick, Mass.) using scripts developed in accordance with aspects of the present invention. The scripts and input datasets are archived for each of the "studies" carried out, where each study was defined by a distinct aim, result and contributing data subsets.

The most salient features of the final algorithm and procedure utilized are summarized below:
  Support vector machines were used for the classification task due to their high reproducibility and more easily understood mode of action
  The entire spectral vector of 501 second derivative data points (spanning the range from 800 to 1800 $cm^{-1}$) was used for classification. The range below 800 $cm^{-1}$ did not contribute to the overall accuracy and was ignored. Feature selection (that is, eliminating certain spectral features in the 800 to 1800 $cm^{-1}$ range) reduced classification accuracy and was not implemented.
  2000 pixel spectra per disease or tissue type class were selected randomly for algorithm training. The classification accuracy did not improve by using more pixel spectra, but the computation time increased significantly. If there were fewer than 2000 spectra in one of the classes, 'oversampling' was applied: in oversampling, spectra were repeatedly used in the training set, rather than reducing the number of spectra in the larger classes ('undersampling').
  The final SVM utilized a radial kernel or basis function (rbf). Two parameters, "c" (penalty weight on misclassification error) and "γ" (width of the radial basis kernel) were optimized by varying them independently from 0.000061 ($2^{-14}$) to 0.031 ($2^{-5}$) for γ and 0.0625 ($2^{-4}$) to 32 ($2^5$) for C. This approach resulted in an optimized SVM that yielded an accuracy of 92.4±0.85% for a benchmark data set consisting of ca. 190,500 training spectra and 48,600 test spectra in the five major classes listed above. As indicated in the bullet point above, 10,000 spectra were randomly selected from these datasets; repeated training/test processes yielded results that were found to lie within the expected confidence interval limits (see further discussion below).

Figure 13:
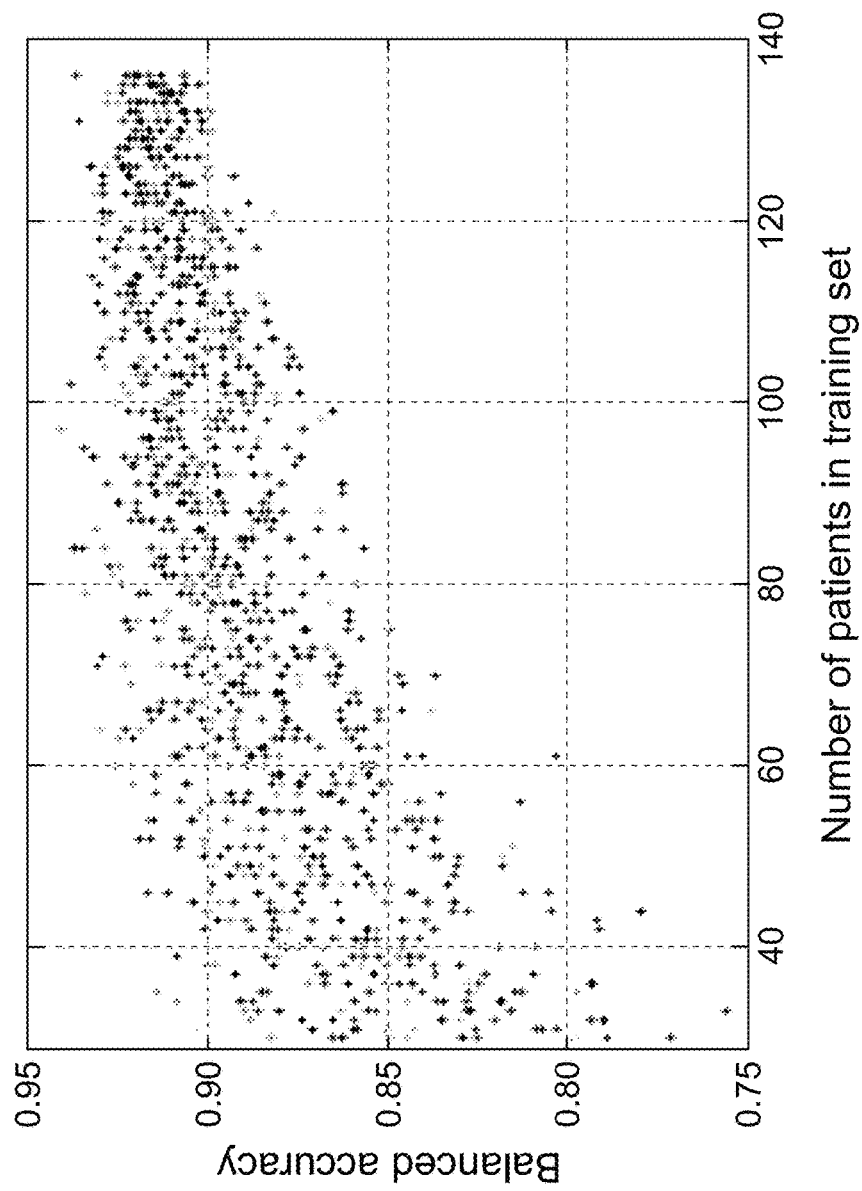
FIG. 13 shows a graph of simulation of accuracy and confidence interval as a function of patient number in the training set, in accordance with aspects of the present invention.

Confident intervals (CI) were computed as follows. Ten independent SVM training and test runs were carried out by randomly selecting 10,000 training spectra from the entire training dataset. These 10,000 training spectra were selected from the five classes of interest (NOR, NECR, SCLC, SqCC and ADC) with 2000 spectra per class. The number of patients contributing to the 2000 spectra was varied from 30 to 135 but the size of the training set was held constant at 10,000. The results of this simulation are shown in FIG. 13. The overall accuracy increases, as expected, as the number of patients in the training set increases, from about 85 to over 90%, and the scatter in the accuracy for ten independent runs decreased by a factor of about five. The CIs also were obtained by analytical methods and agree very well with the simulations.

FIG. 13 shows a graph of simulation of accuracy and confidence interval as a function of patient number in the training set, in accordance with aspects of the present invention. Each symbol in the graph represents one training/test result for 10,000 pixel spectra randomly selected from the number of patients indicated.

The results of this simulation also suggest that the annotation method often yields hundreds or thousands of individual pixel spectra for each annotated spot produces a representative sampling of tissue homogeneity and patient-to-patient variance. This result is in contrast to other cancer diagnostic methods that yield one data point per patient whereas in SHP, thousands of data points are created for each patient.

Finally, the data were analyzed using both standard SVMs and probability-based Platt-SVMs. In the latter, the classifier reports probability limits (e.g., 0.1 and 0.9) that a pixel belongs with about 90% probability to class A, whereas a pixel with below about 10% probability most likely belongs to class B (with about 90% probability). Pixels between 0.1 and 0.9 probability are considered "unclassifiable." This approach reduces the total number of classified pixel spectra, but increases the probability that those remaining were classified correctly.

The overall goals of the study include confirmation of the reliable distinction between normal (NOR) and diseased tissue, the distinction between necrotic (NECR) and cancerous tissue, and between small cell lung cancer (SCLC) and non-small cell cancers (NSCLC). Furthermore, the latter category was to be distinguished into squamous cell lung cancer (SqCC) and adenocarcinomas (ADC) which themselves had several grades and/or subclasses.

Figure 14A:
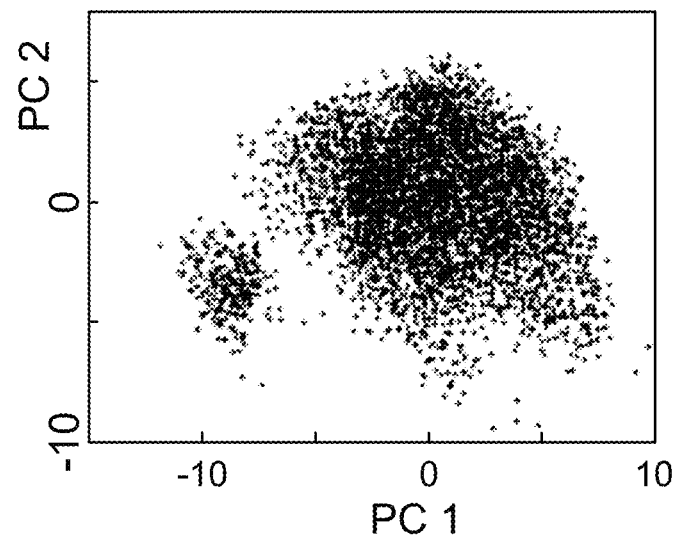
FIGS. 14A and 14B show a graphical representation of a principal component analysis (PCA) 'scores plot' for all spectral vectors in a given spectral class (FIG. 14A), and the same information represented by the approximately 95% confidence ellipsoids for each patient, along with the center of the ellipsoid (FIG. 14B), in accordance with aspects of the present invention.
Figure 14B:
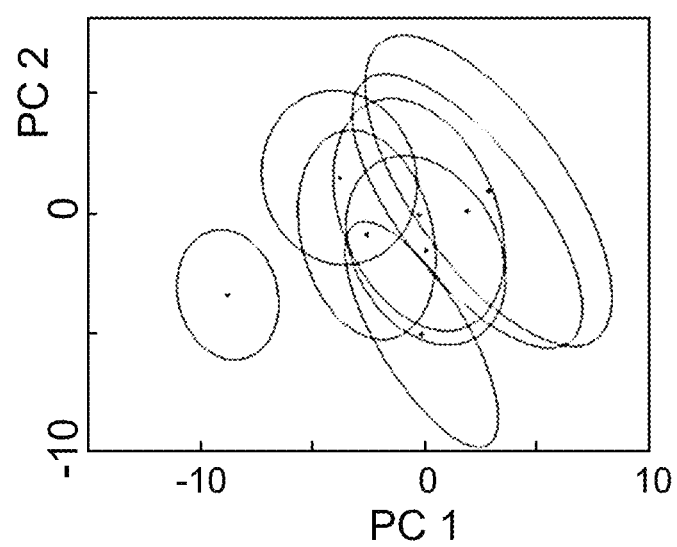

The heterogeneity within the spectral classes may be appreciated by inspection of FIGS. 14A and 14B, which represent a principal component analysis (PCA) 'scores plot' for all spectral vectors in a given spectral class (left panel), and the same information represented by the approximately 95% confidence ellipsoids for each patient, and the center of the ellipsoid. Clearly, for this class, one patient exhibits quite different spectral features as compared to the other seven patients. It was not clear whether the one outlying patient represents a slightly different disease profile that is detected by SHP, or whether the annotations placed two different disease stages into the same class.

Aside from eliminating pixel spectra with poor signal-to-noise ratio (shown as the black regions in the HCA plot of FIG. 12), all spectra were included in training and validation subsets, with the following caveat: we required that at least three patients and 400 pixel spectra were represented in a tissue class before it was allowed to be analyzed.

Of the approximately 550,000 annotated pixel spectra (see Table I), 219,422 from 173 patients were in the training set and 256,729 from 196 patients were in the test set. Of those pixel spectra, 216,767 were in the 26 subtypes for which sufficient patients/pixels were represented in the classes (see the criteria above) and 246,725 in the test set (see Table II). It should be noted that both the training and test set were from annotated regions; that is, data from the blinded test set had been processed and annotated as described before. However, these data were never used in the training process of the classification algorithm to avoid over-fitting of the data. The blinded datasets were processed and annotated as well, in order to allow the accuracy of the classifier to be assessed.

TABLE II

Summary of Training and Testing Datasets

| | Number of patients | Number of annotated pixel spectra | Number of annotated pixels in 26 major |
|---|---|---|---|
| Training | 173 | 219,422 | 216,767 |
| Test | 196 | 256,729 | 246,725 |

Three different approaches were used to analyze this dataset for this example implementation. One approach is referred to herein as a "pixel-based" test, in which the algorithm was trained, as indicated above, with 2000 pixel spectra from each of the 26 subgroups, which fall into the five major classes of tissue types (Groups A-E) listed above. If the number of spectra in one of the 26 tissue classes was below 2000, an oversampling strategy was applied as described in the discussion of the final algorithm above. This test samples the global agreement of all annotated areas from patients in the test set with the diagnosis rendered by the annotating physician.

The second approach of the analysis is referred to herein as "full spot test." In this test, the agreement between the SHP diagnosis and the whole spot diagnosis was determined. Here, the criteria were set such that the predominant SHP cancer prediction had to agree with the pathology diagnosis, and that at least 400 pixels (100 cells) had to be detected by SHP to conform to this diagnosis. Thus, this test ascertained that SHP does not miss a cancerous sample, and properly diagnoses the major cancer type.

The final approach was an image-based representation of the results from the "full spot test", in which the agreement between the annotated regions for each patient sample was compared to the SHP prediction via a "label image", discussed further herein.

This test was carried out ten times, with different random selection of 52,000 training spectra in the 26 subgroups. The balanced accuracy, established by using each training model to classify the spectra in the test set) varied by less than about 1% for the consecutive runs, indicating that the training spectra sampled the variance in the dataset adequately. The results of the 26 sub-groups were subsequently combined into the major five classes for which the results are shown in Table III:

TABLE III

Pixel-based sensitivity, specificity and balanced accuracy for test dataset

| Class | Sensitivity | Specificity | Balanced accuracy |
|---|---|---|---|
| Normal | 98.0% | 97.2% | 97.6% |
| Necrosis | 78.8% | 83.9% | 81.4% |
| SCLC | 95.9% | 82.8% | 89.4% |
| SqCC | 83.2% | 86.0% | 84.6% |
| ADC | 82.2% | 84.0% | 83.1% |

The average of the balanced accuracy classification is 87.2%. The major source of disagreement appears to be the classification of necrosis, which has a low sensitivity, particularly in the case of samples with SCLC and necrosis, where SHP diagnosed many necrotic pixels as SCLC. This result brings up the question of how sharp the distinction between necrosis on one hand, and SCLC with necrosis on the other can be drawn in solid tumors for which the interior can exhibit serious hypoxia.

The average balanced accuracy may be improved substantially by implementing the Platt-SVM approach discussed further above. By eliminating low probability pixels (by raising the Platt threshold to 0.75), the balanced accuracy may be improved from 87.2% to over 91%, while reducing the number of classified pixels from 256,729 to 202,579 (an 18% reduction of the pixel number). When the Platt threshold was raised to 0.9, the balanced accuracy improved to 93.2%, with a concomitant reduction of the diagnosed pixels to 191,608 (a 22.4% reduction of pixel number). The lower probability pixels appear mainly to be due to two causes: low signal-to-noise data at the edges of tissue, and low patient number in some of the tissue subclasses that reduced the statistical significance of the spectral analysis.

A total of 188 patient samples were included in the full spot test set after removing some duplicate tissue spots from the same patient. As pointed out before, this test required that the major diagnostic category from the diagnosis results was properly reproduced, with at least 400 pixels agreeing with this diagnosis. Tables IV to VII summarize results from some of these analyses: due to the large size of the overall dataset, only 10 spots from each class were reported. In Tables IV-VI, the following format was followed. Column 1 contains the tissue spot identifier, as discussed above. The next five columns list the number of pixel spectra diagnosed by SHP, where the red background denotes normal, green necrosis, yellow SCLC, blue SqCC and purple ADC diagnoses. The seventh column indicates the diagnosis results, and the final column the SHP/pathology correlation, where TN designates true negative, TP true positive, FN false negative and FP false positive results. In Table IV, for example, sample spot LC701_A001_0408 has 33 NECR and 73 ADC misdiagnoses, which are randomly scattered over the tissue spot, and fell below the 400 pixel threshold. Thus, this tissue spot was diagnosed as true negative, in accordance with the pathology results.

TABLE IV

Partial full spot results for normal tissue samples

| 'LC701_A001_020' | 2206 | 2 | 1 | 0 | 0 | NOR | TN |
|---|---|---|---|---|---|---|---|
| 'LC701_A001_020' | 1313 | 0 | 0 | 0 | 0 | NOR | TN |
| 'LC701_A001_020' | 2570 | 0 | 2 | 0 | 2 | NOR | TN |
| 'LC701_A001_020' | 2808 | 0 | 0 | 0 | 0 | NOR | TN |
| 'LC701_A001_020' | 1255 | 4 | 0 | 0 | 3 | NOR | TN |
| 'LC701_A001_020' | 763 | 0 | 0 | 0 | 1 | NOR | TN |
| 'LC701_A001_030' | 718 | 0 | 0 | 0 | 0 | NOR | TN |
| 'LC701_A001_040' | 429 | 0 | 0 | 0 | 1 | NOR | TN |
| 'LC701_A001_040' | 3641 | 33 | 0 | 1 | 73 | NOR | TN |
| 'LC701_A001_050' | 1712 | 0 | 6 | 0 | 0 | NOR | TN |

TABLE V

Partial full spot results for SCLC tissue samples

| 'LC703_A001_050' | 858 | 0 | 69 | 9 | 1 | SCLC | TP |
|---|---|---|---|---|---|---|---|
| 'LC703_A001_050' | 69 | 13 | 3657 | 1 | 441 | SCLC | TP |
| 'LC703_A001_010' | 26 | 24 | 4496 | 15 | 0 | SCLC | TP |
| 'LC703_A001_030' | 414 | 1 | 5420 | 0 | 0 | SCLC | TP |
| 'LC703_A001_040' | 69 | 1 | 5983 | 1 | 2 | SCLC | TP |
| 'LC703_A001_040' | 14 | 5 | 7318 | 454 | 8 | SCLC | TP |
| 'LC703_A001_050' | 167 | 0 | 5891 | 0 | 0 | SCLC | TP |
| 'LC811_A072_060' | 26 | 0 | 1403 | 0 | 0 | SCLC | TP |
| 'LC811_A072_060' | 3 | 3 | 4006 | 1 | 1234 | SCLC | TP |
| 'LC811_A072_061' | 0 | 258 | 595 | 0 | 369 | SCLC | TP |

TABLE VI

Full spot misclassification results

| 'LC701_A001_0105' | 3768 | 0 | 512 | 5 | 178 | NOR | FP |
|---|---|---|---|---|---|---|---|
| 'LC702_A001_0401' | 773 | 113 | 5091 | 9339 | 42 | ADC/NECR | FN |
| 'LC702_A001_0404' | 538 | 166 | 8695 | 2156 | 42 | ADC/NECR | FN |
| 'LC702_A001_0204' | 2707 | 65 | 5523 | 1552 | 3646 | ADC/NECR | FN |
| 'LC811_A072_0307' | 0 | 48 | 374 | 73 | 471 | SqCC | FN |
| 'LC704_A001_0304' | 58 | 4622 | 1 | 374 | 428 | SqCC/NECR | FN |
| 'LC702_A001_0106' | 123 | 2 | 8116 | 8 | 2 | SCLC/NECR | FN |
| 'LC702_A001_0303' | 905 | 0 | 5264 | 0 | 1 | SCLC/NECR | FN |
| 'LC702_A001_0503' | 1236 | 32 | 10360 | 6 | 10 | SCLC/NECR | FN |

Similarly, Table V lists 10 representative samples with SCLC. The fourth column contains most of the entries. The second column entries are not misclassifications, but areas diagnosed as normal by the pathologist. Spot LC811_A072_0610, for example, lists 258 NECR pixels, and 369 ADC pixels; since both are below 400 and the SCLC count is at 595, this sample was categorized as TP.

Finally, Table VI lists all misclassified (FP and FN) tissue spots. The total number of misclassifications, 9/188 or 4.8% is quite small; however, of these, a number are borderline cases. The FP diagnosis, for example (LC701_A001_0105), properly identified the majority of pixels as normal, but the number of SCLC misclassifications (512) exceeded the threshold of 400 pixel spectra. Similarly, the three last entries in Table VI identified the major cancer correctly, but failed to detect a sizeable fraction of necrotic pixels. This result is in line with the discussion above that indicated that the SHP tends to underestimate necrosis in mixed NECR/SCLC samples. Furthermore, Table VI indicates that necrosis presents some difficulties in the case of mixed NECK/ADC as well. Table VII summarizes the full spot results in terms of sensitivity and specificity. Here, Table VIIA presents the sensitivity and specificity of the full spot test for all nine misclassifications listed in Table VI, whereas Table VIIB lists sensitivity and specificity when samples LC702_A001_0106, LC702_A001_0303 and LC702_A001_0503 (see Table VI) were included as true positives since the cancer was identified correctly.

TABLE VII

Sensitivities and specificities of the full spot analyses including and excluding, respectively, the samples for which SCLC was classified correctly, but necrosis was missed.

| A | | | | |
|---|---|---|---|---|
| Cancer | 148 | 8 | 94.9% | Sensitivity |
| Normal | 1 | 31 | 96.9% | Specificity |
| B | | | | |
| Cancer | 151 | 5 | 96.8% | Sensitivity |
| Normal | 1 | 31 | 69.9% | Specificity |

From spectroscopic and biochemical viewpoints, necrosis presents a major change in cellular structure and biochemical composition: the changes in protein conformation alone distorts the amide I spectral region (see Section B) so severely that smaller changes, such as the ones distinguishing ADC and SqCC, may get overwhelmed.

Figure 15:
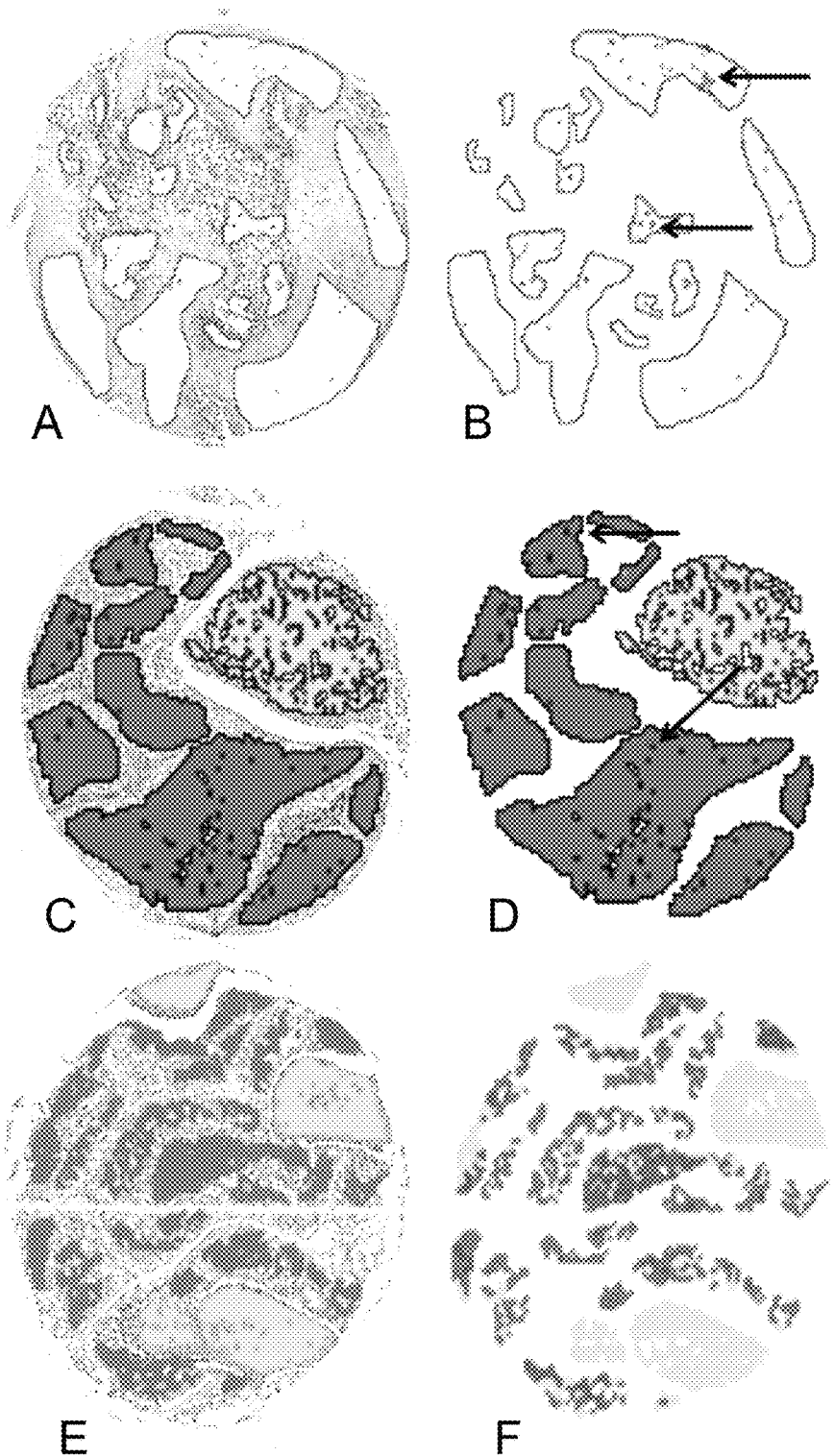
FIG. 15 contains color Photostats of a highly transparent views of H&E stained tissue spots, with the first row (A, B) showing the true and predicted outcome for a tissue spot diagnosed with SCLC, a spot with necrosis and SqCC (C, D), and a tissue spot with some misclassifications (E, F), in accordance with aspects of the present invention.

The label images discussed next are graphic representations of the results introduced above. Examples of these representations are shown in FIG. 15. In FIG. 15, the images in the left column represent a highly transparent view of the H&E stained tissue spots, with the annotated areas superimposed in the same color scheme introduced before (red: normal; green: necrosis, yellow: SCLC; blue: SqCC and purple: ADC). These annotations are considered the gold standard, or 'true' value. The images in the right column show the SHP predictions in the same color scheme. The first row (A, B) show the true and predicted outcome for a tissue spot diagnosed with SCLC; the agreement is excellent, and only a small region (arrow) was misclassified. Similarly, a spot with necrosis and SqCC (C, D) is correctly classified by SHP in its entirety. These two samples are representative of the overall quality of the SHP predictions, and the majority of the spots in the test set were predicted correctly by SHP.

Panels E and F of FIG. 15 show a tissue spot with some misclassifications. Here, the regions diagnosed as necrosis were, in general, well predicted by SHP, but some of the ADC regions were predicted as mixtures of ADC and SqCC or ADC and necrosis. Again, the images shown here are typical for SHP misclassifications that occur mostly between cases of poorly differentiated and advanced ADC and SqCC, particularly when accompanied by necrosis. A few spots were mis-diagnosed entirely between SqCC and ADC; however, no malignant sample was ever classified as normal.

Figure 16:
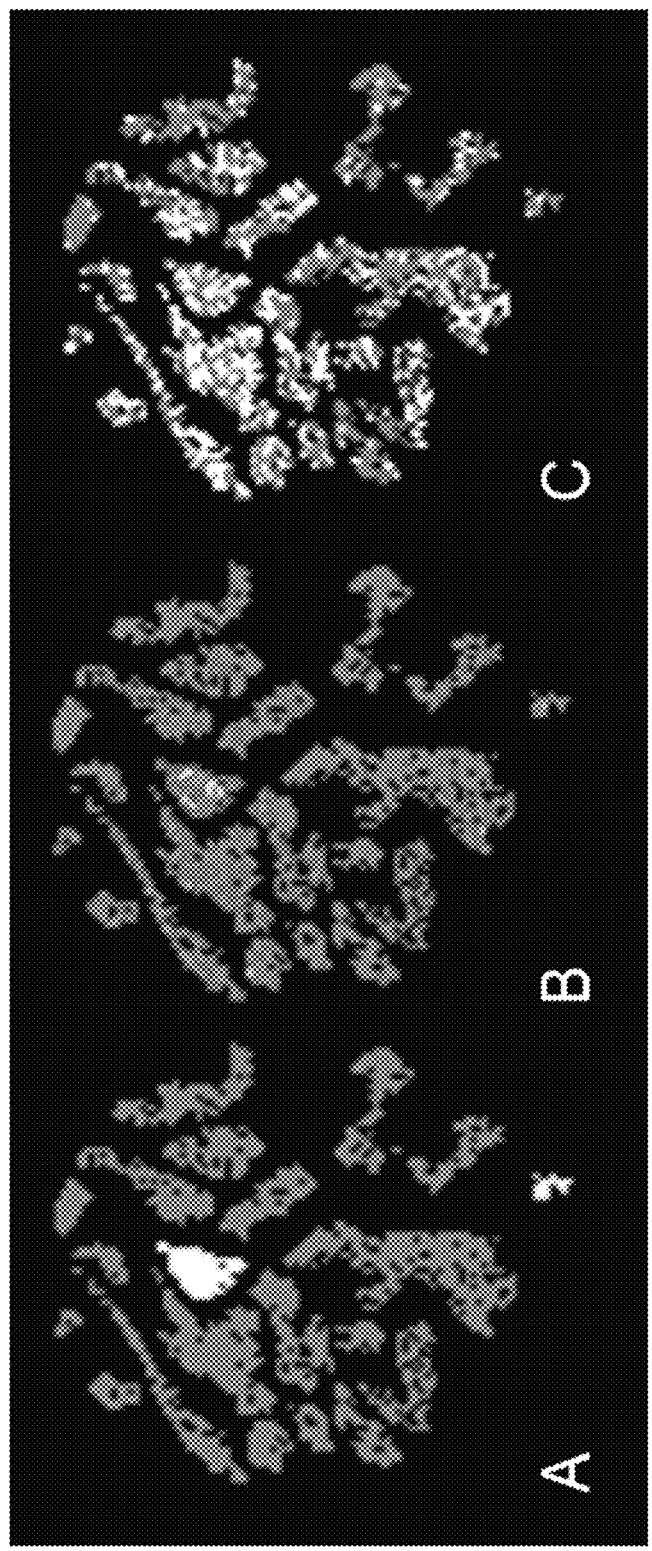
FIG. 16 contains color Photostats showing a true image and areas of misclassification that often exhibit low Platt probabilities, in accordance with aspects of the present invention.

FIG. 16 shows that areas of misclassification often exhibit low Platt probabilities. Panel A of FIG. 16 shows the 'true' annotation, whereas Panel B shows the SHP prediction. In two regions necrosis (green) was missed by SHP (although the central necrosis spot shows a few green pixels in the SHP image), and many SqCC pixels were misclassified as ADC. Panel C shows that many of the misclassifications were made with low confidence, as indicated by the white pixels. The misclassifications and low probability classifications occurred in the vicinity of the necrotic region, which may be due to the fact that the presence of necrosis dominates spectral features, such that the accuracy of the ADC vs. SqCC classification is compromised.

Figure 17:
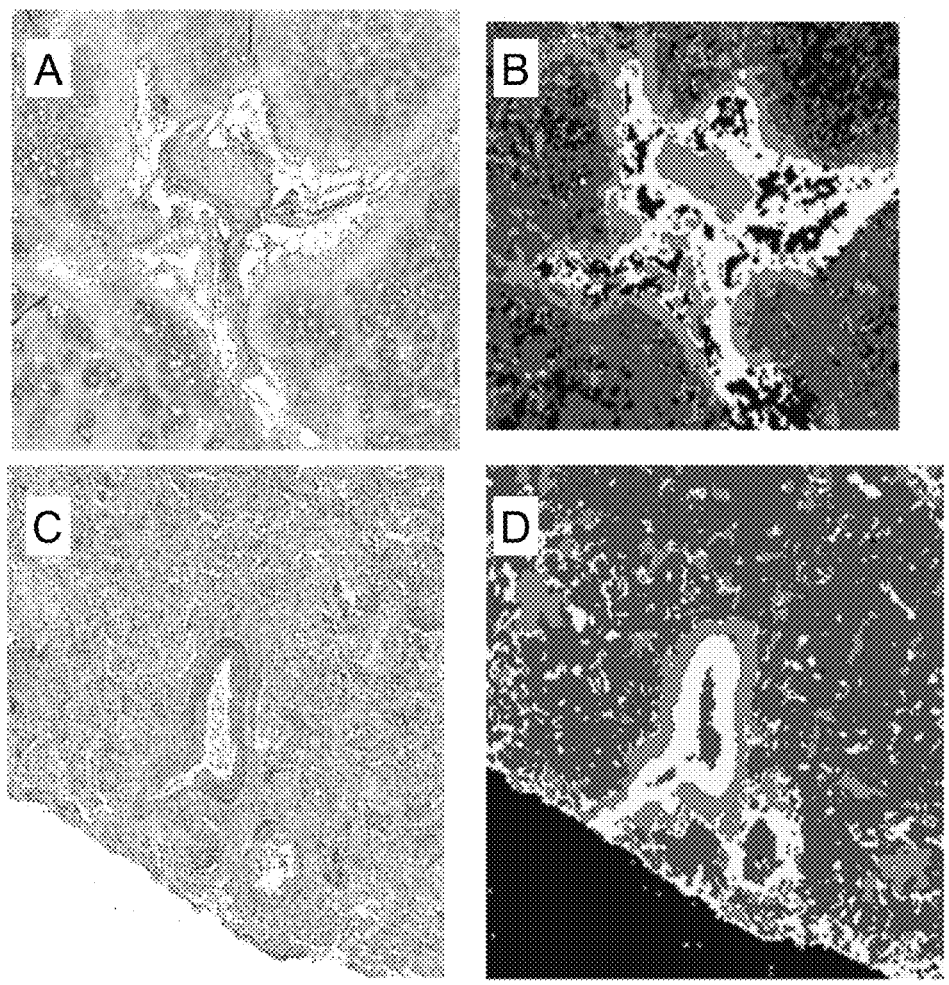
FIG. 17 contains color Photostats showing examples of benign tumors, in accordance with aspects of the present invention.

The benign lesions were analyzed in a completely analogous manner. Images of H&E-stained sections and their corresponding HCA images were annotated as described above. FIG. 17 shows two examples of benign tumors, diagnosed as 'organizing pneumonia' and 'hamartoma.' The pixel spectra of annotated regions were incorporated into the tissue data bases of normal tissues, and contributed 20 new tissue types; additionally, many of the normal tissue types found in the non-cancerous regions of cancer tissue spots were found in the benign lesions as well.

The tissue types from the non-malignant tumors could be easily distinguished from those of malignancies. FIG. 8 shows an HCA-based dendrogram that demonstrates that the class mean spectra from malignant and non-malignant lesions may be easily distinguished, with all benign classes (blue) well separated from the cancerous classes (red). This graph also depicts that unsupervised HCA clusters the cancerous spectra quite well by pathological criteria: all necrotic tissue classes are found together in one cluster, and SqCC and SCLC are differentiated from ADC. A trained, LOOVC-based SVM classifier could separate the benign from malignant lesions with 99% accuracy.

Spectral differences between normal tissues from cancer patients and normal tissue from patients with benign lesions was also reviewed. To this end, the same normal tissue types found in cancer, benign and inflammatory samples were extracted: the tissue class 'blood vessel wall in cancer adjacent tissue' was comprised of 13,356 pixel spectra from 41 patients, whereas the corresponding class 'blood vessel wall in benign samples' contained 9,825 pixel spectra from 56 patients. Similarly, connective tissue classes contained 128,485 pixel spectra in cancer adjacent tissue and 3,806 pixel spectra from benign and inflammatory samples, per Table VII. (Notice that patients could contribute to more than one tissue class in the case of cancer adjacent connective tissue; hence, the number of patients listed exceeds the number of patients in the training and test set).

TABLE VIII

Distinction of cancer-adjacent and benign and inflammatory lesion - adjacent tissue types

| | Blood vessel wall | Connective tissues |
|---|---|---|
| Cancer-adjacent tissues | 13,356 (41) | 128,485 (369) |
| Benign and inflammatory lesion-adjacent tissues | 9,825 (56) | 3,806 (14) |
| Accuracy | 90.3% | 88.9% |

The calculations were carried out on a patient-based leave-one-out cross validation (LOOCV) because it was felt that the discrepancy in the number of patients and pixel spectra (particularly in the case of the connective tissue) did not warrant a pixel-based classifier. The LOOCV produced very impressive accuracy for the discrimination of these tissue types.

These results suggest that the same tissue types in cancer-adjacent and benign and inflammatory lesions-adjacent tissues exhibit significant spectral differences. The underlying mechanisms for these differences were unclear in this example. However, several possible explanations exist:

1. Leakage and/or secretions of substances from cancer cells into the surrounding normal tissue.
2. Early molecular changes (as a result of field cancerization) that have not yet resulted in morphologic abnormalities detectable by histopathologic examination in the cells located in cancer-adjacent normal tissue
3. Host response-related changes including chemotaxis of immune cells in cancer-adjacent normal tissue.

SHP appears to be particularly sensitive to such changes: a combination of X-ray and (synchrotron-based) infrared micro-spectroscopic studies has suggested that metallo-proteinases in the vicinity of cancers may be responsible for the subtle spectral changes encountered in the vicinity of cancers. This observation may have far-reaching consequences for the detection and definition of the margins of resection, and the mechanism of metastasis formation.

The following provides another example implementation in accordance with aspects of the present invention and test results produced thereby.

The data in this example implementation and test were derived from commercial tissue micro-arrays (TMAs) especially prepared for this example. In these TMAs, several patients were represented more than once. These samples were removed to avoid training and testing of the algorithms by samples from the same patients. In addition, samples of benign lung tumors were derived from the archives of the Department of Pathology, University of Massachusetts Medical School with institutional permission. All samples were from formalin-fixed, paraffin embedded (FFPE) tissue blocks. This example deals with a portion of this study involving normal and cancerous tissue samples in TMA format.

The TMAs were assembled to accommodate the goals of this study, which include:

1. Distinction of normal (NOR) form cancerous lung tissue
2. Classification of lung cancers into small cell lung cancer (SCLC) and non-small cell lung cancer (NSCLC)
3. Further classification of NSCLC into adenocarcinoma (ADC) and squamous cell carcinoma (SqCC)
4. Classification of ADC into several sub-classes of clinical relevance Based on these goals, five TMAs were assembled at US Biomax, Inc. (Rockville, Md.) that comprised 80 normal tissue (from cancer patients; biopsy free of cancerous tissue), 29 necrotic tissue from ADC, SqCC and SCLC patients, and 61 SCLC, 89 SqCC and 129 ADC cases for a total of 388 samples. Each tissue spot measured about 1.8 mm in diameter, and will be referred to as "patients" herein. These TMA sample numbers LC701 through LC706. From each TMA, three tissue sections were purchased, referred to as section A001, A002 and A003. Section A002 was mounted on a standard microscope slide, de-paraffinized, stained and coverslipped. The other two sections were mounted on 'low-e' slides (see Section 2.3) and delivered as paraffin-embedded samples.

The number of tissue spots enumerated above included samples from another TMA (LC811, also from US Biomax, Inc.) that were included in this study to increase the total number of samples and to demonstrate that the results obtained were independent of TMA preparation and age of the samples.

Slides for spectral data acquisition were de-paraffinized using a standard procedure and kept in a desiccator when not used. Original data were collected within a few days after de-paraffination except for the LC811 tissue spots that had been de-paraffinized about 6 months before repeat data acquisition; however, no discernible degradation of the spectral quality of the older samples was observed.

Figure 19:
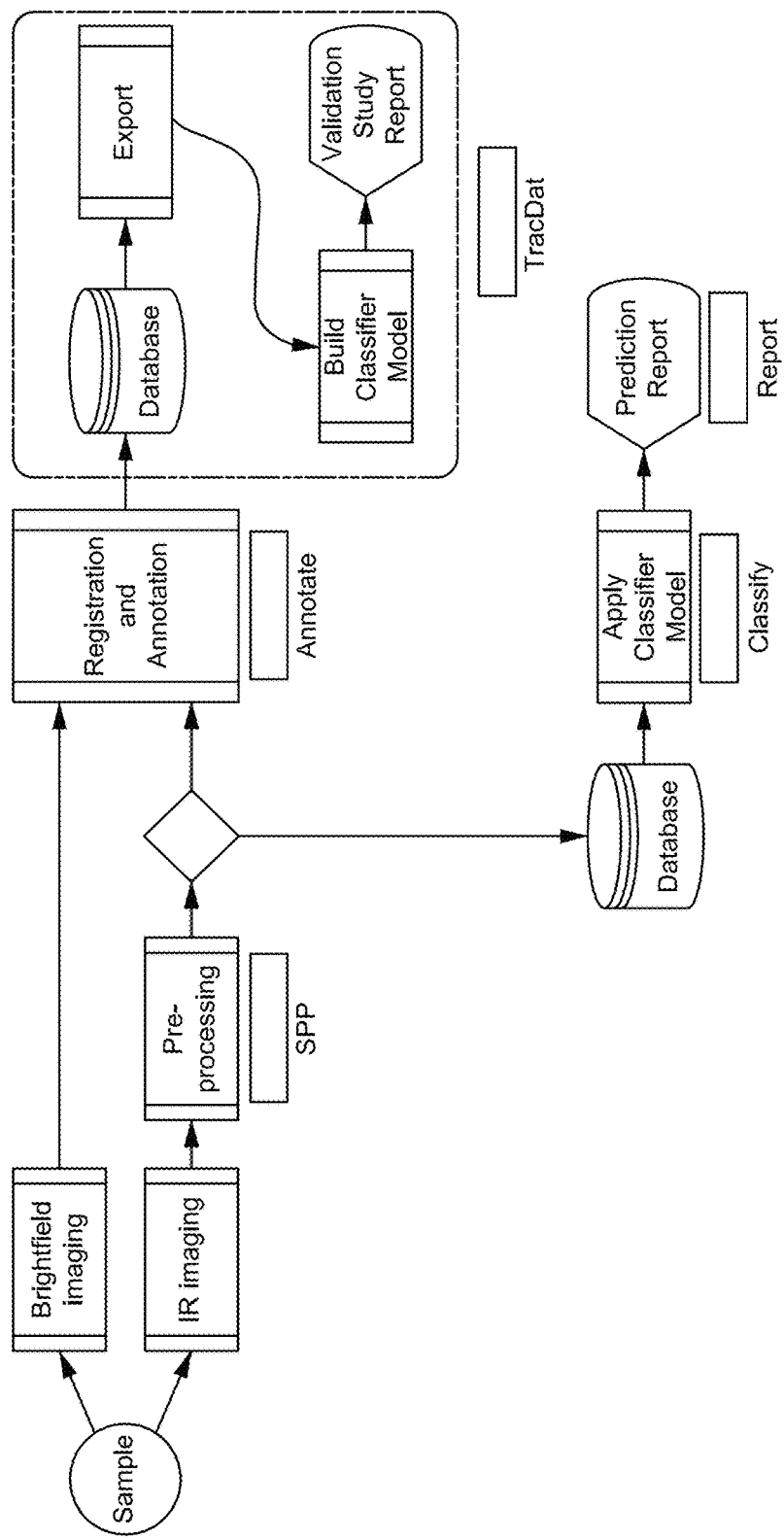
FIG. 19 contains a representative diagram of method of analyzing and classifying a tissue sample, and related activity, in accordance with aspects of the present invention.

A block diagram of the steps followed in this example is shown in FIG. 19. All spectroscopic studies reported here were carried out on 'low emissivity' (low-e) slides (Kevley Technologies, Chester-field, OH) that are totally reflective toward infrared radiation, but are nearly totally transparent to visible light; thus, the same sample can be used both for infrared data acquisition and, after appropriate staining, for classical histopathology. The fact that the visible and infrared images were obtained from the same sample permits accurate registration of the two images. This step is necessary for accurate annotation (Section 2.5) of spectral features which, in turn, guarantees the traceability of pixel spectra and annotated tissue features.

Problems of infrared measurements on these reflective slides have been identified due to the occurrence of a standing electromagnetic wave on the reflective surface. However, subsequent simulations have shown that the resulting intensity artifact is minimized when using high numeric aperture objectives. Furthermore, by using spectral derivatives rather than raw intensities and regional normalization, these effects may be minimized.

Infrared spectral data were acquired from pixels 6.25 μm on edge using a PerkinElmer (Shelton, Conn., USA) model SpectrumOne/Spotlight 400 imaging infrared micro-spectrometer, resulting in 25,600 pixel spectra for each square millimeter of tissue. For each pixel, the spectral vector collected covers the wave-number range from about 700 to 4000 $cm^{-1}$, but only 501 intensity data points between about 800 and 1800 $cm^{-1}$ (with 2 $cm^{-1}$ data point spacing) were used for the statistical analysis. The "hyperspectral data cube" contains the coordinate of each pixel, and the infrared spectrum associated with this pixel.

Each tissue spot produced about $10^5$ individual pixel spectra that were pre-processed via a routine referred to herein as SPP (spectral pre-processor, see FIG. 19) to yield pseudo-color images of the tissue spots, as follows. First, the size of hyperspectral data cubes was reduced by a factor of four by co-adding four individual pixel spectra into a new spectrum with better signal-to-noise ratio, but larger pixel size, 12.5 μm on edge. The resulting set of ca. 25,000 pixels per tissue spot was corrected for confounding contributions such as noise, water vapor and resonance Mie (R-Mie) scattering (via a phase correction algorithm). In order to enhance the sensitivity of spectral methods toward specific changes of protein abundance, the broad and often unstructured raw spectra were converted to second derivatives. This process is known to reduce the half width of spectral bands, thereby providing better discriminatory power which provides for the ability to classify different tumor types. These second derivative spectra are the primary information obtained in an SHP experiment, and the task at hand is the decoding and correlation of the spectral information with the pathological diagnosis.

Figure 18A:
FIGS. 18A, 18B, and 18C contain color Photostats depicting a composite visual image of an H&E stained tissue spot, a typical HCA-based pseudo-color image of a tissue spot, and the results of the annotation process for a particular tissue spot, in accordance with aspects of the present invention.
Figure 18B:
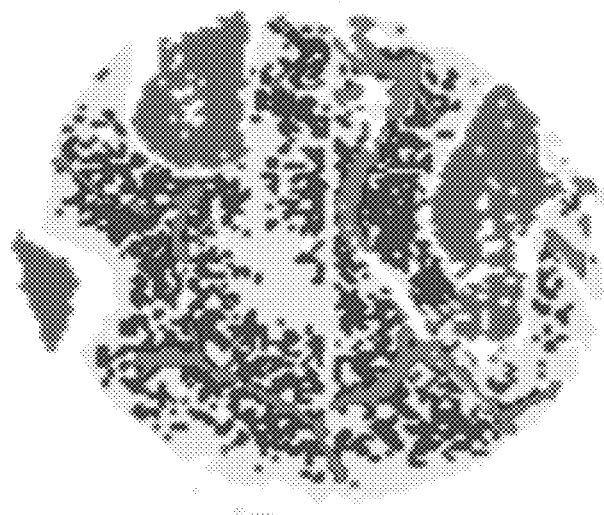

This was accomplished by converting the pre-processed datasets to pseudo-color images using unsupervised "hierarchical cluster analysis" (HCA); that is, no input from a pathologist was used in this step. A typical HCA-based pseudo-color image of a tissue spot is shown in FIG. 18B. In FIG. 18B, regions of the same color represent similar spectra. Visual inspection of FIGS. 18A and 18B immediately reveals a correspondence between the IR pseudo-color image and the H&E-stained image. This correspondence becomes even more pronounced at higher magnification of the visual image, and cellular details often can be identified and correlated with the corresponding features of the HCA image. At the four-cluster level shown in FIG. 18B, necrosis (gray), adenocarcinoma (blue and green) and endothelium (red) can be clearly distinguished. Regions denoted in the HCA images were correlated to tissue pathology in a step referred to as "annotation," as described further below.

After infrared data acquisition, the tissue sections were stained at the Department of Pathology at University of Massachusetts Medical School, using hematoxylin/eosin (H&E) and following standardized and validated methods. After coverslipping, the tissue sections were imaged using an Olympus (Center Valley, Pa.) BX51 microscope equipped with a computer-controlled microscope stage with linear stepping motors (0.1 μm resolution). Images were taken via a Qimaging (Surrey, BC, Canada), model QICAM high resolution digital camera. The microscope was operated using Media Cybernetics [Rockville, Md., USA] Image Pro Plus software. The tissue spots were imaged at 20× magnification, producing large mosaic visual image data files at sufficiently high spatial resolution for pathological interpretation. FIG. 18A depicts a composite visual image of an H&E stained tissue spot. Comparison of FIGS. 18A and 18B demonstrates that the tissue types and disease stated detected by infrared imaging directly correspond to the features detected by visual pathology.

Registration of the slide position for visual and infrared microscopy was aided by mounting the slides in a specially designed and manufactured slide holder that was equipped with three reticles having positions in the particular microscope table that were read and recorded at 0.1 μm accuracy.

The annotation process correlates unambiguously assignable tissue areas from the H&E stained visual images with corresponding regions of the pseudo-color infrared image. To this end, software was created (referred to herein as the ANNOTATE software; see reference thereto in FIG. 19) that created a registered semi-transparent overlay of the two images such that tissue features still may be perceived, but are displayed on a color background that corresponds to the HCA clusters. The two images were coarsely registered with respect to each other using the reticle coordinates collected on the infrared and visual microscopes. Subsequently, fine registration was achieved by optimizing the parameters of a rigid body (image) transform that minimizes the least square error of the difference between the two images.

Figure 18C:
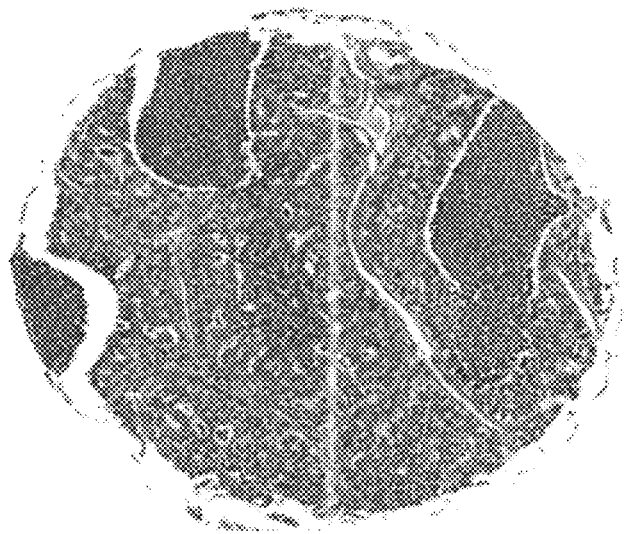

Subsequently, the participating pathologist selected areas of diagnostic interest, for example, the most typical regions of a disease, or normal tissue types. Subsequently, the ANNOTATE software checked the selected regions for uniform cluster membership, and eliminated pixels that did not conform to the majority assignment within one selected area. The results of the annotation process for a particular tissue spot are shown in FIG. 18C. As shown in FIG. 18C, the four green areas were identified to be due to necrosis, while the purple areas were deemed prototypical for solid mucinous adenocarcinoma. The number of selected areas in FIG. 18C is typical for an annotated tissue spot, and yielded, on average, about 1400 pixel spectra for each tissue spot, corresponding to about 350 cells. This latter assessment was based on an estimate of a cell's size (ca. 25 μm in diameter) and the aggregated pixel size (12.5 μm on edge).

Pixel spectra from the areas selected by the pathologist were entered into a traceable database of spectra; pixel spectra from different patients, but with the same tissue code, were combined into tissue classes. Table IX summarizes the total number of pixel spectra and those annotated for this study.

TABLE IX

Number of pixel spectra, processed spectra and annotated spectra in entire dataset

| | |
|---|---|
| Total spectra: | ~39 × $10^6$ (388 spots, ~100,000 spectra per spot) |
| Processed spectra: | 4 × $10^6$ pixel spectra (2 × 2 pixel averaging and elimination of blank pixels) |
| Annotated spectra: | 5.5 × $10^3$ spectra (see Table 11) |
| Annotation regions: | 9.3 × $10^3$ annotation regions (see Table II) |
| Annotation regions/spot: | 24 regions/spot (average) |
| Pixels/annotation region: | 60 pixels (average) |
| Main tissue types: | 168 (54 malignant, 114 normal classes) |

In the dataset of about 550,000 annotated pixels (see Table IX), each pixel spectrum is uniquely identified and traceable to the tissue micro-array name (e.g., LC706), the particular section (e.g., A001, see Section 2.1), the individual tissue spot identified by row and column (e.g., C 3) and the coordinate of the pixel spectrum. This coordinate was uniquely defined by the pixel X, Y address, and the pixel size. The pixel X, Y address was referenced against the reticle positions in the slide holder (see discussion above). Each annotated pixel spectrum, in addition, was tagged with a code that identified the pathology diagnosis. Thus, any pixel spectrum may be relocated and traced, and may be compared to the corresponding region of the visual image that was used for annotation. The export of annotated pixels and their incorporation into the database was accomplished using software referred to as "TracDat" (see reference thereto in FIG. 19).

All pre-processed pixel spectra, whether from the annotated areas or from the remainder of the tissue spot, were subsequently stored in a database created by the commercial software "Filemaker Pro" [Filemaker, Inc., Santa Clara, Calif.], from which spectra could be exported, via queries, into datasets that were used for training and testing of the algorithms. Pixel spectra to be included in a particular dataset could be queried by disease or tissue type code, patient ID, spot position, etc. The process of exporting the annotated spectra was carried out by the software referred to as 'TracDat.' FIG. 19 depicts the entire process flow for this example implementation, including image acquisition, pre-processing, annotation, and traceable database construction. Note that this process ascertains the complete traceability of each pixel spectrum and its association with a medical code determined by the annotation step. The database serves as an information hub for subsequent classifier training, or creating a prediction report on an unknown sample.

As pointed out above, one focus of this example is the discussion of the statistical methods and metrics employed in this study that demonstrates the classification potential of SHP for lung cancers. Most of the work reported here was carried out on a data subset of 188 patients; the remainder of the dataset (200 patient samples) was kept as a completely blinded test set referred to as the "vaulted" dataset. Another focus of this example was the evaluation of several machine learning algorithms (MLAs, or "machines") that were applied to the non-vaulted dataset, and the development of tests and metrics for the evaluation of sensitivities and specificities of the various procedures. In general, the multivariate statistical tests were carried out in a "pixel-based," a "patient-based" or "image-based" fashion, discussed further below. The evaluation of the MLAs was carried out mostly on the pixel-based level, since this approach appeared to afford the largest datasets (see below) and thereby, the best assessment of the MLAs' accuracies.

All computations were carried out on a Dell workstation equipped with a 12-core Intel processor and 56 GByte memory, running Linux and 64 bit Windows operating systems. This workstation was connected to a server with 20 TByte hard drive space and 100% local and Amazon S3 cloud backup. All computations were carried out in MATLAB version R2013b (The Mathworks, Natick, Mass.) using scripts developed in house with complete revision history control on an SVN server.

The composition of the entire dataset is presented in Tables X A, X B, and X C. Note that the total patient number in Tables X A and X B (as shown in Table X C) exceeds the patient number in the study; this is due to the fact that for most patients, at least two, often three diagnostic classes were rendered, often including necrosis and normal tissue types. Thus, the patient numbers in Tables X A, X B, and X C reflect the number of patients contributing to each class, rather than the total patient number in the study. Subsequently, tissue subtypes with less than 3 patients or less than 50 pixels were dropped from the study.

As pointed out above, the results reported here were obtained from a subset of the entire dataset. This subset contained data from 188 patients, and was further divided into a sub-training and a sub-test set, each comprising about 125,000 spectra. The evaluation of the MLA performance was carried out on these subsets such that the blinded character of the "vaulted" dataset was maintained. This vaulted dataset originally contained 200 patient samples, and was not used for training and testing of the classifiers which was performed on the sub-training set and sub-test set, respectively. Thus, the vaulted data were not utilized until later and revealed accuracies very similar to those obtained for sub-training and sub-test datasets.

Since even the sub-training and the sub-test datasets contained about 125,000 pixel spectra, which would require long computation times, smaller benchmark data sets were created. For example, a balanced dataset referred to as the 'benchmark' data set was used to test various MLAs (see further discussion below). These datasets were created from the overall dataset by database queries that have been archived. For training and testing, a predetermined number of pixel spectra were randomly selected from the balanced training classes; the optimum number of spectra to be included was optimized experimentally.

Although multi-class identification of prokaryotic cells (bacteria) by spectral methods have become common-place, no large multi-classification study has been performed for complex tissues. The goals of this example implementation included producing reliable distinction between normal (NOR) and diseased tissue, the distinction between necrotic (NECK) and cancerous tissue, and between small cell lung cancer (SCLC) and non-small cell cancers (NSCLC). Furthermore, the latter category was to be distinguished into squamous cell lung cancer (SqCC) and adenocarcinomas (ADC) which themselves had several grades and/or subclasses.

TABLE X A

Number of Annotated Regions, Pixel Spectra and Patients Contributing to Pathological Tissue Classes in Entire Dataset (Pathological Tissue Types Only)

| Annotated Regions | Pixel Spectra | Number of patients | Description |
|---|---|---|---|
| 1 | 60 | 1 | Lung/ADC/Acinar/mixed mucinous & non-mucinous |
| 734 | 35516 | 39 | Lung/ADC/Acinar/mucinous |
| 503 | 17484 | 27 | Lung/ADC/Acinar/non-mucinous |
| 24 | 1324 | 3 | Lung/ADC/Colloid/mucinous |
| 1 | 189 | 1 | Lung/ADC/Lepidic/mixed mucinous & non-mucinous |
| 140 | 5980 | 9 | Lung/ADC/Lepidic/mucinous |
| 166 | 6258 | 8 | Lung/ADC/Lepidic/non-mucinous |
| 99 | 4189 | 10 | Lung/ADC/Micro-papillary/mucinous |
| 58 | 1056 | 3 | Lung/ADC/Micro-papillary/non-mucinous |
| 18 | 3279 | 2 | Lung/ADC/Other/non-mucinous |
| 1 | 142 | 1 | Lung/ADC/Papillary/mixed mucinous & non-mucinous |
| 160 | 18704 | 11 | Lung/ADC/Papillary/mucinous |
| 68 | 3419 | 7 | Lung/ADC/Papillary/non-mucinous |
| 503 | 38335 | 29 | Lung/ADC/Solid/mucinous |
| 355 | 26476 | 18 | Lung/ADC/Solid/non-mucinous |
| 20 | 4777 | 3 | Lung/SqCC/Basaloid/grade 1 |
| 37 | 5494 | 4 | Lung/SqCC/Basaloid/grade 2 |
| 266 | 31802 | 23 | Lung/SqCC/Other/grade 1 |
| 484 | 58749 | 40 | Lung/SqCC/Other/grade 2 |
| 418 | 48030 | 31 | Lung/SqCC/Other/grade 3 |
| 1465 | 77685 | 70 | Lung/SCLC/Other/ |
| 284 | 34913 | 41 | Lung/Necrosis/necrotic ADC |
| 322 | 20913 | 29 | Lung/Necrosis/necrotic SCLC |
| 462 | 32722 | 56 | Lung/Necrosis/necrotic SqCC |
| 111 | 5769 | 17 | Lung/Keratin Pearl |
| 22 | 197 | 3 | Lung/Macrophages/Non-Mucinous |
| 6722 | 483462 | 486 | 26 Pathological Tissues Types |

TABLE X B

Number of Annotated Regions, Pixel Spectra and Patients Contributing to Normal Tissue Classes in Entire Dataset (Normal Tissue Types)

| Annotated Regions | Pixel Spectra | Number of patients | Description |
|---|---|---|---|
| 45 | 1602 | 10 | Lung/Conn. Tiss/Black Carbon Pigment |
| 24 | 2341 | 8 | Lung/Conn. Tiss/Dense CT/Abundance of Fibroblast |
| 4 | 514 | 3 | Lung/Conn. Tiss/Dense CT/Abundance of Lymphoid Cells |
| 22 | 925 | 3 | Lung/Conn. Tiss/Loose CT/Abundance of Fibroblast |
| 1 | 112 | 1 | Lung/Conn. Tiss/Loose CT/Abundance of Lymphoid Cells |
| 2 | 130 | 1 | Lung/Conn. Tiss/Loose CT/Other |
| 836 | 23336 | 59 | Lung/Alveolar/Normal histomorphology) |
| 342 | 5552 | 43 | Lung/Alveolar/Wall thickened by fibrosis |
| 632 | 12667 | 56 | Lung/Alveolar/Wall with congested capillaries |
| 11 | 140 | 4 | Lung/Bronchiole/Wall Adventitia |
| 27 | 481 | 7 | Lung/Bronchiole/Wall Columnar Epithelium |
| 4 | 151 | 1 | Lung/Bronchiole/Wall Cuboidal Epithelium |
| 8 | 156 | 4 | Lung/Bronchiole/Wall Muscle |
| 202 | 3097 | 37 | Lung/Blood/Red Blood Cell (Erythorocyte) |
| 3 | 107 | 1 | Lung/Blood/WBC - Lymphocytes |
| 63 | 1854 | 16 | Lung/Blood Plasma/Plasma (with Fibrinogen) |

TABLE X B-continued

Number of Annotated Regions, Pixel Spectra and Patients Contributing to Normal Tissue Classes in Entire Dataset (Normal Tissue Types)

| Annotated Regions | Pixel Spectra | Number of patients | Description |
|---|---|---|---|
| 4 | 35 | 2 | Lung/Blood Plasma/Serum (without Fibrinogen) |
| 92 | 1751 | 24 | Lung/Blood Plasma/Serum with Blood Cells |
| 60 | 2363 | 15 | Lung/Blood Vessel/Wall Adventitia |
| 13 | 287 | 3 | Lung/Blood Vessel/Wall Endothelium |
| 202 | 7301 | 41 | Lung/Blood Vessel/Wall Muscle |
| 2597 | 64902 | 339 | 21 Normal Tissue Types |

TABLE X C

Total Number of Annotated Regions, Pixel Spectra and Patient Contributions

| | Annotated Regions | Pixel Spectra | Number of patients |
|---|---|---|---|
| Pathological Tissue | 6722 | 483462 | 486 |
| Normal Tissue Types | 2597 | 64902 | 339 |
| Total | 9319 | 548364 | 825 |

TABLE XI A

Example of Raw Training and Test Datasets for MLA Comparison (5011)

| Annot'ed Regions | Pixel Spectra | Number patients | Description | |
|---|---|---|---|---|
| Training | | | | |
| 281 | 12572 | 15 | Lung/ADC/acinar/muc. & non- | |
| 63 | 2809 | 4 | Lung/ADC/lepidic/muc. & non- | |
| 13 | 247 | 4 | Lung/ADC/micro-papillary | |
| 33 | 2762 | 3 | Lung/ADC/papill./muc. & non- | |
| 179 | 10568 | 10 | Lung/ADC/solid/muc. & non- | Sum ADC = 28958 |
| 25 | 907 | 5 | Lung/keratinpPearl | |
| 20 | 1647 | 1 | Lung/SqCC/basaloid | |
| 54 | 4830 | 5 | Lung/SqCC/grade 1 | |
| 122 | 12066 | 12 | Lung/SqCC/grade 2 | |
| 83 | 5942 | 7 | Lung/SqCC/grade 3 | Sum SqCC = 25392 |
| Testing | | | | |
| 301 | 12252 | 17 | Lung/ADC/acinar/muc. & non- | |
| 84 | 2562 | 5 | Lung/ADC/lepidic/muc. & non- | |
| 24 | 331 | 5 | Lung/ADC/micro-papillary | |
| 85 | 5259 | 5 | Lung/ADC/papill./muc. & non- | |
| 196 | 10400 | 10 | Lung/ADC/solid/muc. & non- | Sum ADC = 30804 |
| 9 | 1124 | 3 | Lung/keratin pearl | |
| 18 | 3578 | 2 | Lung/SqCC/basaloid | |
| 56 | 7978 | 6 | Lung/SqCC/grade 1 | |
| 104 | 13850 | 8 | Lung/SqCC/grade 2 | |
| 130 | 12828 | 8 | Lung/SqCC/grade 3 | Sum SqCC = 39358 |

The dataset for this example implementation contained pixel spectra that exhibited enormous spectral changes (e.g., NECR), whereas others exhibited enormously small spectral changes (such as some of the ADC subclasses). However, the ANNs used displayed a relatively large variation in classification accuracy in consecutive runs; thus, a systematic comparison of various classification algorithms was carried out, as discussed further below.

Preliminary work indicated that the classification of NSCLC into SqCC and ADC was the most difficult major classification task; thus, the performance of several MLAs, as well as the methods of balancing the datasets, were evaluated for this classification task. To this end, benchmark training and test sets were constructed from the sub-training and sub-test sets. The composition of these datasets is shown in Table XI A and XI B. Table XI A is an example of the result of an automatic data base query to select all sub-classes/grades of ADC and SqCC. The number of patients, annotation regions and a count of the pixel spectra are given in this Table.

For the evaluation of the various MLAs, it was desirable to have the training dataset balanced both in terms of patients as well as pixels. The (imbalanced) patient numbers in Table XI A were balanced by randomly eliminating patients until both training and test sets had equal number of patients in all classes. In the case of odd total patient numbers, the number of patients in the classes was allowed to differ by one, see Table XI B.

TABLE XI B

Example of Balanced Training and Test Datasets for MLA Comparison (S011)

| Annot'ed Regions | Pixel Spectra | Number patients | Description | |
|---|---|---|---|---|
| Training | | | | |
| 281 | 12572 | 15 | Lung/ADC/acinar/muc. & non-muc. | |
| 63 | 2809 | 4 | Lung/ADC/lepidic/muc. & non-muc. | |
| 13 | 247 | 4 | Lung/ADC/micro-papillary | |
| 33 | 2762 | 3 | Lung/ADC/papill./muc. & non-muc. | |
| 169 | 9829 | 9 | Lung/ADC/solid/muc. & non-muc. | Sum ADC = 28219 |
| 14 | 728 | 3 | Lung/keratinpPearl | |
| 20 | 2306 | 1 | Lung/SqCC/basaloid | |
| 54 | 6763 | 5 | Lung/SqCC/grade 1 | |
| 85 | 10100 | 9 | Lung/SqCC/grade 2 | |
| 83 | 8320 | 7 | Lung/SqCC/grade 3 | Sum SqCC = 28217 |
| Testing | | | | |
| 234 | 13187 | 15 | Lung/ADC/acinar/muc. & non-muc. | |
| 78 | 3013 | 4 | Lung/ADC/lepidic/muc. & non-muc. | |
| 17 | 346 | 4 | Lung/ADC/micro-papillary | |
| 48 | 4166 | 3 | Lung/ADC/papill./muc. & non-mucs | |
| 196 | 13635 | 10 | Lung/ADC/solid/muc. & non-muc. | Sum ADC = 34347 |
| 9 | 1124 | 3 | Lung/keratin pearl | |
| 8 | 2127 | 1 | Lung/SqCC/basaloid | |
| 49 | 6316 | 5 | Lung/SqCC/grade 1 | |
| 104 | 13850 | 8 | Lung/SqCC/grade 2 | |
| 111 | 10937 | 7 | Lung/SqCC/grade 3 | Sum SqCC = 34354 |

Eliminating these patients, however, created a discrepancy in the number of pixel spectra in the subclasses. This result was then addressed by oversampling the datasets. Oversampling and undersampling are methods commonly employed in statistical analyses, as explained further below.

If in a two class problem (classes A and B), the number of samples (spectra) $n_A$ and $n_B$ are different, with $n_A > n_B$, then there are two methods for balancing the datasets. In one method, referred to as oversampling, all $n_A$ spectra of group A are used, and data in class B are used repeatedly until $n_A \approx n_B$. In undersampling, spectra are randomly selected from group A such that $n_A \approx n_B$ [24]. Undersampling has the disadvantage that part of the heterogeneity in class A is ignored by the random selection process, whereas in oversampling, no data are omitted but the smaller dataset is used repeatedly. When SVM classifiers are used for data analysis, oversampling may be visualized as producing more data on one side of the hyperplane separating the data, but these additional data have no effect on the position and orientation of this hyperplane. Omitting data in undersampling, on the other hand, may affect the hyperplane due to reduced sample heterogeneity. Experimentally, it was found that oversampling generally performed better than undersampling; thus, the number of spectra in each class was equalized by oversampling. The resulting S011 balanced training and test sets are shown in Table XI B. As shown in Table XI B, the number of patients in the training and test set are equal (except, as noted, for odd numbers of patients), and the number of spectra in the ADC and SqCC classes was equalized by oversampling.

The SVMs reported here performed better than previous attempts to use hierarchical ANN classifiers when used as multi-classifiers rather than as hierarchical, binary classifiers for the benchmark datasets tested. This result may be visualized as being due to the fact that the multi-classifier has a broader range of options for classification, whereas each binary classifier has only two options available. Several benchmark datasets were created to allow optimization and testing of MLAs for specific tasks.

During the course of this example implementation, several types of MLAs were tested for their suitability to classify the spectral data. A previous 80-patient study used artificial neural networks (ANNs) as the MLA of choice. In subsequent efforts, it was found that—although their average accuracy was slightly higher than that of other MLAs—those efforts proved to be more costly in terms of computer time. This result is, in part, due to the fact that ANNs start the analysis with a randomized weight matrix connecting input spectral features with the desired outputs. This randomized initial step led to variations in the output accuracy which required averaging 10 independent trial runs. This step may be avoided by using support vector machines (SVMs) that proved to be more stable and reproducible. In addition to SVMs and ANNs, random forest (RF), naive Bayes (NB) and k-nearest neighbor (KNN) classification algorithms may be used on the same benchmark dataset. The overall accuracy of these MLAs, as applied to the benchmark set shown in Table XI, is displayed in Table XII. Note that the MLAs listed here were un-optimized at this point; i.e., the default settings for the MLAs were used.

Although the un-optimized ANN slightly outperformed the SVMs, the latter were selected because of faster execution times, their higher reproducibility, their broad acceptance in the scientific community, and their well-understood mode of action. In ANNs, on the other hand, the mode of action—the connectivity between input and output—is somewhat more random and harder to reproduce.

TABLE XII

Accuracy of MLAs Used in Benchmark Study

| MLA | Accuracy |
|---|---|
| SVM (lkf) | 87.4% |
| SVM | 86.8% |
| ANN | 88.1% |
| RF | 85.0% |
| KNN | 78.1% |
| NB | 76.7% |

SVM: support vector machine;
lkf: linear kernel function;
qkf: quadratic kernel function;
ANN: artificial neural network;
RF: random forests;
KNN: k = nearest neighbors;
NB: naïve Bayes After further evaluation, a SVM with radial kernel or basis function (rbf) was used for classification. In the case of radial basis function, two parameters, "c" (penalty weight on mis-classification error) and "γ" (width of the radial basis kernel) were optimized by varying them independently from 0.000061 ($2^{-14}$) to 0.031 ($2^{-5}$) for γ and 0.0625 ($2^{-4}$) to 32 ($2^5$) for C. This approach resulted in an accuracy of 92.4±0.85% for a benchmark data set consisting of about 190,500 training spectra and 48,600 test spectra (the S014 training/test datasets) on a pixel base and 94.0±2.6% on the leave-one-out-cross-validation (LOOCV) patient level. The differences in pixel-based and LOOCV computations, as well as the methods to estimate the confidence limits, are discussed further below.

Figure 20:
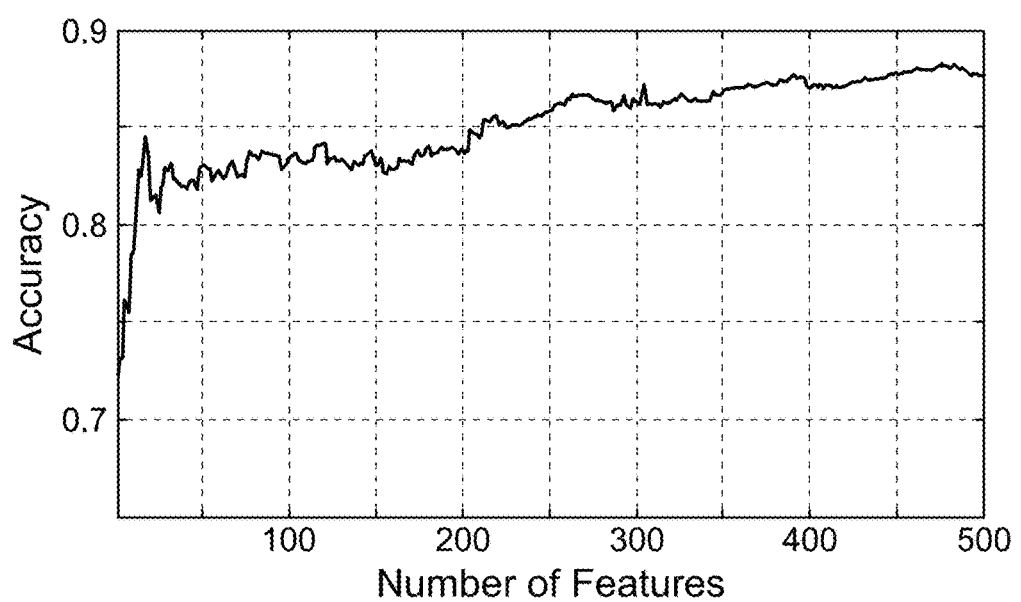
FIG. 20 presents a graphical representation of accuracy of r-SVM classification as a function of feature number, in accordance with aspects of the present invention.

Feature selection sometimes may improve classification accuracy by eliminating confounding features. Thus, feature selection was implemented in the present example implementation using the reduced SVM ("r-SVM") implementation in MATLAB. Here, the number of features was decreased from 501 second derivative intensity points (in the range from 1800-800 $cm^{-1}$, with 2 $cm^{-1}$ data point spacing) to below 50 features, see FIG. 20. This process resulted in a gradual reduction of the classification accuracy, with a steep drop-off at about 35 features. The gradual decrease in accuracy between 501 and 100 features suggested that the use of all features in the spectral vectors is advantageous. The spectral resolution of the spectrometers (4 $cm^{-1}$, or about 2 data points) and the inherent line width of the observed second derivative bands (>15 $cm^{-1}$, or about 7 data points) determine that only about 70 data points of the 501 intensity points are linearly independent. Since the accuracy of the MLAs increases above this limit of features, it may be concluded that the algorithm detects slight variations in band shapes and uses them for classification. Furthermore, the larger number of features does not decrease the accuracy due to introduction of noise. As expected, the variation (noise) in the plot of accuracy vs. number of feature decreases toward higher number of features.

The dependence of the classification accuracy on the number of included pixel spectra was tested using training and test sets that had sufficient numbers of individual pixel spectra to allow a broad range of inputs. Thus, for S011 introduced in Table XI B and S014, the entire sub-training and sub-test sets were used, with number of randomly selected spectra varying from 1,000 to 20,000 at constant patient count. These results, summarized in Table XIII, suggest that a plateau of balanced accuracy is reached at or before about 1000 pixel spectra for this dataset, and that increasing this number increases computation time enormously at no gain in accuracy.

TABLE XIII

Dependence of Balanced Accuracy on Number of Pixel Spectra Used for Training (S014)

| Number of Pixels | Balanced Accuracy (Pixel-based) | Balanced Accuracy (Patient-based) |
|---|---|---|
| 1000 | 88.60% | 89.30% |
| 2000 | 90.60% | 90.30% |
| 5000 | 90.00% | 90.20% |
| 10000 | 90.60% | 90.60% |
| 15000 | 90.80% | 90.80% |
| 20000 | 90.80% | 90.80% |

Figure 21:
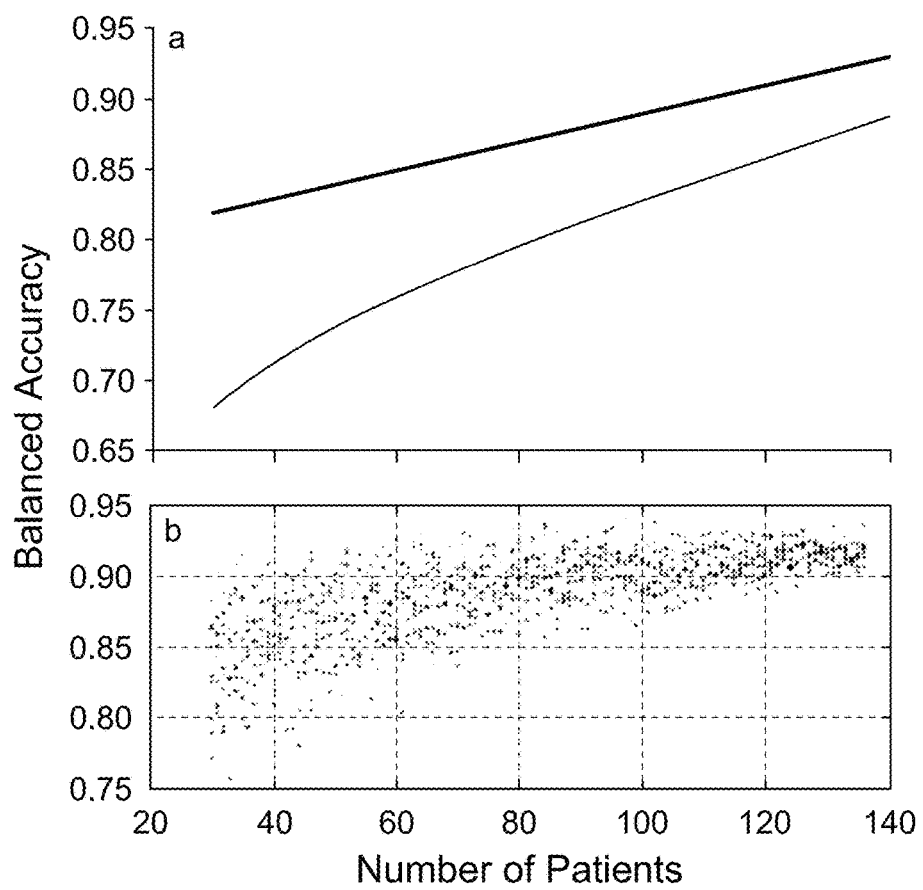
FIG. 21 presents (a) graphical representations of a confidence interval (green trace) for given accuracy (blue trace) and patient number; and (b) results of a simulation of the confidence interval and the accuracy of a five-class SVM classifier as a function of the number of patients in the training set, in accordance with aspects of the present invention.

In statistical analyses, it is common to include confident intervals (CI) defined in terms of the standard error. In the present example implementation, estimates for confidence intervals were obtained by two methods. FIG. 21b shows the results obtained for a simulation of the confidence limits by varying the number of patients in the training set, at a constant level of input spectra per classification class (2000), and performing 10 independent SVM training and test runs by randomly selected 10,000 training spectra from the entire training dataset. These 10,000 training spectra were randomly selected from 5 classes (NOR, NECR, SCLC, SqCC and ADC) with 2000 spectra per class. The size of the entire training set increased as the number of patients increased, but the number of spectra used in the training set remained constant (at 10,000). As can be seen from FIG. 21b, the overall accuracy increases, as expected, as the number of patients in the training set increases, from about 85 to over 90%, and the scatter in the accuracy for 10 independent runs decreased by a factor of about five.

This result may be modeled, using the analytical expression for the sensitivity and standard error. The 95% confidence interval CI is given by $$CI = S - 1.96\sqrt{SE} \quad (1)$$

$$SE = \frac{S(1-S)}{n} \quad (2)$$

Here, S is the sensitivity of the measurement, SE the standard error and n is the number of samples. A plot of this confidence interval as a function of sensitivity and number of patients is given in FIG. 21a.

The sensitivity (blue line) was estimate from the balanced accuracy from FIG. 21b. The green line in FIG. 21a denotes the confidence interval. The similarity in shape and magnitude of the predicted confidence interval and the results from the simulations suggests that the dataset faithfully reproduces the variance between patients, and that the selected number of pixels per class (2000) was sufficient to represent each class adequately.

The results of this simulation also suggest that the annotation method described above, which often yields hundreds or thousands of individual pixel spectra for each annotated spot, produces a representative sampling of tissue homogeneity and patient-to-patient variance. This result is that, in contrast to other cancer diagnostic methods that yield one data point per patient whereas in SHP, thousands of data points are created with the present example implementation for each patient. Furthermore, these results indicate that repeated random selection of spectra may reduce the impact of having only one pathologist (in addition to the surgical pathologist at Biomax) review/annotate the samples; that is, the repeated random selection of pixel spectra produces a heterogeneity in the training set that is comparable in magnitude to the heterogeneity due to different pathologists.

As discussed above, the sub-test set was analyzed by SVM5 trained on the sub-training set. Together, these datasets contained 173 patients, and the composition of the sub-training set is shown in Table XIV. As discussed previously, the number of patients listed in Table XIV exceeds the number of patient samples since the annotation of most spots resulted in two or three tissue classes. The sub-test set had a similar composition in terms of patient numbers. These datasets were analyzed in four different ways, referred to herein as Tests 1-4. Test 1 was an overall pixel-based analysis; that is, all pixels from the annotation groups to be classified were combined into five balanced data sets from which pixel spectra were picked randomly for the training of the algorithm. Test 1 was carried out in a cumulative and a noncumulative manner. In the former, one class, e.g., SCLC, was tested against a combined dataset of all other classes, whereas in the non-cumulative test, the number of pixel spectra and patients remaining after each step decreased by the number of pixel spectra that were classified in the previous step.

TABLE XIV

Composition of S010 Sub-training Set

| Annotated Regions | Number of Pixel Spectra | Number of patients | Description |
| --- | --- | --- | --- |
| 197 | 9700 | 10 | Lung/ADC/Acinar/mucinous group |
| 84 | 2872 | 5 | Lung/ADC/Acinar/non-mucinous |
| 14 | 879 | 2 | Lung/ADC/Lepidic/mucinous group |
| 49 | 1929 | 2 | Lung/ADC/Lepidic/non-mucinous |
| 13 | 247 | 4 | Lung/ADC/Micro-papillary group |
| 10 | 1383 | 2 | Lung/ADC/Papillary/mucinous group |
| 23 | 1379 | 1 | Lung/ADC/Papillary/non-mucinous |
| 113 | 7007 | 7 | Lung/ADC/Solid/mucinous |
| 66 | 3561 | 3 | Lung/ADC/Solid/non-mucinous |
| 350 | 15689 | 17 | Lung/SCLC/Other/grade 4 |
| 20 | 1647 | 1 | Lung/SqCC/Basaloid group |
| 54 | 4830 | 5 | Lung/SqCC/Other/grade 1 |
| 122 | 12066 | 12 | Lung/SqCC/Other/grade 2 |
| 83 | 5942 | 7 | Lung/SqCC/Other/grade 3 |
| 108 | 9785 | 12 | Lung/Necrosis/necrotic ADC |
| 159 | 11615 | 13 | Lung/Necrosis/necrotic SCLC |
| 140 | 6903 | 16 | Lung/Necrosis/necrotic SqCC |
| 306 | 8073 | 20 | Lung/Alveolar/Normal (histomorphologically) |
| 99 | 1368 | 18 | Lung/Alveolar/Wall thickened by fibrosis |
| 220 | 4026 | 19 | Lung/Alveolar/Wall with congested capillaries |

TABLE XIV-continued

Composition of S010 Sub-training Set

| Annotated Regions | Number of Pixel Spectra | Number of patients | Description |
| --- | --- | --- | --- |
| 45 | 656 | 12 | Lung/Blood Cells group |
| 14 | 110 | 3 | Lung/Blood Plasma/Plasma (with Fibrinogen) |
| 29 | 388 | 10 | Lung/Blood Plasma/Serum group |
| 14 | 357 | 6 | Lung/Blood Vessel/Wall group |
| 78 | 2238 | 13 | Lung/Blood Vessel/Wall Muscle |
| 6 | 228 | 2 | Lung/Bronchiole/Wall Columnar Epithelium |
| 9 | 155 | 4 | Lung/Bronchiole group |
| 25 | 1171 | 3 | Lung/Connective Tissue/Black Carbon Pigment |
| 26 | 1439 | 8 | Lung/Connective Tissue group |
| 25 | 907 | 5 | Lung/Keratin Pearl/Epithelial Pearl |
| 2501 | 118550 | | |

Test 2 was based on a leave-one-out cross validation (LOOCV) methodology. In this example implementation, data were analyzed on a pixel-base as in Test 1, but the "test set" was the one patient in the dataset not used for training.

Test 3 was implemented in order to assess the accuracy of SHP on a patient-by-patient level against the pathological diagnosis from US Biomax. For this test, rules had to be created that define "agreement" and "disagreement" with the pathological diagnoses. These rules are discussed further below.

Test 4 was a graphic rendering of the SHP diagnosis, as compared to the pathologist's annotation.

The results of the non-cumulative pixel-based test are shown in Table XV A. The order of the test procedure is given in the Table, i.e., from Cancer vs. Normal to SqCC vs. ADC. The combined accuracy of all classification steps is 93.2%

TABLE XV A

Non-cumulative Pixel-based Classification of Pixel Spectra in the Sub-test set (S010)

| Classification | Average |
| --- | --- |
| Cancer vs. Normal | 98.3% |
| SCLC vs. Not | 92.4% |
| Necrosis vs. Not | 94.7% |
| SqCC vs. ADC | 87.5% |

The results of the cumulative pixel-based test are shown in Table XV B. In the present example implementation, the total true positive (TP), true negative (TN), false positive (FP) and false negative (FN) classifications against all other classes are listed for the Sub-test dataset that contained a total of 120,145 pixel spectra. The overall accuracy of the cumulative test, 92.5%, was similar to the step-wise accuracy. In both cases, the same trend was observed that the classification of cancer vs. normal had the highest accuracy, indicating that all disease states (i.e., all the cancer classes as well as necrosis) differ spectrally quite significantly from the spectra of normal tissue. These differences often involve changes in the nucleic acid spectral envelopes, as well as a more complex pattern in the amide I region. The classification of necrosis had the second highest accuracy; classification may be understood by the occurrence of an additional band in the second derivative spectra at ca. 1635 cm$^{-1}$ in the amide I manifold which is a spectral signatures of denatured and precipitated proteins.

TABLE XV B

Cumulative Pixel-based Classification of Pixel Spectra in the Sub-test set (S010)

|  | Normal | SCLC | Necrosis | SqCC | ADC |
|---|---|---|---|---|---|
| true_positives | 7665 | 18510 | 14771 | 32653 | 24021 |
| false_positives | 1989 | 1328 | 4051 | 7147 | 8010 |
| true_negatives | 110427 | 93073 | 99584 | 73640 | 81331 |
| false_negatives | 64 | 7234 | 1739 | 6705 | 6783 |
| accuracy | 98.3% | 92.9% | 95.2% | 88.5% | 87.7% |

SCLC was detected with 92.4% and 92.9% accuracy in the non-cumulative and the cumulative tests, respectively. Finally, the discrimination between SqCC and ADC was achieved with 87% accuracy. This classification is also the most difficult to carry out in classical histopathology, in particular in the case of poorly differentiated carcinomas. Furthermore, these two cancer types my occur as mixed adeno-squamous carcinomas, which may aggravate both the annotation process, as well as the SHP classification.

Cancer sub-classification of the ADC group was carried out, as well. An unsupervised analysis of the mean class spectra of acinar, lepidic, solid, papillary and micro-papillary sub-classes indicated that these classes split according the International Association for the Study of Lung Cancer (IASLC) categories of low grade (100% five year survival), intermediate grade (80-90% five year survival) and high grade (60-75% five year survival). A subsequent SVM classifier for the purpose of discriminating between ADC subtypes achieved an overall accuracy of about 90%.

The pixel-based LOOCV was carried out on the entire sub-training set of 173 patients. The (very time consuming) LOOCV yielded classification accuracies, shown in Table XVI that were nearly identical to those reported in Table XV A above. LOOCV is used frequently in medical statistics when the size of the datasets is small since the training of the classifier was being carried out for nearly the entire dataset. The fact that the LOOCV results here are nearly identical to those from the 50:50 split of the dataset indicates that the patient number is sufficient to ascertain a statistically significant result.

The previous discussion presented results on a pixel spectrum basis, where the gold standard was the annotation by the pathologist. Thus, only annotated pixels were included in this test, and the annotated pixels, as indicated in Table IX, represented a relatively small fraction (ca. 14%) of the entire data collected. In order to assess whether or not SHP properly diagnosed the majority of each tissue area, another test procedure was established that used all pixels in a tissue spot and the Biomax diagnosis as the gold standard.

TABLE XVI

Leave-one-out Cross Validation Results of the Combined Sub-training and Sub-test Datasets

| Classification | Average Accuracy | Number of Patients |
|---|---|---|
| Cancer vs. Normal | 98.60% | 174 |
| SCLC vs. Not SCLC | 95.50% | 134 |
| Necrosis vs. Not | 94.20% | 99 |
| SqCC vs. ADC | 86.40% | 99 |

To determine the performance of the multi-classifier on full samples, all pixel spectra of each of the 94 tissue spots within the sub-testing set were run through the multi-classifier. This approach produced a classification for every pixel spectrum in a tissue spot, both annotated as well as un-annotated. Each spot was assigned class numbers for the five major classes (1-Normal, 2-SCLC, 3-Necrosis, 4-SqCC and 5-ADC), as follows. A positive class number was assigned to pixel spectra when their SHP prediction agreed with the major Biomax pathology, and a negative class number otherwise. Thus, a negative number (−1) would be assigned to pixels in normal tissue regions in a tissue spot that was diagnoses cancerous by Biomax. Similarly, a negative value (−3) would be assigned to necrotic regions in a cancerous spot when necrosis was not explicitly identified in the Biomax diagnosis, but a number of +3 for an equivalent region of a cancerous spot where necrosis was diagnosed by Biomax. This step resulted in a correlation of all major Biomax diagnoses found in the TMAs with SHP as summarized in Table XVII.

TABLE XVII

Biomax pathology to SHP correlation

| Biomax | Classification | Label |
|---|---|---|
| Normal (cancer | [1] | Normal (no cancers or necrosis) |
| SCLC | [−1 2 −3 −4 −5] | SCLC with optional normal |
| SCLC | [−1 2 −3 −4 −5] | SCLC with optional normal, necrosis, SqCC |
| SCLC with | [−1 2 3 −4 −5] | SCLC with optional normal, necrosis, SqCC |
| SqCC | [−1 −2 −3 4 −5] | SqCC with optional normal |
| SqCC with | [−1−2 3 4 −5] | SqCC and necrosis with optional normal |
| ADC | [−1 −2 −3 −4 5] | ADC with optional other classes |
| ADC with | [−1 −2 3 −4 5] | ADC and necrosis with optional normal |
| ADC (mucinous) | [−1 −2 −3 −4 5] | ADC with optional normal |
| ADC (papillary) | [−1 −2 −3 −4 5] | ADC with optional normal |

*at least one positive classification is required, negative ones are optional

The following rules for whole spot analysis were established:

A threshold value of pixels (see below) was required before any class was considered significant.

At least one positive class value was required to be present for a given tissue spot; that is, the tissue class corresponding to the major Biomax diagnosis had to be represented in the SHP result with a pixel number above the threshold value.

Classes with negative values were optional and could be present within the spot without triggering a "non-match" (for example, normal areas in a cancerous spot); however, if the number of pixel spectra in one of the 'negative' classes exceeded the threshold and the primary 'positive' diagnostic class, a "non-match" was recorded for that spot.

The threshold values were applied to all classes, and varied between 200 and 2000 pixel spectra. For a threshold of 400 pixel spectra, an optimum performance of the method was realized. At the spatial resolution of the processed data, 400 pixels correspond to approximately 100 cells in an area of about 200 µm×200. This approach corresponds roughly to the field of view of a visible microscope at 20× magnification, and 100 cancerous cells in the field of view would certainly trigger a pathologist's response as to the presence of cancer. A lower threshold would increase the sensitivity of the SHP classification at the expense of the specificity. The results of this whole spot analysis are presented in Table XVIII.

Further aspects of the present invention will now be described that relate to features for developing a data master reference and/or a correlation/translation algorithm or other function that enables equating of data sets from one platform to another or from one machine to another or from the same machine at different points in time so as to enable standardizing of IR signatures for use to define and describe clinical representation of disease states, types and tissue features within and among samples.

FIG. 23B shows an overlay of the annotation regions selected by the pathologist (bright green), and the whole spot

TABLE XVII

Results of the whole spot classification

|  | Normal | NOT Normal |  | SCLC | NOT SCLC |  | Necrosis | NOT Necr. |
|---|---|---|---|---|---|---|---|---|
| Normal | 45 | 2 | SCLC | 22 | 1 | Necrosis | 37 | 4 |
| NOT Normal | 0 | 47 | NOT SCLC | 0 | 71 | NOT Necr. | 0 | 53 |
| Sensitivity | 95.7% | 100.0% sensitivity |  | 95.7% | 100.0% sensitivity |  | 90.2% | 100.0% |
| Specificity | 100.0% | 95.7% specificity |  | 100.0% | 95.7% specificity |  | 100.0% | 90.2% |
| accuracy | 97.9% | 97.9% accuracy |  | 98.9% | 98.9% accuracy |  | 95.7% | 95.7% |

|  | SqCC | NOT SqCC |  | ADC | NOT ADC |
|---|---|---|---|---|---|
| SqCC | 41 | 0 | ADC | 53 | 1 |
| NOT SqCC | 0 | 53 | NOT ADC | 0 | 40 |
| sensitivity | 100.0% | 100.0% | sensitivity | 98.2% | 100.0% |
| specificity | 100.0% | 100.0% | specificity | 100.0% | 98.2% |
| accuracy | 100.0% | 100.0% | accuracy | 98.9% | 98.9% |

The graphic depiction of classification results is valuable, since it may be used by a pathologist as an ancillary tool for the diagnosis of some biopsies that are not uniform, or do not present a clear answer. FIG. 22 shows the results of three different label-images from the test set for different necrosis and cancer classes. The left row panels show the H&E stained images of the tissue spots, the second row panels the regions annotated by the pathologist, depicting the appropriate diagnosis by color code (see further discussion below), and the third column the SHP prediction, depicted in the same color code. The right-most column depicts false positive and false negative SHP diagnoses in red. The color code utilized in FIG. 22 is as follows: green; necrosis; yellow: SCLC; blue: SqCC purple: ADC; red: misclassifications. The results presented in FIG. 22 are typical for those obtained for the label-image approach, and the quality of agreement represents the majority of the spots analyzed. It should be noted that the results in the third column, i.e., the SHP prediction on a pixel-basis was obtained in a blinded fashion: the datasets of the spots analyzed were pre-processed and annotated such that a true-false decision of the SHP results could be rendered; however, these spots were not used in the training of the classifier at all, but were analyzed in a blinded manner. Thus, the agreement shown between the second and the third column of images truly represents the ability of the classifier to distinguish the different cancer types. It also should be noted that the misclassifications, shown both in the third and fourth column images, occur mainly at edges of tissues and thus, are most likely due to poor signal quality of the pixel spectra. There are, of course, a few tissue spots where the US Biomax pathology and the SHP prediction disagree; in these, it is always the cancer type, and not the presence or absence of cancer, which is not properly predicted.

label images obtained by SHP. This image demonstrates the agreement between the regions selected by the pathologist and the overall regions of disease. FIG. 23A shows the corresponding HCA cluster image that was used by the pathologist in the annotation process. The homogeneity of the annotation regions selected by the pathologist critically depends on the overlay of the visual and HCA images, and FIGS. 23A and 23B demonstrate that the annotation procedure developed for the establishment of the databases produces highly specific and homogeneous databases. This particular image demonstrates why the SHP results seem to be more accurate than expected from an accepted level of diagnostic accuracy of classical histopathology: the algorithms reported here were trained on datasets that contained very carefully selected regions of disease upon which more than one pathologist agreed. The selected regions may be considered quintessential for a disease type/stage and thus, may enable an MLA to detect specific, recurring features in these typical spectra from other samples.

The vaulted dataset of a total of 194 patients yielded excellent accuracy as well. When this dataset was analyzed by an algorithm trained on the entire training set using the Test 3 procedure introduced above, only nine patients were misclassified (one false positive and eight false negatives). Among the false negatives, there were three patients for whom the cancer was predicted correctly, but the necrotic co-diagnosis was missed by SHP. Thus, there were only five patient samples out of 194 in which SHP produced an incorrect cancer diagnosis; this corresponds to an overall cancer detection accuracy of 97%. In all the five false negative diagnoses, SHP detected cancer, but not the cancer diagnosed at the US Biomax level: three patients diagnosed by Biomax as ADC with necrosis were assigned by SHP to SCLC classes, one SqCC with necrosis patients was assigned to ADC with necrosis (with a smaller percentage of SqCC) by SHP, and one SqCC sample was assigned as ADC. A final re-evaluation of these misdiagnosed cases is pending.

Figure 24:
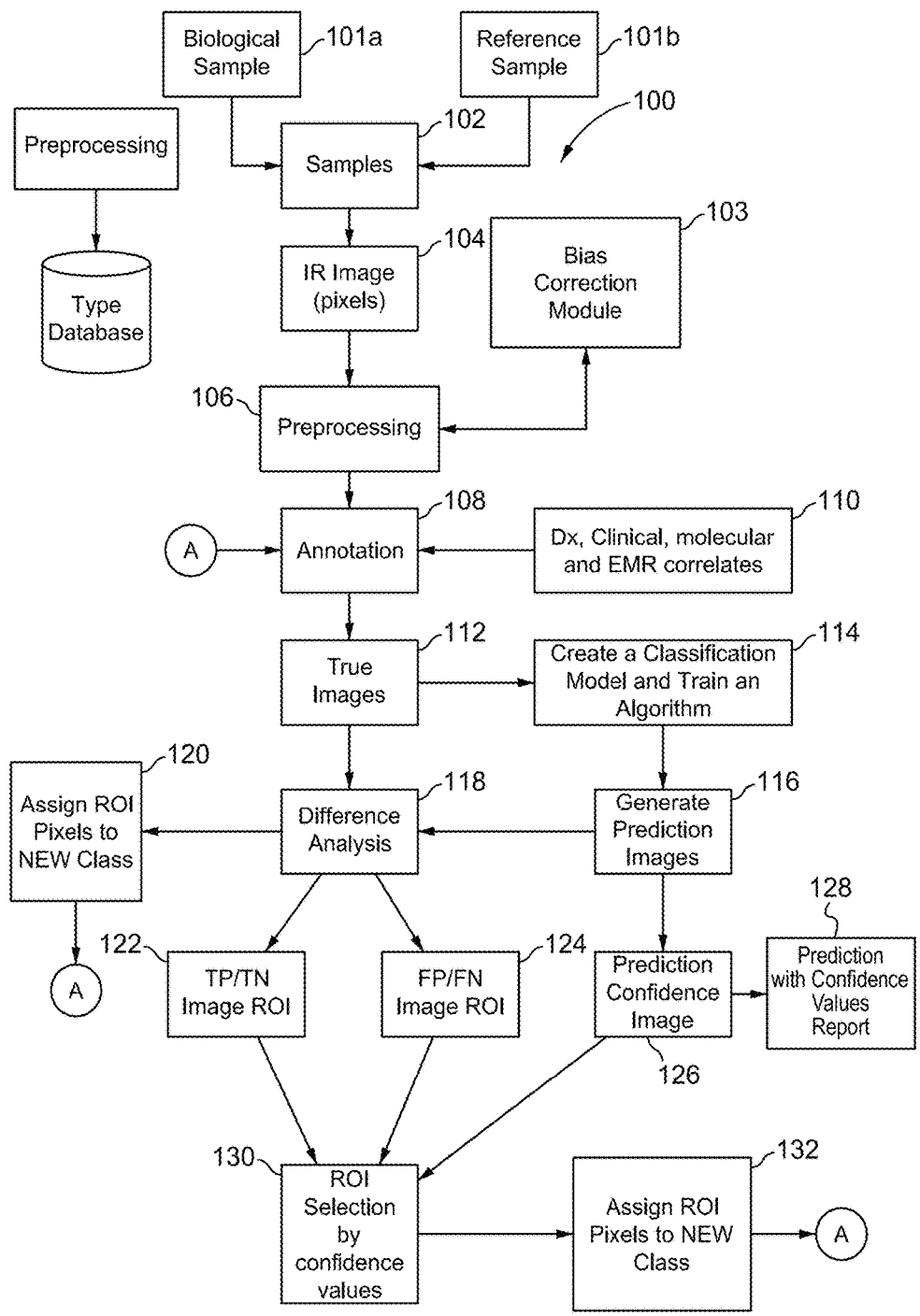
FIG. 24 illustrates an example of the method flow for analyzing a spectral dataset from a biological specimen to provide a diagnosis, prognosis, and/or predictive classification of a disease or condition, with an additional feature of a bias correction module, in accordance with aspects of the present invention.

FIG. 24 illustrates a variation of the example of a system 100 of FIG. 3 that may interconvert datasets collected from different laboratories utilizing different instruments. Specifically, as discussed above, in spectral histopathology (SHP), tissue samples (e.g., biological samples 101a) from biopsies may be analyzed using infrared micro-spectroscopy to produce infrared pseudo-color images of the tissue sample that reproduce the anatomical and pathological features of tissue with high fidelity. However, the infrared pseudo-color images of the tissue sample may be generated using any number of methods and/or equipments. For example, in some aspects, a single tissue sample may be analyzed using a first infrared imaging system manufactured by Manufacturer A and a second infrared imaging system manufactured by Manufacturer B. Due to variations in the equipment and/or the environment under which the images are captured, each of the first and the second infrared imaging systems may produce different spectral images of the same biological sample. Such variations may be attributable to the fact that each of the different imaging systems or instruments may use different pixel sizes and data point spacing in the spectral vectors when generating the spectral image.

Therefore, in order to correct deviations, correlate, or otherwise make information comparable or compatable that may result from different laboratories using different infrared imaging micro-spectrometers, for example, aspects of the present disclosure employ a bias correction module 103 that is configured to process data associated with the spectral images by utilizing a reference spectral standard (e.g., based on information from a reference sample 101b) to identify variances attributable to different machines and platforms that is independent of the biological sample being analyzed. The equipment bias correction 103 may correct the deviations by utilizing a two-step process: (1) establishing a baseline difference in images captured by a plurality of image generating machine(s) (e.g., different infrared imaging micro-spectrometers); and (2) applying data compatibility function to subsequent images of biological samples captured by the image generating machine(s) to account for identified differences. Various aspects of the process will now be described in detail with reference to the FIG. 3.

Figure 25:
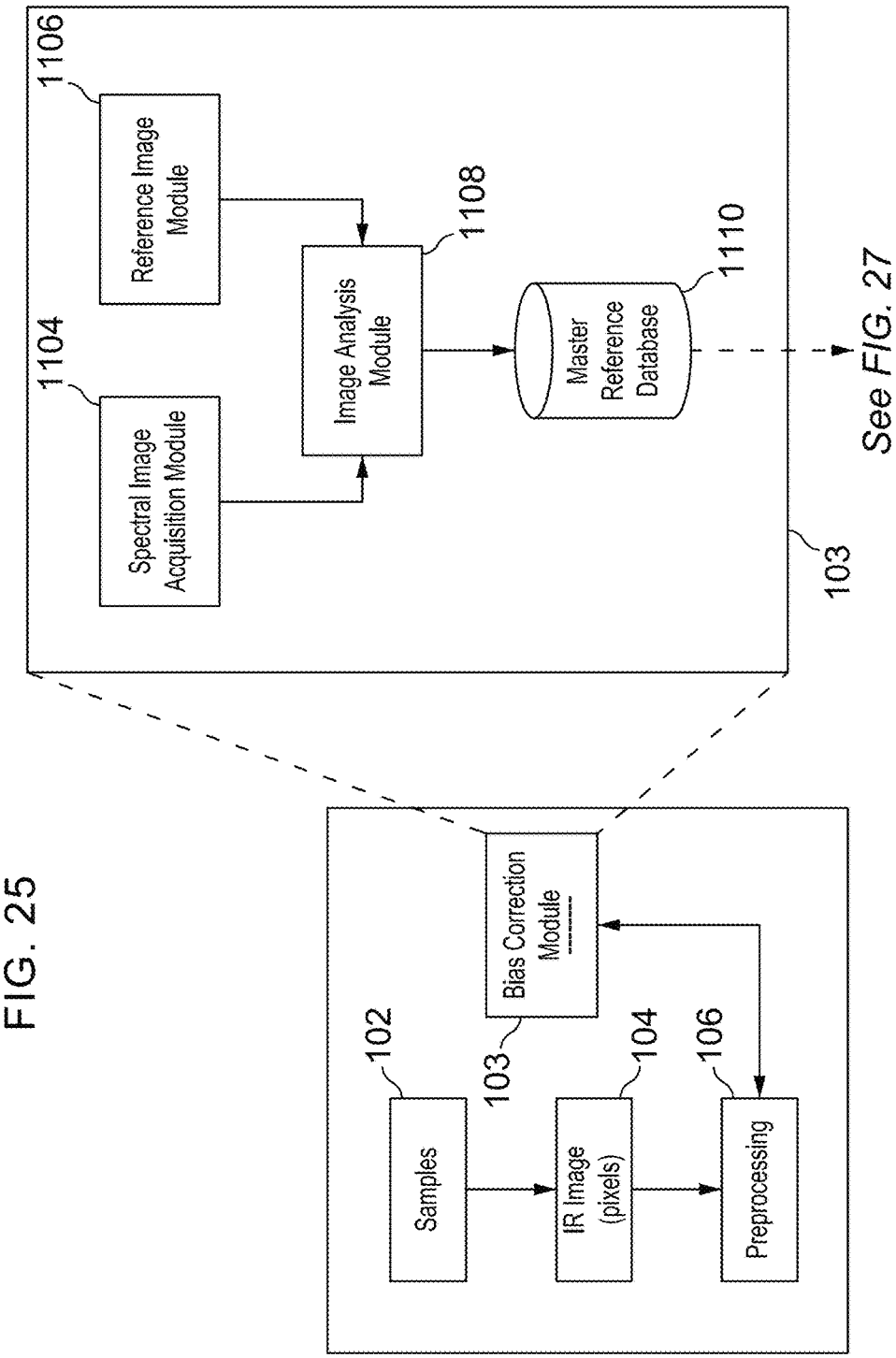
FIG. 25 illustrates various aspects relating to a bias correction module in communication with the preprocessing module, in accordance with aspects of the present invention.

FIG. 25 illustrates aspects of a bias correction module 103 in communication with the preprocessing module 106. In some aspects, the bias correction module 103 and the preprocessing module 106 may be an example of the bias correction module 103 and the preprocessing module 106 described above with reference to FIG. 24.

Turning back to FIG. 25, bias correction module 103 may include a spectral image acquisition module 1104 and a reference image module 1106. In some aspects, identifying baseline differences between a spectral image captured using a first infrared imaging system with a known reference, which may be based on a biological or non-biological sample, may comprise utilizing a spectral image acquisition module 1104 to receive a spectral image from a first image generating machine (e.g., infrared imaging micro-spectrometers from a first laboratory) and compare the spectral image with a reference image captured by the reference image module 1106. In some aspects, the reference image module 1106 may be captured using a second image generating machine (e.g., master infrared imaging micro-spectrometers) with the same reference background substrate as used by the first image generating machine. In some examples, the spectral image may be captured using a reference sample. The reference sample may be a biological sample or a sample designed with a specified chemical composition selected to provide the reference biochemical signature Upon receiving the spectral image from the spectral image acquisition module 1104 and the reference image from the reference image module 1106, the image analyses module 1108 may perform binary comparison of the two datasets associated with each of the images. The binary comparison may be a linear transformation or a nonlinear transformation. The comparison may be used to generate a compatibility function. The transformation and resulting compatibility function may a function of feature and/or wavenumber. The compatibility function could be a function of absorbance or intensity, for example. Specifically, the image analysis module 1108 may construct gray scale images of each of the spectral image and the reference image from each of the infrared datasets by integrating each pixel spectrum in the dataset and converting the resulting intensity to a gray scale value that may be displayed at the coordinates of the pixel spectrum. In some aspects, the resulting grayscale infrared images may be coarsely registered by selecting a plurality of identifiable features on the images (e.g., cracks or voids). Once the two images are registered such that any two points on the images (i.e., spectral image and the reference image) correspond with each other, the image analysis module 1108 may identify similarities and contrasts between the two images. In one example, the image analysis module 1108 may plot an absolute value of the pixel-by-pixel difference between a first dataset associated with the spectral image and a second dataset associated with the reference image. Likewise, similarities between the two images may also be assessed by computing the pixel-by-pixel correlation coefficient $C^{AB}$ by each spectral vector $S^A$ and $S^B$ of the two datasets. In some aspects, the parameter "A" may refer to dataset associated with the spectral image and the parameter "B" associated with the reference image. Accordingly, the differences and similarities identified by the image analysis module 1108 may be stored in the master reference database 1110 for future reference. Specifically, once the baseline differences between the image generating machine(s) have been identified, the preprocessing module 106 may be able to access a signature information associated with each of the image generating machine(s) and apply unique functionality to each of the different equipments to correct any bias and/or variances attributable to different machines and platforms that is independent of the biological sample being analyzed.

With respect to the second part of the two-step process, the preprocessing module 106, upon subsequently receiving a biological sample image captured by the first image generating machine, may access the master reference database 1110 of FIG. 25 to identify a correction factor that may be applied to the biological sample image. Specifically, the preprocessing module 106 may apply a data compatibility function to the biological sample image based on the stored signature information associated with the first image generating machine and generate a modified biological sample image and/or modified dataset to correct the bias and/or variance attributable to the first image generating machine. In some aspects, applying the data compatibility function may include using a three-dimensional interpolation function to convert all datasets of the biological sample image to data point spacing and pixel size that corresponds with the pixel size of the master infrared imaging system. Additionally or alternatively, applying the data compatibility function and/or a correction factor to the biological sample image may include applying phase correction and vector normalization to the biological sample image.

Accordingly, in some aspects, the combination of the bias correction module 103 and the preprocessing module 106 may allow datasets collected from different instrument types (or same instrument at different times) can be interconverted such that the spectral information is independent of the instrument type used to capture the biological sample image.

Figure 26:
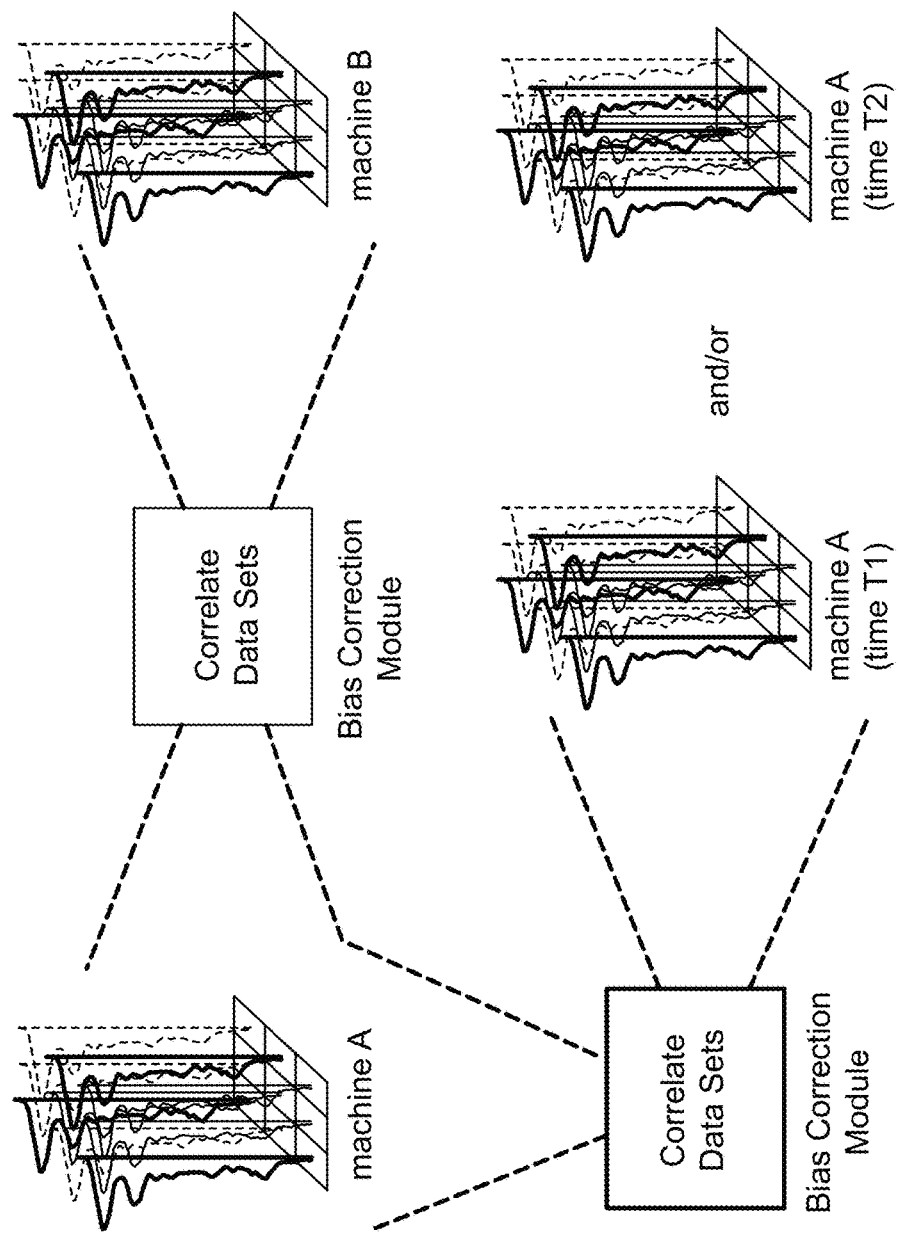
FIG. 26 is a representative diagram of a method flow for analyzing and/or correlating information from among machines or for a single machine at differing times or under other differing conditions, in accordance with aspects of the present invention.

FIG. 26 is a representative diagram of a method flow for analyzing and/or correlating information from among machines or for a single machine at differing times or under other differing conditions, in accordance with aspects of the present invention. As shown in FIG. 26, various information, including, for example, from the bias correction module of FIG. 24 and/or the information from a biological sample and/or a reference sample of FIG. 24 may be corrected or otherwise correlated, made comparable, or made compatable. For example, as shown in row (1) of FIG. 26, such information to be corrected or otherwise correlated, made comparable, or made compatable may be obtained from two different machines, machine A and machine B, and information relating to the reference sample may be used for such purpose.

Figure 27:
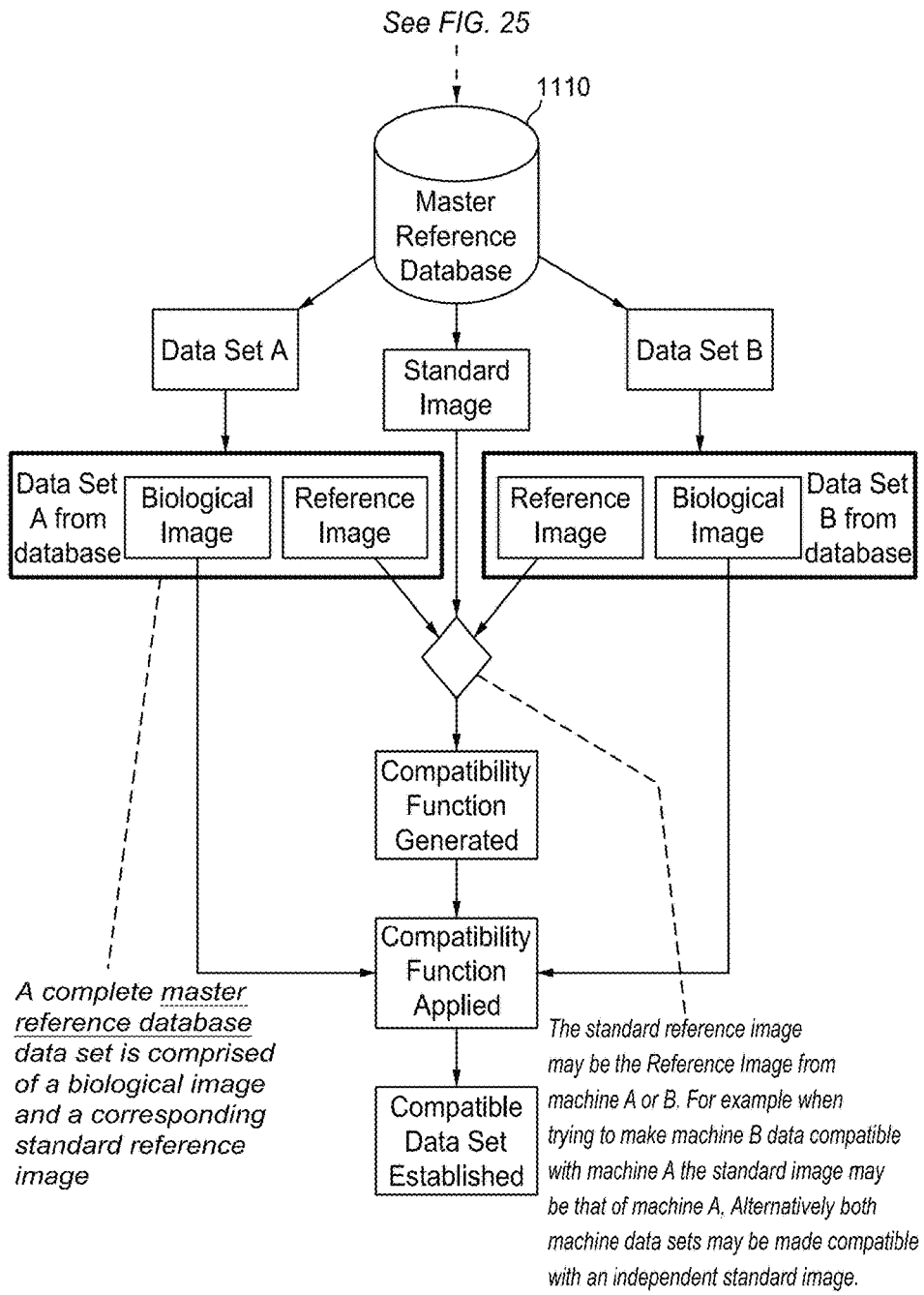
FIG. 27 illustrates various aspects of application of the bias correction module of FIG. 25 among machines or for a single machine at differing times or under other differing conditions, such as to analyze or correlate information, in accordance with aspects of the present invention.

FIG. 27 further illustrates various aspects of application of the bias correction module of FIG. 25 among machines or for a single machine at differing times or under other differing conditions, such as to analyze or correlate information, in accordance with aspects of the present invention. As shown in FIG. 27, data set A may include, for example, data relating to a first biological sample for a first machine, and data set B may include, for example, data relating to a second biological sample for a second machine. Alternatively, for example, data set A may include data relating to a single biological sample for a single machine at a first time, and data set B may include data relating to the single biological sample for the single machine at a second time.

As further shown in FIG. 27, the resulting data sets A and B may include data relating to each corresponding biological sample information A and B, as well as reference related data for a reference or standard image (e.g., comparison data for the reference/standard image for a first machine associated with data set A and a second machine associated with data set B), for example. A computability function may be generated based on comparison of the reference image information to that produced in accordance the machine associated with data set A and data set B. The resulting compatibility function may then be applied to data set A and data set B for further use, for example, in correcting or otherwise correlating, making comparable, or making compatable the data from data sets A and B.

Figure 28:
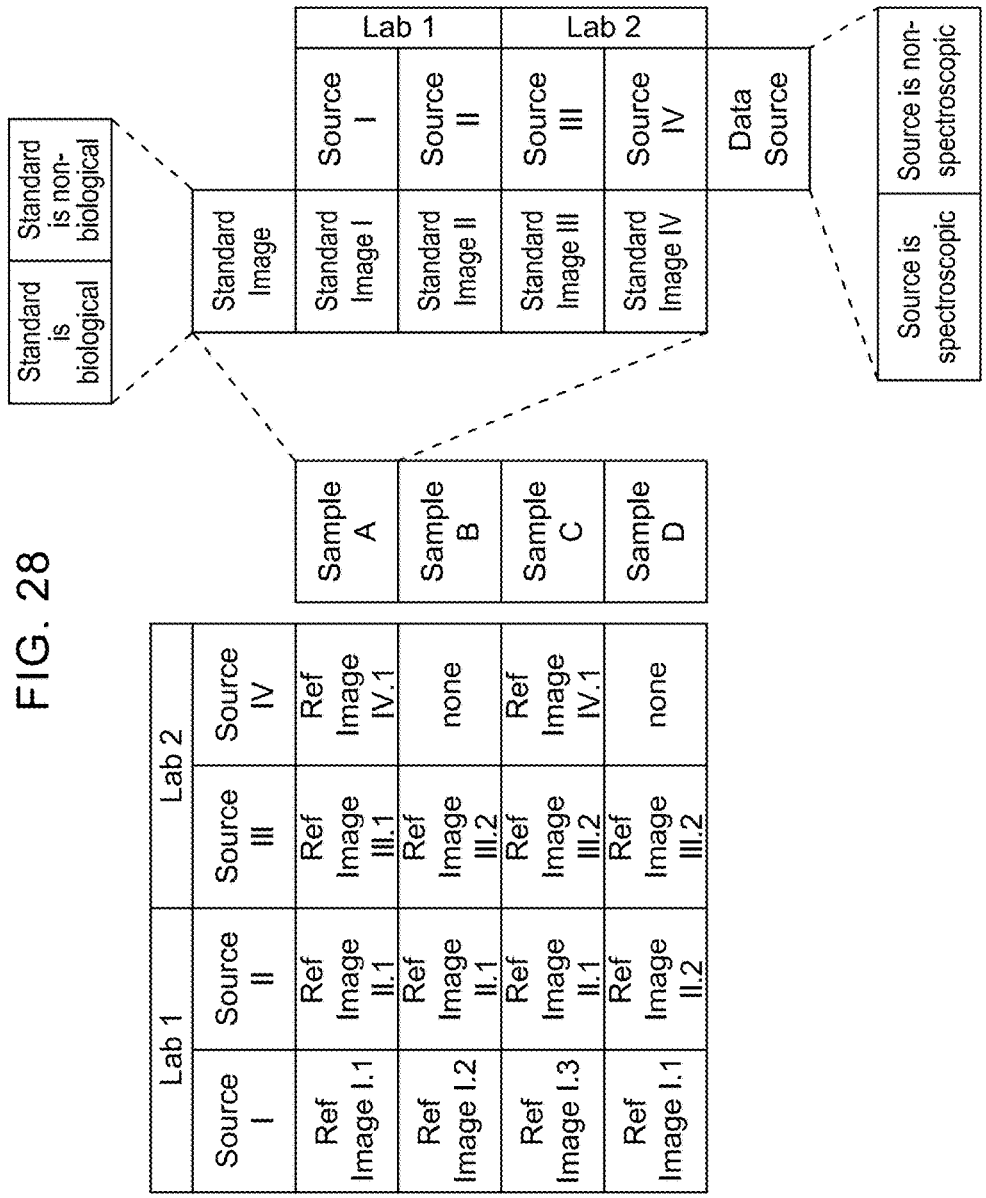
FIG. 28 contains a representative diagram of examples for correcting or otherwise correlating, making comparable, or making compatible data from various data sets, per FIGS. 24-27 and the discussion relating thereto.

FIG. 28 contains a representative diagram of examples for correcting or otherwise correlating, making comparable, or making compatible data from various data sets, per FIGS. 24-27 and the discussion relating thereto. As shown in FIG. 28, different laboratories (e.g., "Lab 1" and "Lab 2") may have multiple sources (e.g., equipment) for producing images (e.g., Sources I and II and Sources III and IV, respectively). These sources may produce images, for example from Samples A-C. The samples may be biological or non-biological. The data source may be spectroscopic or non-spectroscopic. A standard image may be used in conjunction with each of the sources to produce Standard Images I-IV. Applicability of the various aspects of FIGS. 24-27 and accompanying description will now be described using examples.

Based on FIGS. 24-27 and the description relating thereto, it may be apparent in the example of FIG. 28 that various situations could arise in which differences in the sources and/or samples may result in the need for correcting or otherwise correlating, making comparable, or making compatible data from the various data sets. In a first example, Sample A is imaged in Lab 2 on Source I and must be made comparable to Lab 2 Source III. A compatibility function may be derived by applying operation of the bias correction module for Ref. Image I.1 and Ref. Image III.1.

In a second example, Sample B is imaged at Lab 1 on Source II, and the image must be made comparable to Lab 2 Source IV. A compatibility function is derived using Ref. Image I.1 and a reference image for Source IV. Note that there is no reference image associated with Sample B, Lab 2, Source IV, so the data-machine compatibility function cannot be established directly by data set association. Standard Image IV is available and is not directly associated with a data set. This image (Standard Image IV) may be used to derive the standard-machine compatibility function for Sample B, between Labs 1 and 2 and machines I and IV, respectively.

In a third example, Sample C is imaged at Lab 2 on Source III, and the results of the analysis must be made comparable to a study performed at Lab 1 on Source I with Sample A. A compatibility function may be derived using Ref. Image III.2 and Ref. Image I.1.

In a fourth example, Sample D is imaged at Lab 2 on Source III, and the results of the analysis must be made comparable to a study performed at Lab 2 on source III with Sample B. A compatibility function may be derived using Ref. image III.2. Since the data is from the same machine and associated with the same reference image, the data is compatable, although variations may occur due the passage of time (e.g., machine drift for Source III).

In a fifth example, it is desirable to merge data from Lab 1 and Lab 2. Lab 1 requests data from Lab 2 be sent with associated reference image(s) and the standard image for associated machines used to acquire data. Data is checked to verify if machine drift has occurred by comparing reference and standard images for data from Lab 2. Reference and/or standard images are used to derive compatibility functions.

Figure 29:
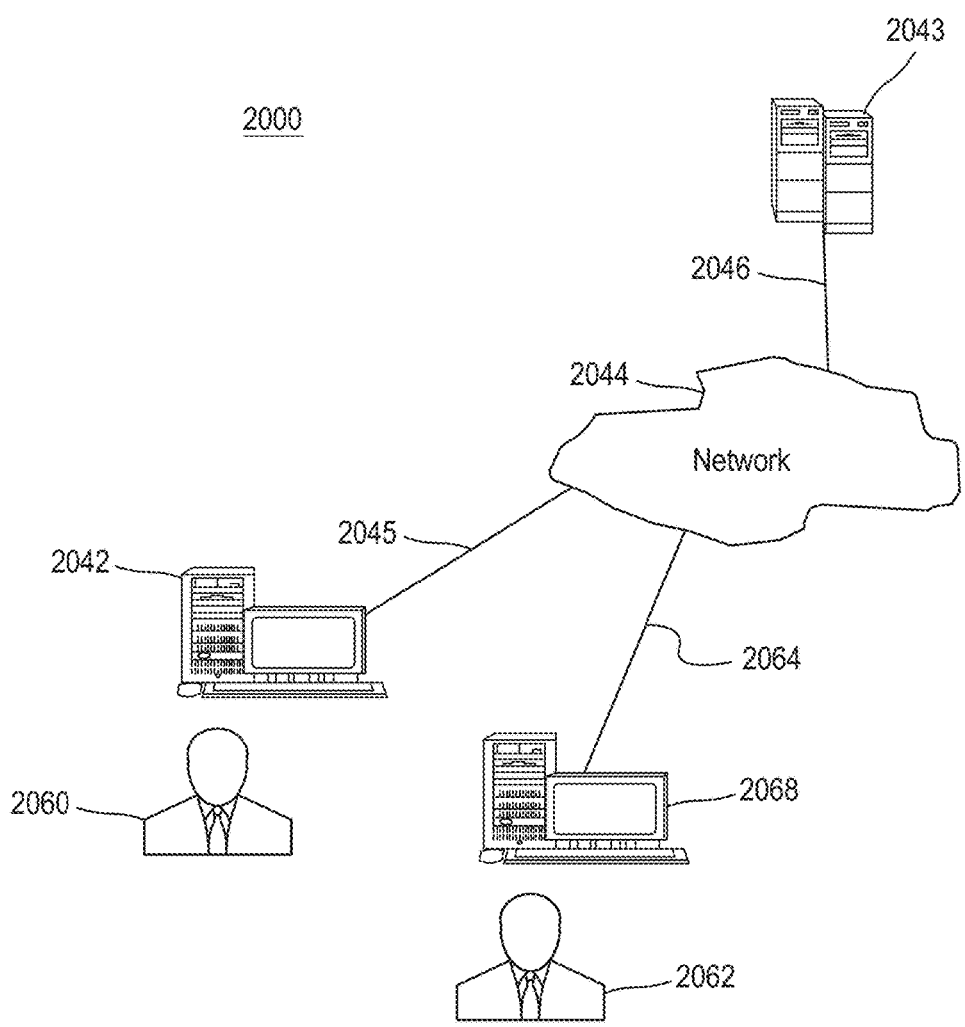
FIG. 29 shows various features of a computer system for use in conjunction with aspects of the invention

FIG. 29 shows various features of an example computer system 2000 for use in conjunction with methods in accordance with aspects of invention. As shown in FIG. 29, the computer system 2000 is used by a requestor/practitioner or other user 2060, 2068 or a representative of the requestor/practitioner thereof via a terminal 2042, 2068, such as a personal computer (PC), minicomputer, mainframe computer, microcomputer, telephone device, personal digital assistant (PDA), or other device having a processor and input capability. The server model comprises, for example, a PC, minicomputer, mainframe computer, microcomputer, or other device having a processor and a repository for data or that is capable of accessing a repository of data. The server 2043 may be associated, for example, with an accessibly repository of disease-based data such as training sets and/or algorithms for use in diagnosis, prognosis and/or predictive analysis.

Any of the above-described data may be transmitted between the practitioner and SHP system (or other user), for example, via a network 2044, such as the Internet, for example, and is transmitted between the analyst 2060, 2062 and the server 2043. Communications may be made, for example, via couplings 2045, 2046, and 2064, such as wired, wireless, or fiberoptic links.

Figure 30:
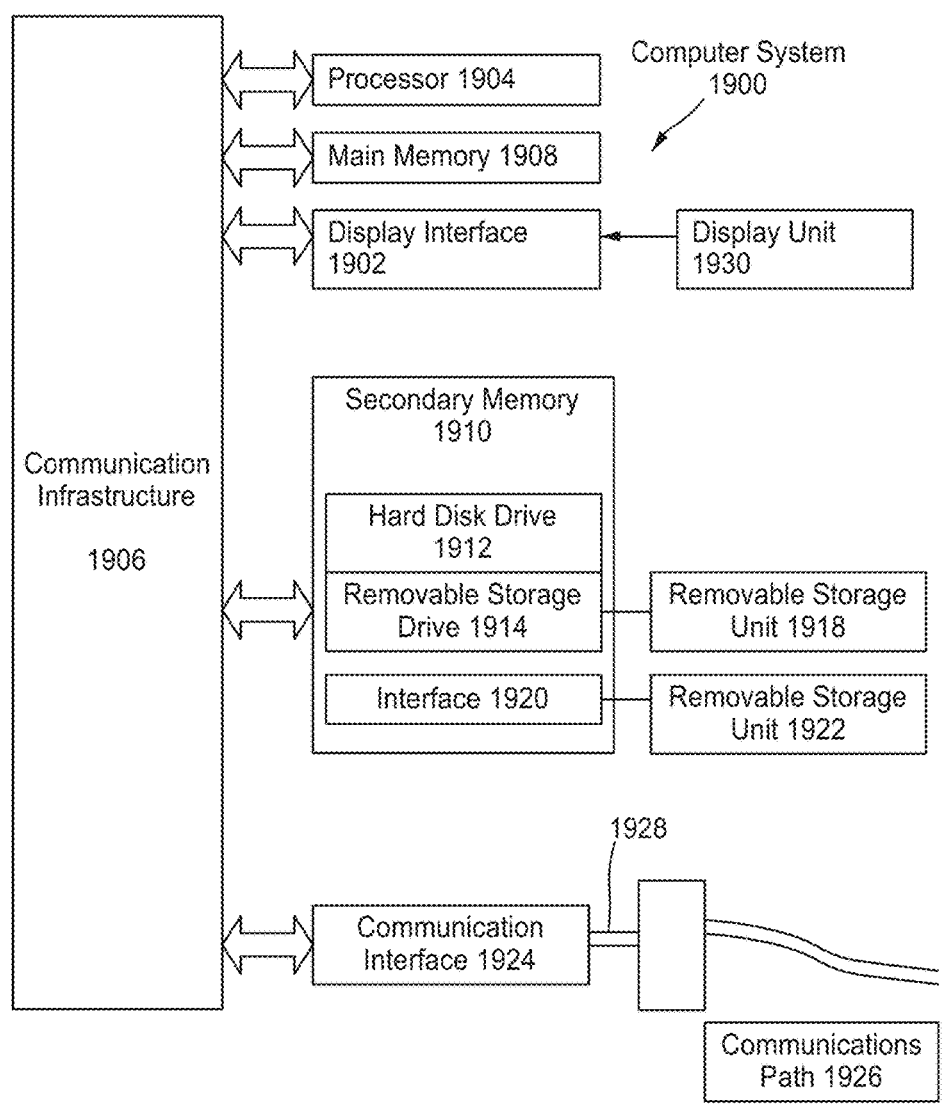
FIG. 30 shows an example computer system for use in conjunction with aspects of the invention.

Aspects of the invention may be implemented using hardware, software or a combination thereof and may be implemented in one or more computer systems or other processing systems. In one variation, aspects of the invention are directed toward one or more computer systems capable of carrying out the functionality described herein. An example of such a computer system 1900 is shown in FIG. 30.

Computer system 1900 includes one or more processors, such as processor 1904. The processor 1904 is connected to a communication infrastructure 1906 (e.g., a communications bus, cross-over bar, or network). Various software aspects are described in terms of this exemplary computer system. After reading this description, it will become apparent to a person skilled in the relevant art(s) how to implement the aspects of invention using other computer systems and/or architectures.

Computer system 1900 can include a display interface 1902 that forwards graphics, text, and other data from the communication infrastructure 1906 (or from a frame buffer not shown) for display on the display unit 1930. Computer system 1900 also includes a main memory 1908, preferably random access memory (RAM), and may also include a secondary memory 1910. The secondary memory 1910 may include, for example, a hard disk drive 1912 and/or a removable storage drive 1914, representing a floppy disk drive, a magnetic tape drive, an optical disk drive, etc. The removable storage drive 1914 reads from and/or writes to a removable storage unit 1918 in a well-known manner. Removable storage unit 1918, represents a floppy disk, magnetic tape, optical disk, etc., which is read by and written to removable storage drive 1914. As will be appreciated, the removable storage unit 2018 includes a computer usable storage medium having stored therein computer software and/or data.

In alternative variations, secondary memory 1910 may include other similar devices for allowing computer programs or other instructions to be loaded into computer system 1900. Such devices may include, for example, a removable storage unit 1922 and an interface 2920. Examples of such may include a program cartridge and cartridge interface (such as that found in video game devices), a removable memory chip (such as an erasable programmable read only memory (EPROM), or programmable read only memory (PROM)) and associated socket, and other removable storage units 1922 and interfaces 1920, which allow software and data to be transferred from the removable storage unit 1922 to computer system 1900.

Computer system 1900 may also include a communications interface 1924. Communications interface 1924 allows software and data to be transferred between computer system 1900 and external devices. Examples of communications interface 1924 may include a modem, a network interface (such as an Ethernet card), a communications port, a Personal Computer Memory Card International Association (PCMCIA) slot and card, etc. Software and data transferred via communications interface 1924 are in the form of signals 1928, which may be electronic, electromagnetic, optical or other signals capable of being received by communications interface 1924. These signals 1928 are provided to communications interface 1924 via a communications path (e.g., channel) 1926. This path 1926 carries signals 1928 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 1914, a hard disk installed in hard drive 1912, and signals 1928. These computer program products provide software to the computer system 1900. Aspects of the invention are directed to such computer program products.

Computer programs (also referred to as computer control logic) are stored in main memory 1908 and/or secondary memory 1910. Computer programs may also be received via communications interface 2024. Such computer programs, when executed, enable the computer system 1900 to perform the features in accordance with aspects of the invention, as discussed herein. In particular, the computer programs, when executed, enable the processor 1904 to perform such features. Accordingly, such computer programs represent controllers of the computer system 1900.

In a variation where aspects of the invention are implemented using software, the software may be stored in a computer program product and loaded into computer system 1900 using removable storage drive 1914, hard drive 1912, or communications interface 1924. The control logic (software), when executed by the processor 1904, causes the processor 1904 to perform the functions as described herein. In another variation, aspects of the invention are implemented primarily in hardware using, for example, hardware components, such as application specific integrated circuits (ASICs). Implementation of the hardware state machine so as to perform the functions described herein will be apparent to persons skilled in the relevant art(s).

In yet another variation, aspects of the invention are implemented using a combination of both hardware and software.

While aspects of this invention have been described in conjunction with the example features outlined above, alternatives, modifications, variations, improvements, and/or substantial equivalents, whether known or that are or may be presently unforeseen, may become apparent to those having ordinary skill in the art. Accordingly, the example aspects of the invention, as set forth above, are intended to be illustrative, not limiting. Various changes may be made without departing from the spirit thereof. Therefore, aspects of the invention are intended to embrace all known or later-developed alternatives, modifications, variations, improvements, and/or substantial equivalents.

The invention claimed is:

1. A method for classifying a biological sample, the method comprising:
   receiving an image of a biological sample;
   applying, via a processor, one or more algorithms based on information in a data repository to the image, wherein the one or more algorithms are generated by selecting a minimum training set size to limit a number of testing features used to represent a disease or condition;
   generating, via the processor, a classification of the biological sample based on the outcome of the one or more algorithms applied to the image; and
   transmitting the classification of the biological sample to be presented via a presentation medium.

2. The method of claim 1, wherein the one or more algorithms relate to a classification, and wherein the minimum training set size is selected so as to achieve a representative composition for the classification.

3. The method of claim 1, wherein the training set includes one or more features, and wherein the minimum training set size is selected so as to minimize the number of one or more features.

4. The method of claim 1, wherein the one or more algorithms are different from one another depending on one or more training sets that make up the training set size, the method further comprising:
   generating information regarding metrics for each of the one or more training sets.

5. The method of claim 4, further comprising:
generating information regarding metrics for at least one algorithm of the one or more algorithms; and
transmitting the information regarding metrics for the at least one algorithm to be presented via the presentation medium.

6. The method of claim 1, further comprising:
providing label information as to the source of data used from the data repository.

7. A system for classifying a biological sample, the system comprising:
a memory in communication with a processor, wherein the memory and the processor are cooperatively configured to:
receive an image of a biological sample;
apply one or more algorithms based on information in a data repository to the image, wherein the one or more algorithms are generated by selecting a minimum training set size to limit a number of testing features used to represent a disease or condition;
generate a classification of the biological sample based on the outcome of the one or more algorithms applied to the image; and
transmit the classification of the biological sample to be presented via a presentation medium.

8. A system for classifying a biological sample, the system comprising:
a receiving module for receiving an image of a biological sample;
a selecting module for applying one or more algorithms based on information in a data repository to the image, wherein the one or more algorithms are generated by selecting a minimum training set size to limit a number of testing features used to represent a disease or condition;
a generating module for generating a classification of the biological sample based on the outcome of the one or more algorithms applied to the image;
a transmitting module for transmitting the classification of the biological sample to be presented via a presentation medium.

9. A computer program product, comprising:
a non-transitory computer-readable medium including:
at least a first instruction for causing a computer to receive an image of a biological sample;
at least a second instruction for causing the computer to apply one or more algorithms based on information in a data repository to the image, wherein the one or more algorithms are generated by selecting a minimum training set size to limit a number of testing features used to represent a disease or condition;
at least a third instruction for causing the computer to generate a classification of the biological sample based on the outcome of the one or more algorithms applied to the image; and
at least a fourth instruction for causing the computer to transmit the classification of the biological sample to be presented via a presentation medium.

10. The method of claim 1, further comprising:
increasing or decreasing spectral resolution relating to the data to improve the training set.

* * * * *